United States Patent
Nakayama et al.

(10) Patent No.: US 8,187,681 B2
(45) Date of Patent: May 29, 2012

(54) TRANSPARENT FILM AND OPTICAL COMPENSATORY FILM, POLARIZING PLATE AND LIQUID-CRYSTAL DISPLAY DEVICE EMPLOYING IT

(75) Inventors: Hajime Nakayama, Minami-ashigara (JP); Yukito Saitoh, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1289 days.

(21) Appl. No.: 10/594,041

(22) PCT Filed: Mar. 24, 2005

(86) PCT No.: PCT/JP2005/006209
§ 371 (c)(1),
(2), (4) Date: Jul. 18, 2007

(87) PCT Pub. No.: WO2005/093476
PCT Pub. Date: Oct. 6, 2005

(65) Prior Publication Data
US 2007/0285603 A1 Dec. 13, 2007

(30) Foreign Application Priority Data

Mar. 25, 2004 (JP) .................. 2004-090319
Mar. 25, 2004 (JP) .................. 2004-090320

(51) Int. Cl.
*C09K 19/00* (2006.01)
(52) U.S. Cl. .................................... 428/1.33
(58) Field of Classification Search ........... None
See application file for complete search history.

(56) References Cited

U.S. PATENT DOCUMENTS

| | | | |
|---|---|---|---|
| 5,453,862 A * | 9/1995 | Toko et al. ............ | 349/129 |
| 6,638,582 B1 | 10/2003 | Uchiyama et al. | |
| 2002/0113534 A1 | 8/2002 | Hayashi et al. | |
| 2002/0149725 A1 | 10/2002 | Hashimoto | |
| 2003/0164920 A1 * | 9/2003 | Kelly et al. ............ | 349/194 |
| 2003/0210370 A1 * | 11/2003 | Yano et al. ............ | 349/117 |

(Continued)

FOREIGN PATENT DOCUMENTS

JP 2001-163995 A * 6/2001

(Continued)

OTHER PUBLICATIONS

Office Action from Taiwanese Patent Office issued in corresponding Taiwanese Patent Application No. (100)2(7)01197-10020322370 dated Apr. 21, 2011, with an English translation.

(Continued)

*Primary Examiner* — David Sample
*Assistant Examiner* — Nicole Gugliotta
(74) *Attorney, Agent, or Firm* — Buchanan Ingersoll & Rooney PC

(57) ABSTRACT

A novel transparent film is disclosed. Re ($\lambda$) and Rth ($\lambda$) of the film defined by the following formulae (I) and (II) satisfy the following formulae (III) and (IV):

$$Re(\lambda)=(nx-ny)\times d, \quad \text{(I)}$$

$$Rth(\lambda)=\{(nx+ny)/2-nz\}\times d, \quad \text{(II)}$$

$$0 \leq |Re(630)| \leq 50, \quad \text{(III)}$$

$$Rth(400)\times Rth(700) \leq 0, \text{ and } 0 \leq |Rth(700)-Rth(400)| \leq 150, \quad \text{(IV)}$$

wherein Re ($\lambda$) means an in-plane retardation value at a wavelength $\lambda$ nm (unit: nm); Rth ($\lambda$) means a thickness-direction retardation value at a wavelength $\lambda$, nm (unit: nm); nx means a refractive index in the in-plane slow-axis direction; ny means a refractive index in the in-plane fast-axis direction; nz means a refractive index in the film thickness direction; and d means a thickness of the film.

26 Claims, 5 Drawing Sheets

U.S. PATENT DOCUMENTS

2005/0208231 A1 * 9/2005 Nimura et al. ............. 428/1.3

FOREIGN PATENT DOCUMENTS

| | | | |
|---|---|---|---|
| JP | 2001-318233 | A | 11/2001 |
| JP | 2003-057415 | A * | 2/2003 |
| TW | 520449 | B | 2/2003 |
| TW | 1195350 | | 1/2004 |
| TW | I195350 | | 1/2004 |

OTHER PUBLICATIONS

Office Action from Taiwanese Patent Office issued in corresponding Taiwanese Patent Application No. 094109321 dated Apr. 21, 2011, with an English translation.

Office Action from Japanese Patent Office issued in corresponding Japanese Patent Application No. 094109321 dated Aug. 15, 2011, with an English translation.

* cited by examiner

TRANSPARENT FILM AND OPTICAL COMPENSATORY FILM, POLARIZING PLATE AND LIQUID-CRYSTAL DISPLAY DEVICE EMPLOYING IT

TECHNICAL FIELD

The present invention relates to a transparent film, and to an optical compensatory sheet, a polarizing plate and a liquid-crystal display device employing the film.

BACKGROUND ART

A liquid-crystal display device generally comprises a liquid-crystal cell and a polarizing plate. The polarizing plate has a protective film and a polarizing film, and this is obtained, for example, by dyeing a polarizing film formed of a polyvinyl alcohol film with iodine, stretching it and then laminating a protective film on both faces thereof. In general, a transmission liquid-crystal display device may comprise such a polarizing plate fitted to both sides of the liquid-crystal cell thereof, and may further has one or more optical compensatory film provided therein. A reflection liquid-crystal display device may generally comprise a reflector, a liquid-crystal cell, one or more optical compensatory films and a polarizing plate disposed in that order. The liquid-crystal cell comprises liquid-crystal molecules, two substrates for sealing them in, and an electrode layer for imparting voltage to the liquid-crystal molecules. Depending on the alignment state of the liquid-crystal molecules therein, the liquid-crystal cell acts for ON/OFF display, for which proposed are various display modes of TN (twisted nematic), ISP (in-plane switching), OCB (optically-compensatory bent), VA (vertically-aligned) and ECB (electrically-controlled birefringence) modes that are applicable to both transmission and reflection devices.

Of such LCDs, nematic liquid-crystal molecules having positive dielectric anisotropy are used for those that are required to have high display quality, for which essentially used are 90-degree twisted nematic liquid-crystal display devices (hereinafter referred to as TN mode) driven by thin-film transistors. However, the TN mode has such viewing-angle characteristics that it has excellent display characteristics when seen in the front direction thereof but its display characteristics worsen when seen in the oblique direction in that its contrast lowers and it causes grayscale inversion which means brightness inversion in grayscale state, and improving it is greatly desired.

To solve the problem, an in-plane switching (IPS) mode liquid-crystal display device in which a horizontal electric field is applied to the liquid crystal, and a vertically-aligned (VA) mode device in which liquid crystals having negative dielectric anisotropy are vertically aligned and the alignment is divided by projection or slit electrodes formed inside the panel have been proposed and put into practical use. These days the panels are not limited to monitor applications but are developed for TV applications, and with that, the screen brightness of the panels is greatly increasing. Accordingly, minor light leakage in the diagonal oblique incident direction in a black state, which, however, has not heretofore been considered problematic in those display modes, has become considered as a problem for the reasons of display quality depression.

One method for improving the color tone and the viewing angle in a black state is now investigated for IPS mode devices, which comprises disposing an optically-compensatory material having birefringence characteristics between a liquid-crystal layer and a polarizing plate. For example, it is disclosed that, when birefringent media each having an action of compensating the retardation change in a tilted liquid-crystal layer are disposed between a substrate and a polarizing plate in such a manner that their optical axes are perpendicular to each other, then the discoloration in white display or in intermediate tone display in the oblique direction can be reduced (see JPA No. 9-80424). On the other hand, proposed is a method of using an optical compensatory film that comprises a styrene-based polymer or discotic liquid-crystal compound having a negative intrinsic birefringence (see JPA NO. 10-54982, 11-202323, 9-292522). However, many of the proposed systems are for canceling the birefringence anisotropy of the liquid crystal in a liquid-crystal cell to thereby improve the viewing angle characteristics of display devices, and are therefore still problematic in that they could not solve the problem of light leakage to be caused by the shifting of the cross angle of the polarization axes from a right angle when the polarizing plates set at right angles are seen in the oblique direction. Even in a system in which the light leakage could be compensated, it is still extremely difficult to completely optically compensate the liquid-crystal cell with no problem. This is because even when light leakage could be completely compensated at a certain wavelength in the system, light leakage at any other wavelength could not be always compensated therein. For example, even when light leakage at a wavelength of green having a largest visibility could be compensated therein, the system would be still problematic in that it could not prevent light leakage at a smaller wavelength of blue or at a larger wavelength of red. To solve this problem, lamination of two biaxial films is proposed in *Jpn. J. Appl. Phys.*, 41, (2002) 4553. However, two biaxial films are used therein, and therefore the method is still problematic in that the axial shifting of the biaxial films may readily occur and the image plane may be often uneven. In addition, the light leakage in a black state may be caused by the in-plane retardation Re and the retardation Rth in the thickness direction of the triacetylcellulose film heretofore used as the polarizing plate-protective film between a liquid-crystal cell and a polarizer.

DISCLOSURE OF THE INVENTION

A first object of the invention is to provide a transparent film having a wavelength dispersibility, which can be a polarizing plate-protective film between a liquid-crystal cell and a polarizer so as to reduce Re and Rth of the protective film and to attain optical compensation in the overall wavelength region of visible light, in order that the liquid-crystal cell can be optically compensated in the overall region of visible light and the light leakage in the viewing angle direction in a black state can be reduced A second object of the invention is to provide a liquid-crystal display device, especially a VA-mode or IPS-mode liquid-crystal display device which comprises the transparent film as the protective film for the polarizing plate and in which the liquid-crystal cell is thereby optically compensated in the overall region of visible light and the light leakage in the viewing angle direction in a black state is reduced.

Still another object of the invention is to provide a liquid-crystal display device, especially an IPS-mode liquid-crystal display device in which the liquid-crystal cell is optically compensated in a visible light region and the light leakage in the viewing angle direction in a black state is reduced.

The present inventors have assiduously studied and, as a result, have found that, when a compound capable of preventing molecules in a transparent film from aligned in the in-plane direction and the thickness direction is used for sufficiently lowering the optical anisotropy of the film, then Re and Rth of the film can be thereby reduced. On the basis of this finding, they have further studied and, as a result, have further found that, when a compound capable of controlling the wavelength dispersion of a transparent film is used, then a transparent film of which |Rth (400)−Rth (700)| is reduced and which has a wavelength dispersibility to enable optical compensation in the overall region of visible light can be fabricated. On the basis of these findings, the invention was achieved.

In one aspect, the present invention provides a transparent film of which Re ($\lambda$) and Rth ($\lambda$) defined by the following formulae (I) and (II) satisfy the following formulae (III) and (IV):

$$Re(\lambda) = (nx-ny) \times d, \quad \text{(I)}$$

$$Rth(\lambda) = \{(nx+ny)/2 - nz\} \times d, \quad \text{(II)}$$

$$0 \leq |Re(630)| \leq 50, \quad \text{(III)}$$

$$Rth(400) \times Rth(700) \leq 0, \text{ and } 0 \leq |Rth(700) - Rth(400)| \leq 150, \quad \text{(IV)}$$

wherein Re ($\lambda$) means an in-plane retardation value at a wavelength $\lambda$ nm (unit: nm); Rth ($\lambda$) means a thickness-direction retardation value at a wavelength $\lambda$ nm (unit: nm); nx means a refractive index in the in-plane slow-axis direction; ny means a refractive index in the in-plane fast-axis direction; nz means a refractive index in the film thickness direction; and d means a thickness of the film.

As embodiments of the present invention, the transparent film which comprises a thermoplastic norbornene resin; the transparent film which comprises a cellulose acylate; the transparent film wherein the cellulose acylate has a degree of acyl substitution of from 2.85 to 3.00; the transparent film wherein the acyl substituent in the cellulose acylate consists of substantially two selected from an acetyl group, a propionyl group and a butanoyl group and the degree of total acyl substitution is from 2.50 to 3.00; the transparent film wherein the acyl substituent in the cellulose acylate consists of substantially two selected from an acetyl group, a propionyl group and a butanoyl group and the degree of total acyl substitution is from 2.50 to 3.00; the transparent film of claim 1, which comprises at least one compound capable of reducing Re ($\lambda$) and Rth ($\lambda$); and the transparent film which comprises at least one compound capable of reducing Re ($\lambda$) and Rth ($\lambda$) of the film and having an octanol-water partition coefficient (Log p value) of from 0 to 7, in an amount of from 0.01 to 30% by weight of the solid content of the film, the transparent film which comprises at least one compound capable of lowering |Rth (700)−Rth (400)| of the film; the transparent film having a thickness of from 10 to 120 μm; are provided.

The compound capable of reducing Re ($\lambda$) and Rth ($\lambda$) of the film may be selected from the following formulae (1) to (19)

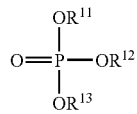

Formula (1)

wherein $R^{11}$ to $R^{13}$ each independently represent a $C_{1-20}$ aliphatic group, and $R^{11}$ to $R^{13}$ may bond to each other to form a ring,

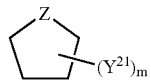

Formula (2)

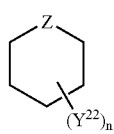

Formula (3)

wherein Z represents a carbon atom, an oxygen atom, a sulfur atom, or —$NR^{25}$—; $R^{25}$ represents a hydrogen atom or an alkyl group; the 5-membered or 6-membered ring including Z may have a substituent; $Y^{21}$ and $Y^{22}$ each independently represent an ester group, an alkoxycarbonyl group, an amido group or a carbamoyl group having from 1 to 20 carbon atoms; $Y^{21}$ and $Y^{22}$ may bond to each other to form a ring; m indicates an integer of from 1 to 5; n indicates an integer of from 1 to 6,

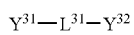

Formula (4)

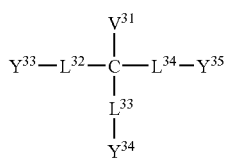

Formula (5)

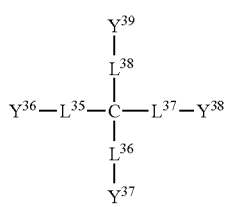

Formula (6)

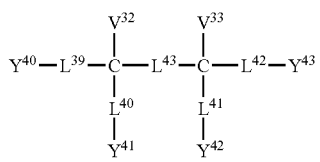

Formula (7)

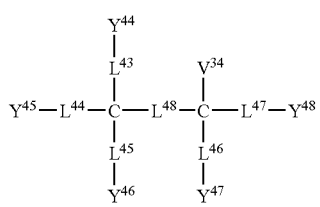

Formula (8)

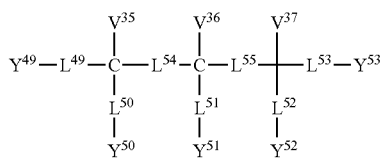

Formula (9)

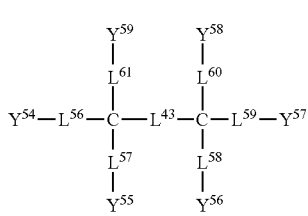
Formula (10)

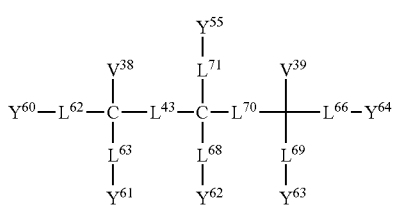
Formula (11)

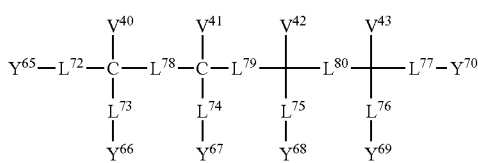
Formula (12)

wherein $Y^{31}$ to $Y^{70}$ each independently represent an ester group having from 1 to 20 carbon atoms, an alkoxycarbonyl group having from 1 to 20 carbon atoms, an amido group having from 1 to 20 carbon atoms, a carbamoyl group having from 1 to 20 carbon atoms, or a hydroxyl group; $V^{31}$ to $V^{43}$ each independently represent a hydrogen atom, or a $C_{1\text{-}20}$ aliphatic group; $L^{31}$ to $L^{80}$ each independently represent a divalent saturated linking group having from 0 to 40 atoms and having from 0 to 20 carbon atoms; when the number of the atoms to constitute $L^{31}$ to $L^{80}$ is 0 (zero), it means that the groups at both ends of the linking group directly bond to each other to form a single bond; $V^{31}$ to $V^{43}$, and $L^{31}$ to $L^{80}$ may have a substituent,

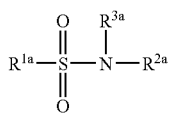
Formula (13)

wherein $R^{1a}$ represents an alkyl group or an aryl group; $R^{2a}$ and $R^{3a}$ each independently represent a hydrogen atom, an alkyl group or an aryl group; the number of all carbon atoms of $R^{1a}$, $R^{2a}$ and $R^{3a}$ is at least 10; and the alkyl group and the aryl group may have a substituent,

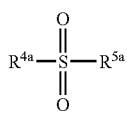
Formula (14)

wherein $R^{4a}$ and $R^{5a}$ each independently represent an alkyl group or an aryl group; the number of all carbon atoms of $R^{4a}$ and $R^{5a}$ is at least 10; and the alkyl group and the aryl group may have a substituent,

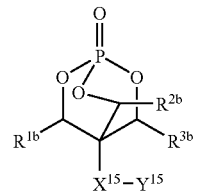
Formula (15)

wherein $R^{1b}$, $R^{2b}$ and $R^{3b}$ each independently represent a hydrogen atom or an alkyl group; $X^{15}$ represents a divalent linking group to be formed of one or more groups selected from the following linking group 1; and $Y^{15}$ represents a hydrogen atom, an alkyl group, an aryl group or an aralkyl group, Linking Group 1:

a single bond, —O—, —CO—, —NR$^{4b}$—, an alkylene group and an arylene group; and $R^{4b}$ is a hydrogen atom, an alkyl group, an aryl group or an aralkyl group,

Formula (16)

wherein $Q^1$, $Q^2$ and $Q^3$ each independently represent a 5- or 6-membered ring; and $X^{16}$ represents a boron atom (B), C—R (R is a hydrogen atom or a substituent), a nitrogen atom (N), a phosphorous atom (P) or P=O,

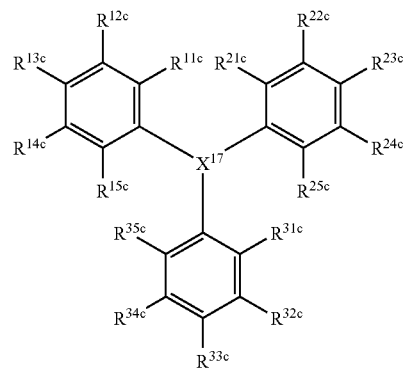
Formula (17)

wherein $X^{17}$ represents B, C—R (R is a hydrogen atom or a substituent), or N; and $R^{11c}$, $R^{12c}$, $R^{13c}$, $R^{14c}$, $R^{15c}$, $R^{21c}$, $R^{22c}$, $R^{23c}$, $R^{24c}$, $R^{25c}$, $R^{31c}$, $R^{32c}$, $R^{33c}$, $R^{34c}$ and $R^{35c}$ each represent a hydrogen atom or a substituent,

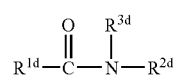
Formula (18)

wherein $R^{1d}$ represents an alkyl group or an aryl group; $R^{2d}$ and $R^{3d}$ each independently represent a hydrogen atom, an alkyl group or an aryl group; and the alkyl group and the aryl group may have a substituent,

Formula (19)

wherein $R^{4d}$, $R^{5d}$ and $R^{6d}$ each independently represent an alkyl group or an aryl group; and the alkyl group and the aryl group may have a substituent.

In another aspect, the present invention provides an optical compensatory film comprising the transparent film and an optically-anisotropic layer having Re (630) of from 0 to 200 nm and |Rth (630)| of from 0 to 400 nm; and a polarizing plate comprising at least one of the transparent film 1 or an optical compensatory film of claim 12, and a polarizer.

In another aspect, the present invention provides a liquid-crystal display device, which comprises a transparent film of which Re (λ) and Rth (λ) defined by the following formulae (I) and (II) satisfy the following formulae (III) and (IV):

$$Re(\lambda)=(nx-ny)\times d, \qquad (I)$$

$$Rth(\lambda)=\{(nx+ny)/2-nz\}\times d, \qquad (II)$$

$$0 \leq |Re(630)| \leq 50, \qquad (III)$$

$$Rth(400)\times Rth(700) \leq 0, \text{ and } 0 \leq |Rth(700)-Rth(400)| \leq 150, \qquad (IV)$$

wherein Re (λ) means an in-plane retardation value at a wavelength λ nm (unit: nm); Rth (λ) means a thickness-direction retardation value at a wavelength λ nm (unit: nm); nx means a refractive index in the in-plane slow-axis direction; ny means a refractive index in the in-plane fast-axis direction; nz means a refractive index in the film thickness direction; and d means a thickness of the film.

In another aspect, the present invention provides a liquid-crystal display device comprising a liquid-crystal cell, which has a pair of substrates disposed to face each other and having an electrode on at least one of them, and a liquid-crystal layer sandwiched between the pair of substrates and comprising a nematic liquid-crystal material, wherein the liquid-crystal molecules of the nematic liquid-crystal material are aligned substantially in parallel to the surface of the pair of substrates in a black state and wherein the product of the thickness d (μm) and the refractivity anisotropy Δn, Δn·d, of the liquid-crystal layer falls within the range from 0.2 and 1.0 μm, first and second polarizing films disposed to sandwich the liquid-crystal cell between them, and a transparent film is disposed between at least one of the first and second polarizing films and the liquid-crystal cell, wherein Re (λ) and Rth (λ) of the transparent film, as defined by the following formulae (I) and (II), satisfy the following formulae (III) and (IV):

$$Re(\lambda)=(nx-ny)\times d, \qquad (I)$$

$$Rth(\lambda)=\{(nx+ny)/2-nz\}\times d, \qquad (II)$$

$$0 \leq |Re(630)| \leq 50, \qquad (III)$$

$$Rth(400)\times Rth(700) \leq 0, \text{ and } 0 \leq |Rth(700)-Rth(400)| \leq 150, \qquad (IV)$$

wherein Re (λ) means an in-plane retardation value at a wavelength λ nm (unit: nm); Rth (λ) means a thickness-direction retardation value at a wavelength λ nm (unit: nm); nx means a refractive index in the in-plane slow-axis direction; ny means a refractive index in the in-plane fast-axis direction; nz means a refractive index in the film thickness direction; and d means a thickness of the film.

As one embodiment of the present invention, the liquid-crystal display device further comprising first and second optical compensatory films, wherein the first polarizing film, the second optical compensatory film, the first optical compensatory film, the liquid-crystal cell, the transparent film and the second polarizing film are disposed in this order, Re of the second optical compensatory film is not greater than 100 nm and the thickness-direction retardation Rth thereof is not greater than 200 nm, the refractivity anisotropy of the first optical compensatory film is negative and the optical axis thereof is substantially in parallel to the layer face, the slow axis of the first optical compensatory film is parallel to the transmission axis of the first polarizing film and to the slow axis direction of the liquid-crystal cell in a black display, and Re of the first optical compensatory film falls within the range from 50 nm to 400 nm was provided.

In the embodiment, at least one of the first optical compensatory film and the second optical compensatory film may comprise at least one discotic liquid-crystal compound.

As one embodiment of the present invention, the liquid-crystal display device further comprising first and second optical compensatory film, wherein the first polarizing film, the second optical compensatory film, the first optical compensatory film, the liquid-crystal cell, the transparent film and the second polarizing film are disposed in this order, Re of the second optical compensatory film is not greater than 100 nm and the thickness-direction retardation Rth thereof is not greater than 200 nm, Re of the first optical compensatory film falls within the range from 100 nm to 300 nm, and Nz of the first optical compensatory film, defined as Nz=(nx−nz)/(nx−ny), falls within the range from 0.2 to 0.8 where nx and ny are the in-plane refractive index of the film (nx ny), nz is the thickness-direction refractive index of the film, and d is the thickness of the film.

In the embodiment, at least one of the first optical compensatory film and the second optical compensatory film is a biaxially-stretched film.

In the invention, a transparent film having a wavelength dispersibility characterized in that the positivity/negativity of Rth thereof is reversed at a particular wavelength is used to improve the viewing angle dependency of the contrast and the color change in a liquid-crystal cell, especially in an IPS-mode liquid-crystal cell. The transparent film may be employed in a liquid-crystal display device, as a member such as a protective film for the polarizing plate therein or as an optical compensatory film therein. According to the invention, there is provided a film that contributes to optical compensation in a visible light region of a liquid-crystal cell and to prevention of light leakage from the cell in a black state. According to the invention, there is also provided a liquid-crystal display device, especially an IPS-mode liquid-crystal display device, in which the liquid crystal cell is optically compensated in a visible light region and the light leakage in the viewing angle direction in a black state is reduced.

Figure 1:
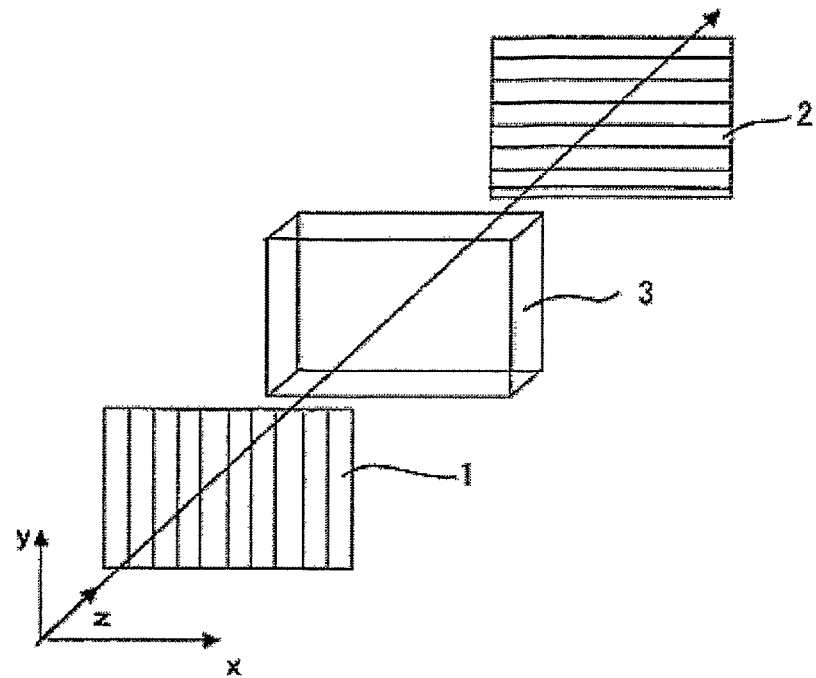
FIG. 1 is a schematic graphic view for explaining an example of a conventional IPS-mode liquid-crystal display device.

The meanings of the reference numerals in the drawings are mentioned below.

| 1, 2 | Polarizing Layer |
| 3 | Liquid-Crystal Cell |
| 4 | Transparent Film of the Invention |
| 5, 6 | Optical Compensatory Film |
| 11a, 11b | Polarizing Film |
| 12a, 12b | Transmission Axis |
| 13 | Second Optical Compensatory Film |
| 15 | First Optical Compensatory Film |
| 15a | In-Plane Slow Axis |
| 16, 18 | Substrate |
| 17 | Liquid-Crystalline Molecule |
| 19 | Transparent Film of the Invention |

DETAILED DESCRIPTION OF THE INVENTION

The effects of the invention are described below with reference to the drawings. FIG. 1 is a graphic view showing the constitution of a general IPS-mode liquid-crystal display device. The IPS-mode liquid-crystal display device comprises a liquid-crystal cell 3 having a liquid-crystal layer in which the liquid crystals are horizontally aligned relative to the substrate face when no voltage is applied thereto, or that is, in a black state, and a polarizing layer 1 and a polarizing layer 2 disposed in such a manner that the liquid-crystal cell 3 is sandwiched between them and their transmission axis directions (shown as stripes in FIG. 1) are perpendicular to each other. In FIG. 1, light enters the device from the side of the polarizing layer 1. In no voltage application thereto, when the light running in the normal line direction, or that is, in the z-axis direction enters the device, then it passes through the polarizing layer 1 and then through the liquid-crystal cell 3 while keeping its linearly polarized state, and is completely blocked by the polarizing layer 2. As a result, the device can display a high-contrast image.

Figure 2:
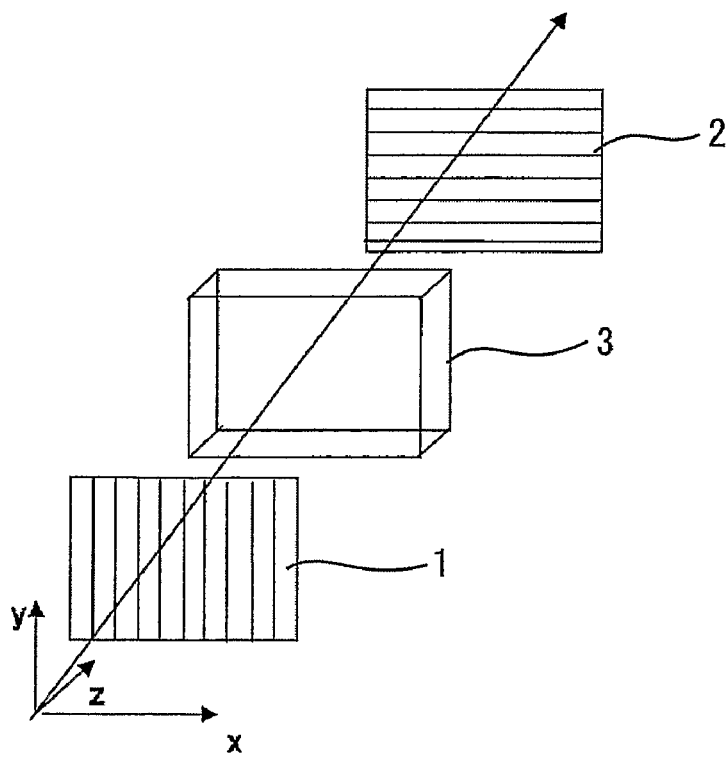
FIG. 2 is a schematic graphic view for explaining an example of a conventional IPS-mode liquid-crystal display device.

However, the condition differs in a case of oblique light incidence as in FIG. 2. When light enters the device in an oblique direction not in the z-axis direction, or that is, when light enters the device in the direction oblique to the polarizing direction of the polarizing layers 1 and 2 (this is "OFF AXIS"), then the apparent transmission axis of the polarizing layer 1 and the polarizing layer 2 shifts from a right angle. In general, a transparent film such as a protective film for the polarizing layers is often sandwiched between the polarizing layer and the liquid-crystal cell, and the polarization state of the device changes owing to the influence thereon of the retardation from the oblique direction of the transparent film. Because of these two essential reasons, the incident light from the oblique direction in OFF AXIS is not completely blocked by the polarizing layer 2 and the running light leaks out of the device in a black state to thereby lower the image contrast.

A polar angle and an azimuth angle are defined herein. A polar angle is an angle tilted from the normal line direction, or that is, the z-axis direction of the film face. For example, the normal line direction of the film face has a polar angle of 0 degree. An azimuth angle indicates the direction anticlockwise rotated on the basis of the positive direction of the x-axis. For example, the positive direction of the x-axis has an azimuth angle of 0 degree; and the positive direction of the y-axis has an azimuth angle of 90 degrees. The oblique direction in the above-mentioned OFF AXIS is in a case where the polar angle is not 0 degree and the azimuth angle is essentially 45 degrees, 135 degrees, 225 degrees or 315 degrees.

Figure 3:
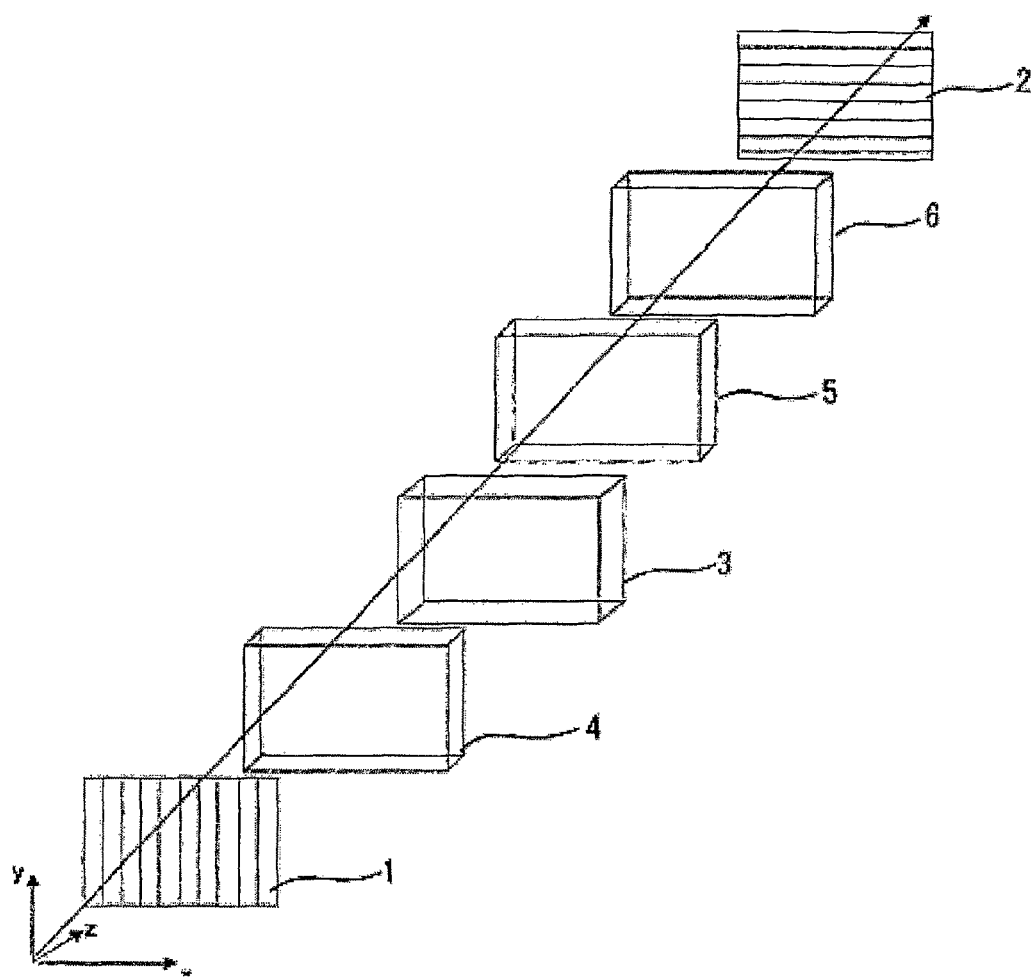
FIG. 3 is a schematic graphic view for explaining an example of a liquid-crystal display device of the invention.

FIG. 3 is a graphic view showing a constitution example for explaining the effects of the invention. The constitution of FIG. 3 differs from that of FIG. 1 in that a transparent film 4 having particular optical characteristics is disposed between the liquid-crystal cell 3 and the polarizing layer 1, and two optical compensatory films 5 and 6 are disposed between the polarizing layer 2 and the liquid-crystal cell 3. The transparent film 4 has such optical characteristics that Re ($\lambda$) and Rth ($\lambda$) defined by the following formulae (I) and (II) satisfy the following formulae (III) and (IV).

$$Re(\lambda)=(nx-ny)\times d, \quad (I)$$

$$Rth(\lambda)=\{(nx+ny)/2-nz\}\times d, \quad (II)$$

$$0 \leq |Re(630)| \leq 50, \quad (III)$$

$$Rth(400)\times Rth(700) \leq 0, \text{ and } 0 \leq |Rth(700)-Rth(400)| \leq 150, \quad (IV)$$

wherein Re ($\lambda$) means an in-plane retardation value at a wavelength $\lambda$ nm (unit: nm); Rth ($\lambda$) means a thickness-direction retardation value at a wavelength $\lambda$ nm (unit: nm); nx means a refractive index in the in-plane slow-axis direction; ny means a refractive index in the in-plane fast-axis direction; nz means a refractive index in the film thickness direction; and d means a thickness of the film.

More preferably, the transparent film 4 satisfies $0 \leq |Re(630)| \leq 30$, even more preferably $0 \leq |Re(630)| \leq 5$. Also Rth (400)×Rth (700)$\leq$0, and preferably $30 \leq |Rth(700)-Rth(400)| \leq 120$, more preferably $60 \leq |Rth(700)-Rth(400)| \leq 100$.

In the invention, a transparent film 4 is disposed between the polarizing layer 1 and the liquid-crystal cell 3, in which the retardation in the thickness direction and the positivity/negativity thereof differ between the three primary colors of light, R (red), G (green) and B (blue), and the inventors have succeeded in significantly reducing the light leakage in the oblique direction in IPS mode devices. Using the transparent film that has the above-mentioned optical characteristics brings about a different retardation and the positivity/negativity inversion of the retardation at each wavelength of light, R, G and B entering the device in the oblique direction. In a conventional liquid-crystal display device, the polarizing state of the incident light changes during going though the liquid-crystal layer and the optical compensatory film, and the polarizing state of the outgoing light differs between R, G and B; but according to the invention, the polarization state of the outgoing light of the changed R, G and B can be more approximated to each other. As a result, the viewing angle contrast in a black state can be significantly improved and, in addition, the coloration in the viewing angle direction in a black state may be significantly reduced.

Regarding the wavelength of R, G and B employed herein, R has a wavelength $\lambda$ of 700 nm; G has a wavelength $\lambda$ of 550 nm; and B has a wavelength $\lambda$ of 400 nm. In general, these values of the wavelength of R, G and B are not always typical, but they may be suitable for confirming the effects of the invention. The wavelength of B is 400 nm herein. However, some polarizing films may have a lowered degree of polarization at around 400 nm or less, or the accuracy in determining the retardation through some polarizing films may lower owing to the absorption by the substrate glass used in cells. Therefore, some attention must be given to it. Even when the wavelength of B is 450 nm, it does not lose the generality thereof, and therefore the wavelength 400 nm of B may be changed to 450 nm.

Figure 4:
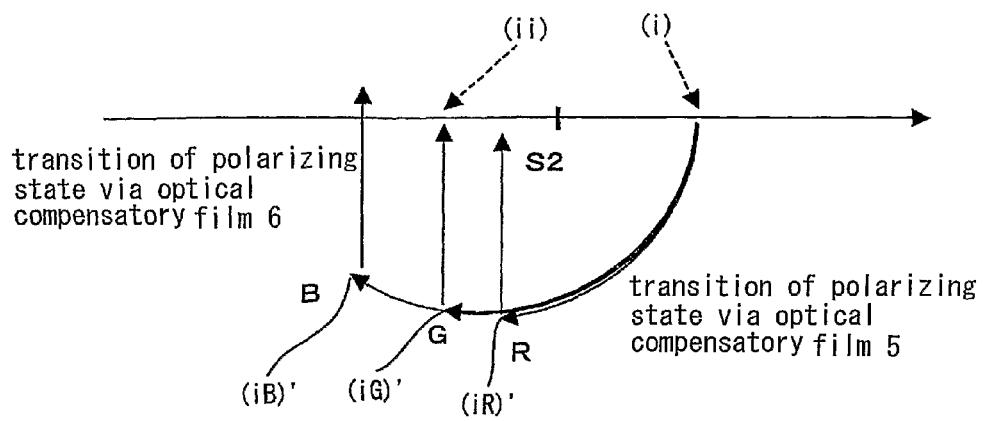
FIG. 4 is a schematic view of a Poincare sphere used for explaining the change of the polarization state of incident light in one example of a conventional liquid-crystal display device.

FIG. 4 shows a view of explaining the compensation mechanism in the constitution of FIG. 3, using a Poincare sphere. In this, the light transmission direction is at an azimuth angle of 45 degrees and at a polar angle of 34 degrees. In FIG. 4, the S2-axis is an axis running vertically through the paper from its top side to its back side. In FIG. 4, the Poincare sphere is seen in the positive direction of the S2 axis, and its part is drawn as enlarged. Since FIG. 4 is drawn two-dimensionally, the point displacement before and after the polarization state change is indicated by the linear arrows in the drawing. In fact, however, the polarization state change of the light having passed through the liquid-crystal layer and the optical compensatory film is represented on a Poincare sphere by particular angle rotation around a particular axis to be determined in accordance with the optical characteristics of the layer and the film.

The polarization state of the incident light having passed through the polarizing plate 1 in FIG. 3 corresponds to the point (i) in FIG. 4; and the polarization state thereof blocked by the absorption axis of the polarizing layer 2 in FIG. 3 corresponds to the point (ii) in FIG. 4. Heretofore, in liquid-crystal display devices, optical compensatory films are generally used for changing the polarization state of the incident light from the point (i) to the point (ii) including the polarization state change in the liquid-crystal layers therein. When the transparent film 4 has no retardation, then the polarization state of the incident light having passed through the transparent film 4 and the liquid-crystal layer 3 does not change at any wavelength, and it is still at the point (i). After that, the polarization state of the light may change, having passed through the optical compensatory film 5 (for example, its refractivity anisotropy is negative, its optical axis is substantially parallel to the layer face, its slow axis is parallel to the transmission axis of the polarizing layer 2 and to the slow axis direction of the liquid-crystal molecules in a black state in the liquid crystal cell, and its Re falls between 50 nm and 400 nm; and this is preferably the first optical compensatory film to be mentioned below), but at each wavelength of R, G and B that differ in their wavelength, the rotation angle is not the same, and therefore, the polarization states of the R, G and B light before passing through the optical compensatory film 6 (for example, its Re is at most 100 nm, its retardation Rth in the thickness direction is at most 200 nm; and this is preferably the second optical compensatory film to be mentioned below) differ (in the drawing, the point (iR), the point (iG), the point (iB)). Accordingly, when the light passes through the optical compensatory film 6, then its polarization state changes like the arrow running from the bottom to the top in the drawing. In a conventional liquid-crystal display device, the polarization state of the visible light having passed through the optical compensatory film 5 differs between R, G and B, and therefore, the polarization state thereof having passed through the optical compensatory film 6 also differs between R, G and B (in the drawing, the point (iR)', the point (iG)', the point (iB)'), and all the polarization state of the light could not change to the point (ii). As a result, light leakage could not be prevented through the conventional device.

Figure 5:
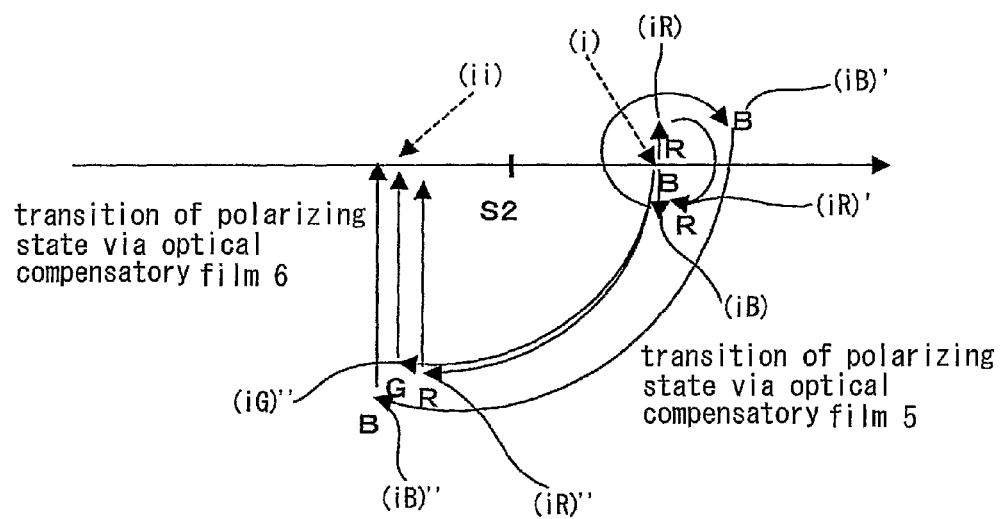
FIG. 5 is a schematic view of a Poincare sphere used for explaining the change of the polarization state of incident light in one example of a liquid-crystal display device of the invention.

To solve the problem in the invention, the retardation Rth in the thickness direction of the transparent film 4 is controlled in accordance with the wavelength of light that passes through it. FIG. 5 shows a polarization state change of one example of a transparent film of the invention. In this case, the transparent film 4 satisfies the above-mentioned optical requirements, and its Rth at B is negative, its Rth at G is nearly 0, and its Rth at R is positive. The polarization state of the light having passed through the polarizing layer 1 is represented by the point (i), and after the polarized light has passed through the transparent film 4 that has the above-mentioned optical characteristics, then the point (i) for B changes to the point (iB) as indicated by the downward arrow, the point (i) for G does not change, and the point (i) for R changes to the point (iR) as indicated by the upward arrow. After that, the light passes through the liquid-crystal cell 3, and its polarization state rotates in the right-hand direction around the point (i) as the axis. Accordingly, the polarization state of the light just before entering the optical compensatory film 5 is as in the point (iR) the point (iG)' and the point (iB)' in the drawing. Further, after having passed through the optical compensatory film 5, the polarization state of the light is as in the point (iR)", the point (iG)" and the point (iB)" in the drawing, or that is, their polarization states become nearer to each other. Finally, after the light has passed through the optical compensatory film 6, the transition states of R, G and B all approach the point (ii) and, as a result, the light leakage though the device can be reduced at any wavelength of R, G and B. The above description is for a case of transition of the polarization state of incident light that enters the device on the side of the polarizing layer 1, and the same effect as in the case may be obtained also in the other case where the incident light enters the device on the side of the polarizing layer 2.

Figure 6:
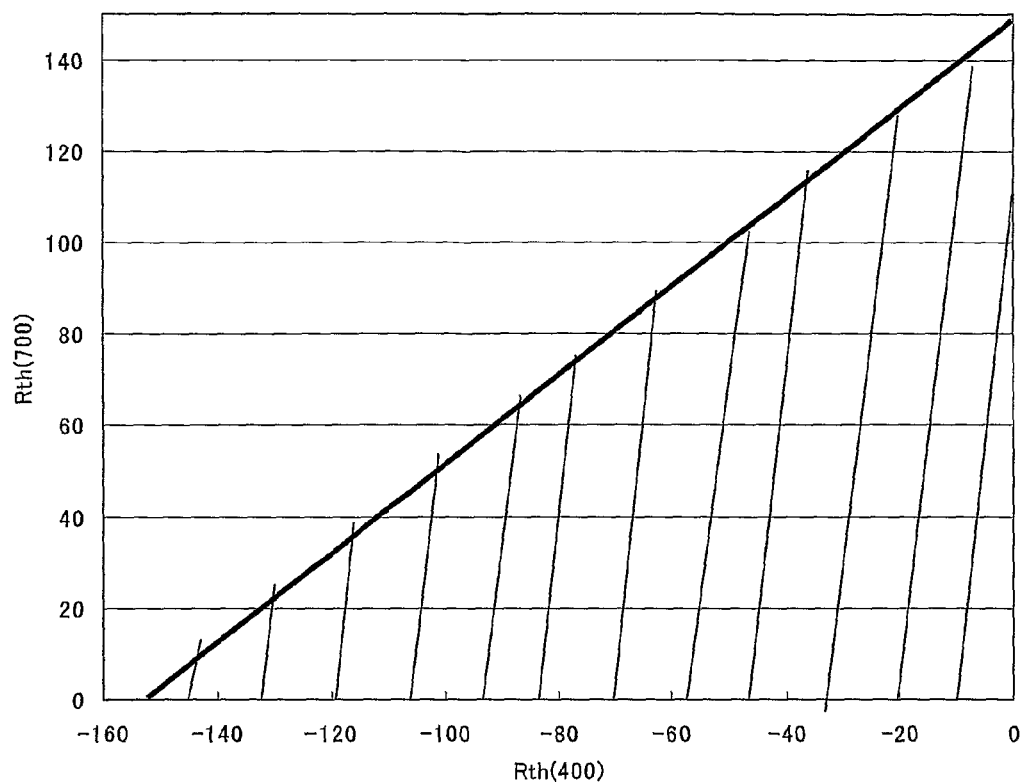
FIG. 6 is a graph showing the wavelength dependency of Rth of one example of a transparent film used in the invention.

In FIG. 6, the range of the wavelength dependency of Rth of a film that may bring about the effect of the invention is filled with slanting lines. In this, the range filled with slanting lines is a region where the light leakage value for black is at most 0.022% at an azimuth angle of 45 degrees and at a polar angle of 60 degrees. In this region, the contrast value to be represented by a ratio of white to black may be at least 30. When a transparent film of the invention is not used, the light leakage value for black is more than 0.022%. From the graph of FIG. 6, it is understood that the reduction in the light leakage for black is attained by the use of a transparent film of which the positivity/negativity of Rth is reversed depending on the wavelength of light and the product of Rth (400) and Rth (700) is negative.

One feature of the invention resides that a transparent film of which the positivity/negativity of Rth is reversed depending on the wavelength of light is utilized and that such optical properties of the transparent film is positively used for optical compensation. The transparent film of the invention can be used in liquid-crystal display devices of any display mode, and, for example, it can be used in liquid-crystal display devices having a liquid-crystal layer of any display mode, such as VA mode, IPS mode, ECB mode, TN mode or OCB mode. Even when the transparent film of the invention is used as a protective film for a polarizing plate on the side remoter from liquid crystal, there occurs no problem since the difference in the layer constitution does not bring about a difference in the transition of the polarization state mentioned above and does not have any influence on the optical compensation in the system.

The transparent film of the invention, and the material to be used for fabricating a liquid-crystal display device comprising the transparent film of the invention, as well as a method for fabricating the device are described in detail hereinafter.

First described are the material for the transparent film of the invention and a method for producing the film.

[Material of Transparent Film]

The material for the transparent film of the invention is preferably a polymer having high optical transparency, mechanical strength, thermal stability, water-shieldability and isotropy, and any one satisfying the ranges of the above-mentioned formulae (I) to (IV) for the above-mentioned Re (λ) and Rth (λ) thereof may be used for it. For example, usable are polycarbonate polymer, polyester polymer such as polyethylene terephthalate and polyethylene naphthalate, acrylic polymer such as polymethyl methacrylate, styrenic polymer such as polystyrene and acrylonitrile/styrene copolymer (AS resin). Other examples of the polymer for use herein are polyolefin such as polyethylene and polypropylene; polyolefinic polymer such as ethylene/propylene copolymer; vinyl chloride polymer; amide polymer such as nylon and aromatic polyamide; imide polymer; sulfone polymer; polyether sulfone polymer; polyether-ether ketone polymer; polyphenylene sulfide polymer; vinylidene chloride polymer; vinyl alcohol polymer; vinylbutyral polymer; allylate polymer; polyoxymethylene polymer; epoxy polymer; and mixture of any of the above-mentioned polymers. The transparent film of the invention may be formed as a cured layer of a UV-curable or thermosetting resin such as acrylic, urethane, acrylurethane, epoxy or silicone resin.

For the material for forming the transparent film of the invention, preferred is thermoplastic norbornene resin. The thermoplastic norbornene resin includes Zeonex and Zeonoa (manufactured by ZEON CORPORATION; and Arton (manufactured by JSR Corporation).

For the material for forming the transparent film of the invention, also preferred is cellulose polymer (hereinafter referred to as cellulose acylate) such as typically triacetyl cellulose that has heretofore been used for transparent protective film for polarizing plates. The cellulose acylate is described in detail hereinafter.

[Cellulose Material for Cellulose Acylate]

The cellulose material for cellulose acylate that may be used for the transparent film of the invention includes cotton linter and wood pulp (hardwood pulp, softwood pulp), and any cellulose acylate obtained from any cellulose material may be used herein. As the case may be, different types of cellulose acylates may be mixed for use herein. The cellulose material is described in detail, for example, in Plastic Material Lecture (17), Cellulose Resin (by Maruzawa & Uda, Nikkan Kogyo Shinbun, 1970), Hatsumei Kyokai is Disclosure Bulletin 2001-1745 (pp. 7-8). Cellulose acylate films for use herein are not specifically defined.

[Degree of Substitution in Cellulose Acylate]

Cellulose acylate to be produced from the above-mentioned cellulose material is described. Cellulose acylate is produced by acylating the hydroxyl group in cellulose, in which the substituent acyl group may have from 2 carbon atoms (acetyl group) to 22 carbon atoms. In cellulose acylate, the degree of substitution of the hydroxyl group in cellulose is not specifically defined. Concretely, the degree of substitution may be calculated by measuring the bonding degree of acetic acid and/or fatty acid having from 3 to 22 carbon atoms substituted for the hydroxyl group in cellulose. It may be measured according to the method of ASTM D-817-91.

As so mentioned hereinabove, the degree of substitution of the hydroxyl group in cellulose to give cellulose acylate is not specifically defined. Preferably, however, the degree of acyl substitution of the hydroxyl group in cellulose is from 2.50 to 3.00, more preferably from 2.75 to 3.00, even more preferably from 2.85 to 3.00.

Of acetic acid and/or fatty acid having from 3 to 22 carbon atoms to be introduced in the place of a hydrogen atom of the hydroxyl group in cellulose, the acyl group having from 2 to 22 carbon atoms may be an selected from aliphatic groups or aromatic groups, not specifically defined. One or more different types of such acids may be used for the substitution either singly or as combined. The cellulose acylate includes, for example, alkylcarbonyl esters, alkenylcarbonyl esters, aromatic carbonyl esters and aromatic alkylcarbonyl esters of cellulose, which may be further substituted. Preferred examples of the acyl group are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Of those, more preferred are acetyl, propionyl, butanoyl, dodecanoyl, octadecanoyl, t-butanoyl, oleoyl, benzoyl, naphthylcarbonyl and cinnamoyl; and even more preferred are acetyl, propionyl and butanoyl.

As a result of assiduous studies, the present inventors have found, when the acyl substituent to be substituted for the hydroxyl group in cellulose is substantially at least two types selected from acetyl group, propionyl group and butanoyl group and when the overall degree of substitution with it is from 2.50 to 3.00, then the optical anisotropy of the cellulose acylate film may be lowered. More preferably, the degree of acyl substitution is from 2.60 to 3.00, even more preferably from 2.65 to 3.00.

[Degree of Polymerization of Cellulose Acylate]

The degree of polymerization of the cellulose acylate preferably used in the invention is from 180 to 700 in terms of the viscosity-average degree of polymerization thereof. Concretely, the viscosity-average degree of polymerization of cellulose acetate is from 180 to 550, more preferably from 180 to 400, even more preferably from 180 to 350. If having a too high degree of polymerization, the viscosity of the dope solution of the cellulose acylate may increase, and the film formation from it by casting may be difficult. If, however, the polymer has a too low degree of polymerization, then the strength of the film formed from it may lower. The mean degree of polymerization may be determined according to an Uda et al's limiting viscosity method (Kazuo Uda, Hideo Saito; the Journal of the Textile Society of Japan, Vol. 18, No. 1, pp. 105-120, 1962). It is described in detail in JPA NO. 9-95538.

In particular, when the transparent film of the invention is produced from a cellulose acylate in which the acyl substituent is substantially an acetyl group alone and which has a mean degree of polymerization of from 180 to 550, then its optical anisotropy may be lowered more.

The molecular weight distribution of the cellulose acylate preferably used in the invention may be determined through gel permeation chromatography, and it is desirable that the polydispersion index Mw/Mn (Mw is a mass-average molecular weight, and Mn is a number-average molecular weight) of the polymer is smaller and the molecular weight distribution thereof is narrower. Concretely, the value of Mw/Mn of the polymer preferably falls between 1.0 and 3.0, more preferably between 1.0 and 2.0, most preferably between 1.0 and 1.6.

When a low-molecular component is removed from it, then the mean molecular weight (degree of polymerization) of the cellulose acylate may increase but the viscosity thereof may be lower than that of ordinary cellulose acylate, and therefore the cellulose acylate of the type is favorable. The cellulose acylate having a reduced low-molecular content may be obtained by removing a low-molecular component from cellulose acylate produced in an ordinary method. For removing the low-molecular component from it, cellulose acylate may be washed with a suitable organic solvent. When the cellulose acylate having a reduced low-molecular content is produced, it is desirable that the amount of the sulfuric acid catalyst in acetylation is controlled to fall between 0.5 and 25 parts by mass relative to 100 parts by mass of cellulose. The amount of the sulfuric acid catalyst falling within the range is preferred in that the cellulose acylate produced may have a preferred (uniform) molecular weight distribution. In forming it into films, the cellulose acylate preferably has a water content of at most 2% by mass, more preferably at most 1% by mass, even more preferably at most 0.7% by mass. It is known that cellulose acylate generally contain water and its water content is from 2.5 to 5% by mass. In order that the cellulose acylate for use in the invention is made to have the preferred water content as above, it must be dried. The method of drying it is not specifically defined so far as the dried polymer may have the desired water content. The cellulose acylate for use in the invention, the cellulose material for it and the method for producing it are described in detail in Hatsumei Kyokai's Disclosure Bulletin No. 2001-1745 (issued Mar. 15, 2001), pp. 7-12.

Any cellulose acylate may be used herein so far as it satisfies the above-mentioned range in point of the substituent therein, and the degree of substitution, the degree of polymerization and the molecular weight distribution thereof. One or more different types of cellulose acylates may be used herein either singly or as combined.

[Additive to Transparent Film]

The transparent film of the invention may be formed from a hot melt of a thermoplastic polymer resin, or from a uniform solution of a polymer (solvent casting method). In the case of film formation of a hot melt of resin, various additives (e.g., optical anisotropy-reducing compound, wavelength dispersion-controlling agent, UV inhibitor, plasticizer, antioxidant, fine particles, optical properties-controlling agent) may be added to it while prepared. On the other hand, when the transparent film is formed from a polymer solution (hereinafter this is referred to as dope), various additives (e.g., optical anisotropy-reducing compound, wavelength dispersion-controlling agent, UV inhibitor, plasticizer, antioxidant, fine particles, optical properties-controlling agent) may be added to the dope while prepared, in accordance with the use of the film. These are described hereinunder. The additives may be added to the dope anytime while the dope is prepared. For example, the dope-preparing process may include a final step of adding the additives to the dope prepared.

[Structural Characteristics of Compound Having the Ability to Reduce the Optical Anisotropy of Transparent Film]

The compound having the ability to reduce the optical anisotropy of the transparent film of the invention is described. As a result of assiduous studies, the present inventors have succeeded in making Re of the film nearer to zero and Rth thereof nearer to zero by adding to the film a compound capable of preventing the polymer molecules in the film from being aligned in the in-plane direction and in the thickness direction to thereby fully reduce the optical anisotropy of the film. For this, it is advantageous that the optical anisotropy-reducing compound is well miscible with the polymer and the compound itself does not have a rod-like structure and a flat structure. Concretely, when the compound has plural flat functional groups such as aromatic groups, then it is advantageous that the structure of the compound is so designed that it may have the functional groups not in the same plane but in a non-plane.

(Log P Value)

In forming the transparent film of the invention, a compound capable of inhibiting the polymer in the film from being aligned in the in-plane direction and in the thickness direction to thereby lower the optical anisotropy of the film may be added thereto, as so mentioned in the above. Preferably, the compound has an octanol-water partition coefficient (log P value) of from 0 to 7. The compound having a log P value of larger than 7 is poorly miscible with polymer, and it may whiten the film formed or may make the film dusty. On the other hand, the compound having a log P value of smaller than 0 is highly hydrophilic and it may worsen the waterproofness of the film formed. More preferably, the log P value of the compound is from 1 to 6, even more preferably from 1.5 to 5.

The octanol-water partition coefficient (log P value) may be determined according to the flask dipping method described in JIS, Nippon Industrial Standards Z7260-107 (2000). In place of actually measuring it, the octanol-water partition coefficient (log P value) may be estimated according to a calculative chemical method or an experiential method. For the calculative method, preferred are a Crippen's fragmentation method (*J. Chem. Inf. Camput. Sci.*, 27, 21 (1987)), a Viswanadhan's fragmentation method (*J. Chem. Inf. Comput. Sci.*, 29, 163 (1989)), a Broto's fragmentation method (*Eur. J. Med. Chem.-Chim. Theor.*, 19, 71 (1984)); and more preferred is a Crippen's fragmentation method (*J. Chem. Inf. Comput. Sci.*, 27, 21 (1987)). When a compound has different log P values, depending on the measuring method or the computing method employed, then the compound may be judged as to whether or not it falls within the scope of the invention preferably according to the Crippen's fragmentation method.

[Physical Properties of Compound Capable of Reducing Optical Anisotropy]

The compound capable of reducing optical anisotropy may or may not have an aromatic compound. Preferably, the compound capable of reducing optical anisotropy has a molecular weight of from 150 to 3000, more preferably from 170 to 2000, even more preferably from 200 to 1000. Having a molecular weight that falls within the range, the compound may have a specific monomer structure or may have an oligomer structure or a polymer structure that comprises a plurality of such monomer units bonded.

The compound capable of reducing optical anisotropy is preferably liquid at 25° C. or a solid having a melting point of from 25 to 250° C., more preferably liquid at 25° C. or a solid having a melting point of from 25 to 200° C. Also preferably, the compound capable of reducing optical anisotropy does not vaporize in the process of dope casting and drying for film formation.

The amount of the optical anisotropy-reducing compound to be added to the film is preferably from 0.01 to 30% by mass of the solid content (essentially the polymer) of the film, more preferably from 1 to 25% by mass, even more preferably from 5 to 20% by mass.

One or more different types of the optical anisotropy-reducing compounds may be used herein either singly or as combined in any desired ratio.

Regarding the time when the optical anisotropy-reducing compound is added to the transparent film, the compound may be added thereto before thermally melting the polymer when the film is formed from a thermal melt of polymer. When the film is formed from a polymer solution (dope), the compound may be added anytime while the dope is prepared. For example, it may be added to the dope finally in the process of preparing the dope.

Regarding the content of the optical anisotropy-reducing compound in the transparent film, the mean content of the compound in the part of 10% of the overall thickness from the surface of at least one side of the film is from 80 to 99% of the mean content of the compound in the center part of the film. The amount of the compound existing in the film of the invention may be determined by measuring the amount of the compound in the surface area and in the center part of the compound, according to a method of infrared spectrometry as in JPA NO. 8-57879.

Preferred examples of the optical anisotropy-reducing compound usable in the transparent film of the invention are described below, to which, however, the invention should not be limited.

The compound for reducing Re and Rth of the film is preferably selected from those of general formulae (1) to (19) mentioned below. Formulae (1) to (19) are described in detail hereinunder.

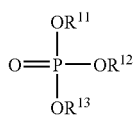

Formula (1)

In formula (1), $R^{11}$ to $R^{13}$ each independently represent a $C_{1-20}$ aliphatic group. $R^{11}$ to $R^{13}$ may bond to each other to form a ring.

$R^{11}$ to $R^{13}$ are described in detail. $R^{11}$ to $R^{13}$ each are an aliphatic group preferably having from 1 to 20 carbon atoms, more preferably from 1 to 16 carbon atoms, even more preferably from 1 to 12 carbon atoms. The aliphatic group is preferably an aliphatic hydrocarbon group, more preferably an alkyl group (including straight, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butyl-cyclohexyl, cyclopentyl, 1-adamantyl, 2-adamantyl, bicyclo[2.2.2]octan-3-yl. Examples of the alkenyl group include vinyl, allyl, prenyl, geranyl, oleyl, 2-cyclopenten-1-yl, 2-cyclohexen-1-yl. Examples of the alkynyl group include ethynyl and propargyl.

The aliphatic group represented by $R^{11}$ to $R^{13}$ may be substituted. Examples of the substituent include a halogen atom (fluorine atom, chlorine atom, bromine atom, or iodine atom), an alkyl group (straight, branched or cyclic alkyl group, including a bicycloalkyl group and an active methine group), an alkenyl group, an alkynyl group, an aryl group, a heterocyclic group (not limited in point of the position for substitution), an acyl group, an alkoxycarbonyl group, an aryloxycarbonyl group, a heterocyclic-oxycarbonyl group, a carbamoyl group, an N-acylcarbamoyl group, an N-sulfonylcarbamoyl group, an N-carbamoylcarbamoyl group, an N-sulfamoylcarbamoyl group, a carbazoyl group, a carboxyl group or its salts, an oxalyl group, an oxamoyl group, a cyano group, a carbonimidoyl group), a formyl group, a hydroxyl group, an alkoxy group (including a group that contains ethyleneoxy or propyleneoxy unit repetitions), an aryloxy group, a heterocyclic-oxy group, an acyloxy group, an (alkoxy or aryloxy) carbonyloxy group, a carbamoyloxy group, a sulfonyloxy group, an amino group, an (alkyl, aryl or heterocyclic) amino group, an acylamino group, a sulfonamido group, an ureido group, a thioureido group, an imido group, an (alkoxy or aryloxy) carbonylamino group, a sulfamoylamino group, a semicarbazido group, an ammonio group, an oxamoylamino group, an N-(alkyl or aryl) sulfonylureido group, an N-acylureido group, an N-acylsulfamoylamino group, a quaternated nitrogen-containing heterocyclic group (e.g., pyridinio group, imidazolio group, quinolinio group, isoquinolinio group), an isocyano group, an imino group, an (alkyl or aryl) sulfonyl group, an (alkyl or aryl) sulfinyl group, a sulfo group or its salts, a sulfamoyl group, an N-acylsulfamoyl group, an N-sulfonylsulfamoyl group or its salts, a phosphino group, a phosphinyl group, a phosphinyloxy group, a phosphinylamino group, and a silyl group.

These groups may be combined to form a substituent. Examples of the substituent of such type substituent include an ethoxyethoxyethyl group, a hydroxyethoxyethyl group, and an ethoxycarbonylethyl group. $R^{11}$ to $R^{13}$ may contain a phosphate group as a substituent therein. The compound of formula (1) may have plural phosphate groups in one molecule.

Compounds of formulae (2) and (3) are described.

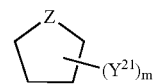

Formula (2)

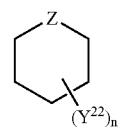

Formula (3)

In formulae (2) and (3), Z represents a carbon atom, an oxygen atom, a sulfur atom, or $-NR^{25}-$; and $R^{25}$ represents a hydrogen atom or an alkyl group. The 5-membered or 6-membered ring including Z may have a substituent, in which plural substituents may bond to each other to form a ring. Examples of the 5-membered or 6-membered ring including Z include tetrahydrofuran, tetrahydropyran, tetrahydrothiophene, thian, pyrrolidine, piperidine, indoline, isoindoline, chroman, isochroman, tetrahydro-2-furanone, tetrahydro-2-pyrone, 4-butanelactam and 6-hexanelactam. Examples of the 5-membered or 6-membered include a lactone structure or a lactam structure, or that is, a cyclic ester or cyclic amide structure that contains an oxo group at the carbon atom adjacent to Z. Examples of such cyclic ester or cyclic amide structure include 2-pyrrolidone, 2-piperidone, 5-pentanolide and 6-hexanolide.

$R^{25}$ represents a hydrogen atom, or an alkyl group preferably having from 1 to 20 carbon atoms, more preferably from 1 to 16 carbon atoms, even more preferably from 1 to 12 carbon atoms (including straight, branched and cyclic alkyl groups). Examples of the alkyl group for $R^{25}$ include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl and bicyclo[2.2.2]octan-3-yl. The alkyl group for $R^{25}$ may have a substituent. Examples of the substituent are those of the substituent that may be in the above-mentioned $R^{11}$ to $R^{13}$.

$Y^{21}$ and $Y^{22}$ each independently represent an ester group, an alkoxycarbonyl group, an amido group or a carbamoyl group. The ester group preferably has from 1 to 20 carbon atoms, more preferably from 1 to 16 carbon atoms, even more preferably from 1 to 12 carbon atoms. Its examples include acetoxy, ethylcarbonyloxy, propylcarbonyloxy, n-butylcarbonyloxy, iso-butylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy and 2-naphthalenecarbonyloxy, 1-adamantanecarbonyloxy. The alkoxycarbonyl group preferably has from 1 to 20 carbon atoms, more preferably from 1 to 16 carbon atoms, even more preferably from 1 to 12 carbon atoms. Its examples include methoxycarbonyl, ethoxycarbonyl, n-propyloxycarbonyl, isopropyloxycarbonyl, n-butoxycarbonyl, t-butoxycarbonyl, iso-butyloxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantanoxycarbonyl, 2-adamantanoxycarbonyl, dicyclopentadienyloxycarbonyl, n-decyloxycarbonyl, n-dodecyloxycarbonyl, n-tetradecyloxycarbonyl and n-hexadecyloxycarbonyl. The amido group preferably has from 1 to 20 carbon atoms, more preferably from 1 to 16 carbon atoms, even more preferably from 1 to 12 carbon atoms. Its examples include acetamido, ethylcarboxamido, n-propylcarboxamido, isopropylcarboxamido, n-butylcarboxamido, t-butylcarboxamido, iso-butylcarboxamido, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamido and n-hexadecylcarboxamido. The carbamoyl group preferably has from 1 to 20 carbon atoms, more preferably from 1 to 16 carbon atoms, even more preferably from 1 to 12 carbon atoms. Its examples include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl and n-hexadecylcarbamoyl.

$Y^{21}$ and $Y^{22}$ may bond to each other to form a ring. $Y^{21}$ and $Y^{22}$ may have a substituent. Examples of the substituent are those of the substituent that may be in the above-mentioned $R^{11}$ to $R^{13}$.

Compounds of formulae (4) to (12) are described.

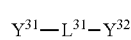

Formula (4)

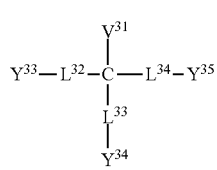

Formula (5)

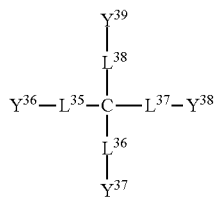

Formula (6)

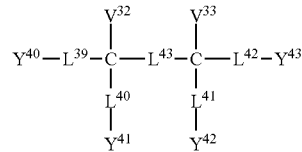

Formula (7)

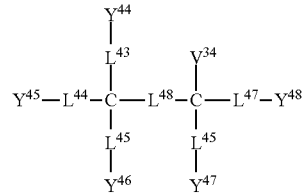

Formula (8)

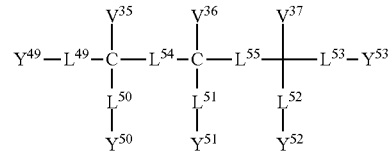

Formula (9)

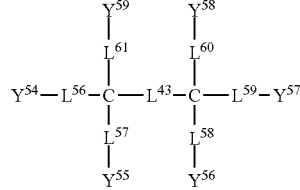

Formula (10)

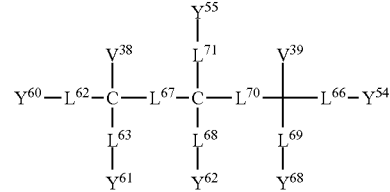

Formula (11)

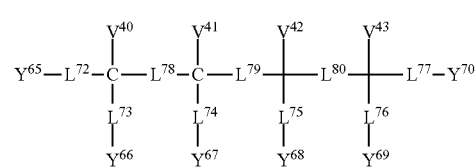

Formula (12)

In formulae (4) to (12), $Y^{31}$ to $Y^{70}$ each independently represent an ester group, an alkoxycarbonyl group, an amido group, a carbamoyl group or a hydroxyl group. The ester group preferably has from 1 to 20 carbon atoms, more preferably from 1 to 16 carbon atoms, even more preferably from 1 to 12 carbon atoms. It includes, for example, acetoxy, ethylcarbonyloxy, propylcarbonyloxy, n-butylcarbonyloxy, iso-butylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcabonyloxy, n-undecylcarbonyloxy, benzylcarbonyloxy, 1-naphthalenecarbonyloxy, 2-naphthalenecarbonylxoy and 1-adamantanecarbonyloxy. The alkoxycarbonyl group preferably has from 1 to 20 carbon atoms, more preferably from 1 to 16 carbon atoms, even more preferably from 1 to 12 carbon atoms. It includes, for example, methoxycarbonyl, ethoxycarbonyl, n-propyloxycarbonyl, isopropyloxycarbonyl, n-butoxycarbonyl, t-butoxycarbonyl, iso-butyloxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantanoxycarbonyl, 2-adamantanoxycarbonyl, dicyclopentadienyloxycarbonyl, n-decyloxycarbonyl, n-dodecyloxycarbonyl, n-tetradecyloxycarbonyl and n-hexadecyloxycabonyl. The amido group preferably has from 1 to 20 carbon atoms, more preferably from 1 to 16 carbon atoms, even more preferably from 1 to 12 carbon atoms. It includes, for example, acetamido, ethylcarboxamido, n-propylcarboxamido, isopropylcarboxamido, n-butylcarboxamido, t-butylcarboxamido, iso-butylcarboxamido, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentadecylcarboxamido and n-hexadecylcarboxamido. The carbamoyl group preferably has from 1 to 20 carbon atoms, more preferably from 1 to 16 carbon atoms, even more preferably from 1 to 12 carbon atoms. It includes, for example, methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl and n-hexadecylcarbamoyl.

$Y^{31}$ to $Y^{70}$ may have a substituent. Examples of the substituent are those of the substituent that may be in the above-mentioned $R^{11}$ to $R^{13}$.

$V^{31}$ to $V^{43}$ each independently represent a hydrogen atom, or an aliphatic group preferably having from 1 to 20 carbon atoms, more preferably from 1 to 16 carbon atoms, even more preferably from 1 to 12 carbon atoms. The aliphatic group is preferably an aliphatic hydrocarbon group, more preferably an alkyl group (including straight, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl and bicyclo[2.2.2]octan-3-yl. Examples of the alkenyl group include vinyl, allyl, prenyl, geranyl, oleyl, 2-cyclopenten-1-yl and 2-cyclohexen-1-yl. Examples of the alkynyl group include ethynyl and propargyl. $V^{31}$ to $V^{43}$ may have a substituent. Examples of the substituent are those of the substituent that may be in the above-mentioned $R^{11}$ to $R^{13}$.

$L^{31}$ to $L^{80}$ each independently represent a divalent saturated linking group having from 0 to 40 atoms and having from 0 to 20 carbon atoms. When the number of the carbon atoms to constitute $L^{31}$ to $L^{80}$ is 0 (zero), it means that the groups at both ends of the linking group directly bond to each other to form a single bond. Preferred examples of $L^{31}$ to $L^{77}$ include an alkylene group (e.g., methylene, ethylene, propylene, trimethylene, tetramethylene, pentamethylene, hexamethylene, methylethylene, ethylethylene), a cyclic divalent group (e.g., cis-1,4-cyclohexylene, trans-1,4-cyclohexylene, 1,3-cyclopentylidene), ether, thioether, ester, amide, sulfone, sulfoxide, sulfide, sulfonamide, ureylene and thioureylene. These divalent groups may bond to each other to form a divalent group. Examples of such divalent group include —(CH$_2$)$_2$O—(CH$_2$)$_2$—, —(CH$_2$)$_2$O—(CH$_2$)$_2$O(CH$_2$)—, —(CH$_2$)$_2$S(CH$_2$)$_2$— and —(CH$_2$)$_2$O$_2$C(CH$_2$)$_2$—. $L^{31}$ to $L^{80}$ may have a substituent. Examples of the substituent are those of the substituent that may be in the above-mentioned $R^{11}$ to $R^{13}$.

Preferred examples of the compounds to be formed by the combination of $Y^{31}$ to $Y^{70}$, $V^{31}$ to $V^{43}$ and $L^{31}$ to $L^{80}$ in formulae (4) to (12) include citrates (e.g., triethyl O-acetylcitrate, tributyl O-acetylcitrate, acetyltriethyl citrate, acetyltributyl citrate, tri(ethyloxycarbonylmethylene) O-acetylcitrate), oleates (e.g., ethyl oleate, butyl oleate, 2-ethylhexyl oleate, phenyl oleate, cyclohexyloleate, octyloleate), ricinoleates (e.g., methylacetyl ricinoleate), sebacates (e.g., dibutyl sebacate), glycerin carboxylates (e.g., triacetin, tributyrin), glycolates (e.g., butylphthalylbutyl glycolate, ethylphtyalylethyl glycolate, methylphthalylethyl glycolate, butylphthalylbutyl glycolate, methylphthalylmethyl glycolate, propylphthalylpropyl glycolate, butylphthalylbutyl glycolate, octylphthalyloctyl glycolate), pentaerythritolcarboxylates (e.g., pentaerythritoltetraacetate, pentaerythritol tetrabutyrate), dipentaerythritol carboxylates (e.g., dipentaerythritol hexaacetate, dipentaerythritol hexabutyrate, dipentaerythritol tetraacetate), trimethylolpropane carboxylates (e.g., trimethylolpropane triacetate, trimethylolpropane diacetate monopropionate, trimethylolpropane tripropionate, trimethylolpropane tributyrate, trimethylolpropane tripivalate, trimethylolpropane tri(t-butylacetate) trimethylolpropane di-2-ethylhexanoate, trimethylolpropane tetra-2-ethylhexanoate, trimethylolpropane diacetate monooctanoate, trimethylolpropane trioctanoate, trimethylolpropane tri(cyclohexanecarboxylate)), glycerol esters as in JPA No. 11-246704, diglycerol esters as in JPA No. 2000-63560, citrates as in JPA No. 11-92574, pyrrolidonecarboxylates (e.g., methyl 2-pyrrolidone-5-carboxylate, ethyl 2-pyrrolidone-5-carboxylate, butyl 2-pyrrolidone-5-carboxylate, 2-ethylhexyl 2-pyrrolidone-5-carboxylate), cyclohexane-dicarboxylates (e.g., dibutyl cis-1,2-cyclohexanedicarboxylate, dibutyl trans-1,2-cyclohexanedicarboxylate, dibutyl cis-1,4-cyclohexanedicarboxylate, dibutyl trans-1,4-cyclohexanedicarboxylate), xylitol carboxylates (e.g., xylitol pentaacetate, xylitol tetraacetate, xylitol pentapropionate).

Examples of the compounds of formulae (1) to (12) for use in the invention are mentioned below, to which, however, the invention should not be limited. Compounds (C-1) to (C-76) are examples of formula (1); and Compounds (C-201) to (C-203), (C-401) to (C-448) are examples of formulae (2) to (12). The log P value shown in the following table or parenthesized is obtained according to the Crippen's fragmentation method (*J. Chem. Inf. Comput. Sci.*, 27, 21 (1987)).

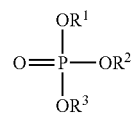

(In the formula, $R^1$ to $R^3$ have the same meanings as $R^{11}$ to $R^{13}$ in formula (1), and their examples are in the following (C-1) to (C-76)).

| compound | R¹ | R² | R³ | logP |
|---|---|---|---|---|
| C-1 | $CH_3$ | $C_2H_5$ | $C_2H_5$ | 1.24 |
| C-2 | $C_2H_5$ | $C_2H_5$ | $C_2H_5$ | 1.58 |
| C-3 | $C_3H_7$ | $C_3H_7$ | $C_3H_7$ | 2.99 |
| C-4 | i-$C_3H_7$ | i-$C_3H_7$ | i-$C_3H_7$ | 2.82 |
| C-5 | $C_4H_9$ | $C_4H_9$ | $C_4H_9$ | 4.18 |
| C-6 | i-$C_4H_9$ | i-$C_4H_9$ | i-$C_4H_9$ | 4.2 |
| C-7 | s-$C_4H_9$ | s-$C_4H_9$ | s-$C_4H_9$ | 4.23 |
| C-8 | t-$C_4H_9$ | t-$C_4H_9$ | t-$C_4H_9$ | 3.06 |
| C-9 | $C_5H_{11}$ | $C_5H_{11}$ | $C_5H_{11}$ | 5.37 |
| C-10 | $CH_2C(CH_3)_3$ | $CH_2C(CH_3)_3$ | $CH_2C(CH_3)_3$ | 5.71 |
| C-11 | c-$C_5H_9$ | c-$C_5H_9$ | c-$C_5H_9$ | 4.12 |
| C-12 | 1-ethylpropyl | 1-ethylpropyl | 1-ethylpropyl | 5.63 |
| C-13 | $C_6H_{13}$ | $C_6H_{13}$ | $C_6H_{13}$ | 6.55 |
| C-14 | c-$C_6H_{11}$ | c-$C_6H_{11}$ | c-$C_6H_{11}$ | 5.31 |
| C-15 | $C_7H_{15}$ | $C_7H_{15}$ | $C_7H_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | $C_8H_{17}$ | $C_8H_{17}$ | $C_8H_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |
| C-21 | 1,3-dimethylbutyl | 1,3-dimethylbutyl | 1,3-dimethylbutyl | 6.41 |
| C-22 | 1-isopropyl-2-methylpropyl | 1-isopropyl-2-methylpropyl | 1-isopropyl-2-methylpropyl | 8.05 |
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclopentadienyl | 4.68 |
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |
| C-49 | 4-bromobutyl | 4-bromobutyl | 4-bromobutyl | 4.37 |
| C-50 | 4-bromohexyl | 4-bromohexyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH=CH_2$ | 4.19 |
| C-60 | $C_4H_9$ | $CH_2CH=CH_2$ | $CH_2CH=CH_2$ | 3.64 |
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP=O(OC_4H_9)_2$ | 6.66 |
| C-65 | $C_4H_9$ | $C_4H_9$ | $(CH_2)_3OP=O(OC_4H_9)_2$ | 6.21 |
| C-66 | $C_4H_9$ | $C_4H_9$ | $(CH_2)_2OP=O(OC_4H_9)_2$ | 6.16 |
| C-67 | $C_4H_9$ | $C_4H_9$ | $(CH_2)_2O(CH_2)_2OP=O(OC_4H_9)_2$ | 5.99 |
| C-68 | $C_6H_{13}$ | $C_6H_{13}$ | $(CH_2)_2O(CH_2)_2OP=O(OC_4H_9)_2$ | 7.58 |
| C-69 | $C_6H_{13}$ | $C_6H_{13}$ | $(CH_2)_4OP=O(OC_4H_9)_2$ | 8.25 |
| C-70 | c-$C_6H_{13}$ | c-$C_6H_{13}$ | $(CH_2)_2O(CH_2)_2OP=O(OC_4H_9)_2$ | 6.35 |
| C-71 | $C_6H_{21}Cl$ | $C_6H_{21}Cl$ | $(CH_2)_2O(CH_2)_2OP=O(OC_4H_9)_2$ | 7.18 |
| C-72 | $C_4H_8Cl$ | $C_4H_8Cl$ | $(CH_2)_2O(CH_2)_2OP=O(OC_4H_9)_2$ | 5.6 |
| C-73 | $C_4H_8Cl$ | $C_4H_8Cl$ | $(CH_2)_2O(CH_2)_2OP=O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

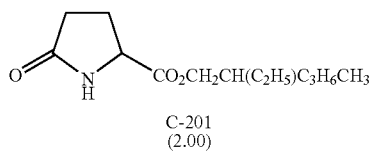
C-201
(2.00)
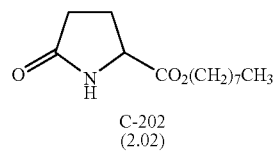
C-202
(2.02)
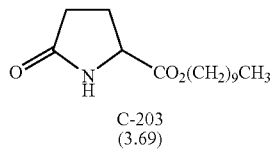
C-203
(3.69)
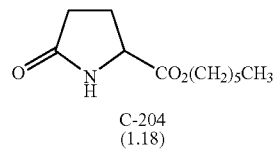
C-204
(1.18)
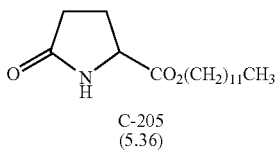
C-205
(5.36)
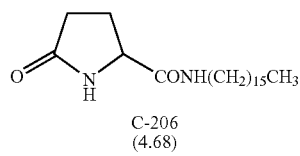
C-206
(4.68)
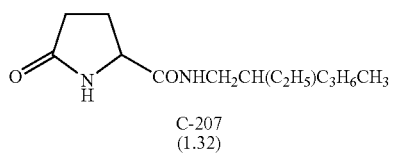
C-207
(1.32)
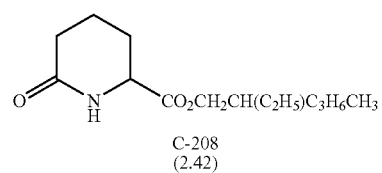
C-208
(2.42)
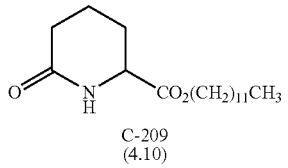
C-209
(4.10)
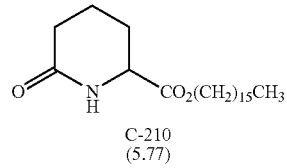
C-210
(5.77)
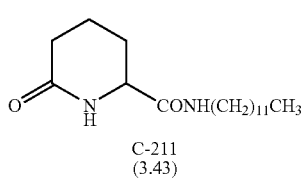
C-211
(3.43)
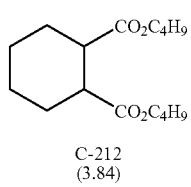
C-212
(3.84)
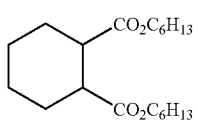
C-213
(5.51)
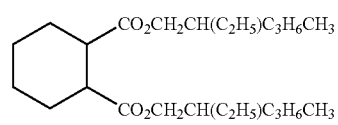
C-214
(7.14)
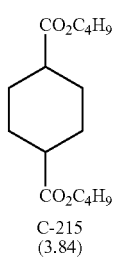
C-215
(3.84)
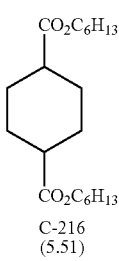
C-216
(5.51)

-continued
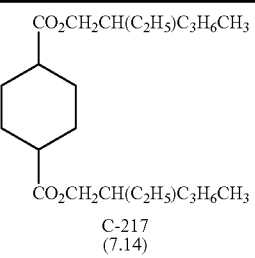
C-217
(7.14)
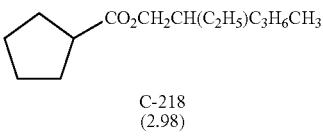
C-218
(2.98)
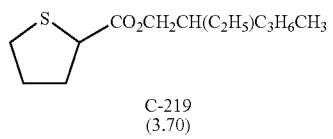
C-219
(3.70)
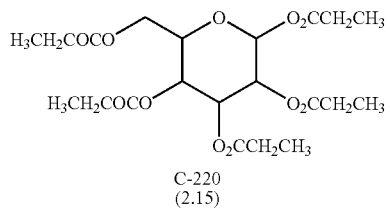
C-220
(2.15)
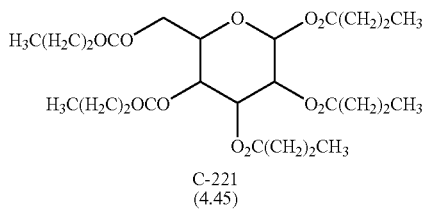
C-221
(4.45)
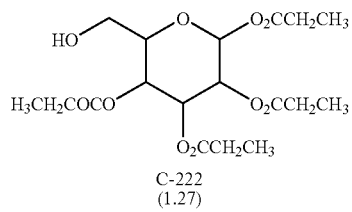
C-222
(1.27)
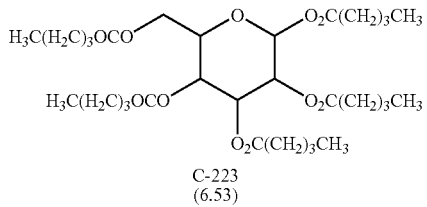
C-223
(6.53)
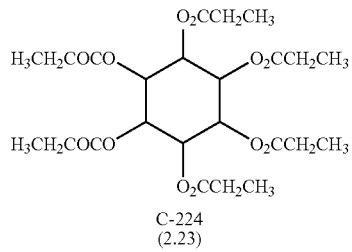
C-224
(2.23)
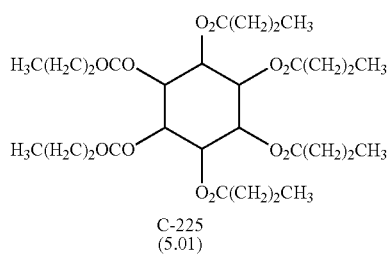
C-225
(5.01)
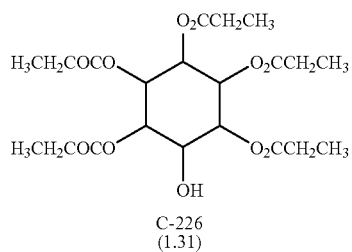
C-226
(1.31)
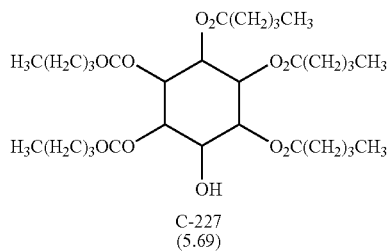
C-227
(5.69)
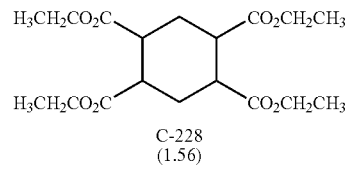
C-228
(1.56)
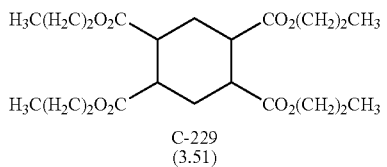
C-229
(3.51)
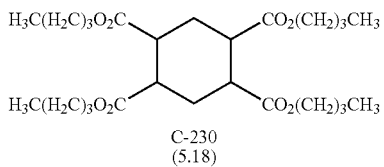
C-230
(5.18)

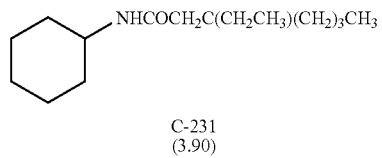
C-231
(3.90)
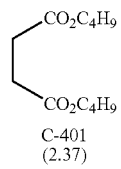
C-401
(2.37)
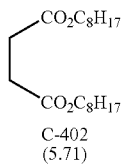
C-402
(5.71)
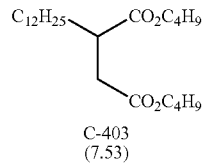
C-403
(7.53)
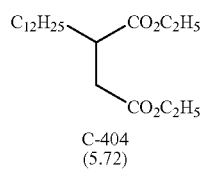
C-404
(5.72)
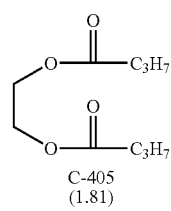
C-405
(1.81)
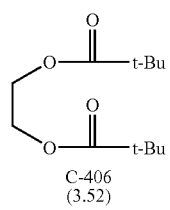
C-406
(3.52)
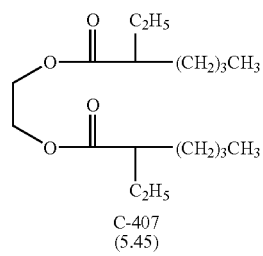
C-407
(5.45)
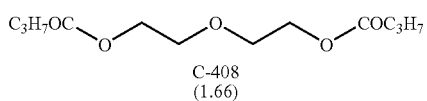
C-408
(1.66)
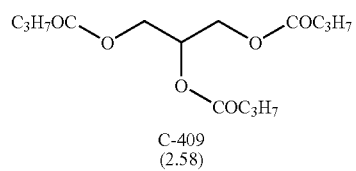
C-409
(2.58)
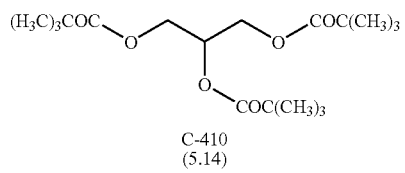
C-410
(5.14)
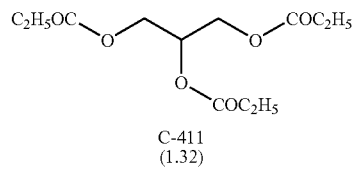
C-411
(1.32)
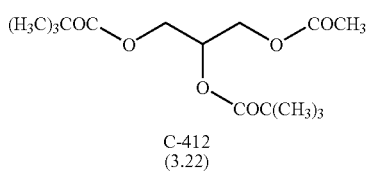
C-412
(3.22)
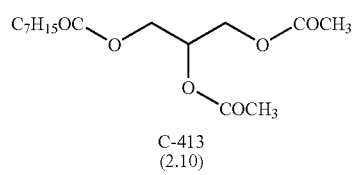
C-413
(2.10)
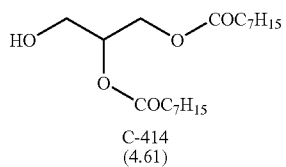
C-414
(4.61)
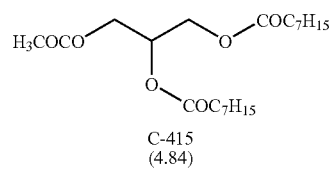
C-415
(4.84)

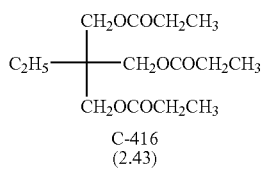
C-416
(2.43)
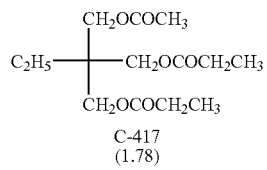
C-417
(1.78)
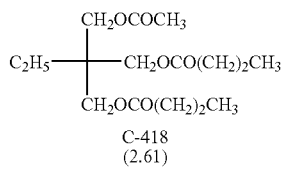
C-418
(2.61)
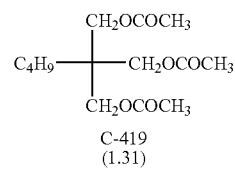
C-419
(1.31)
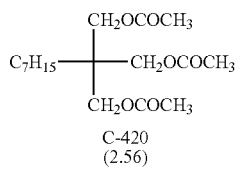
C-420
(2.56)
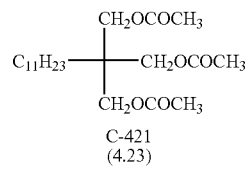
C-421
(4.23)
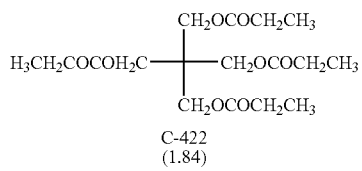
C-422
(1.84)
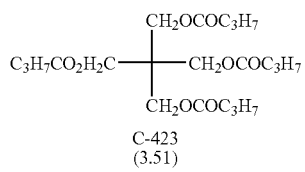
C-423
(3.51)
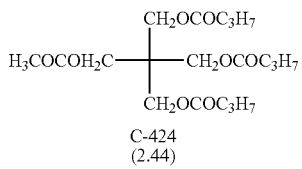
C-424
(2.44)
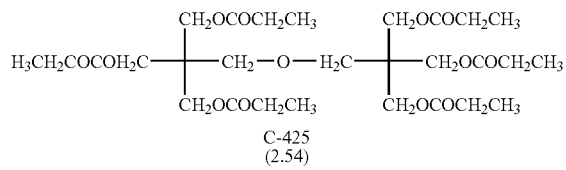
C-425
(2.54)
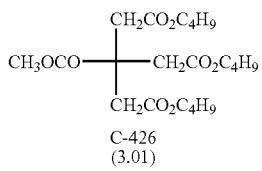
C-426
(3.01)
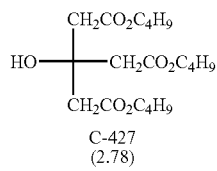
C-427
(2.78)
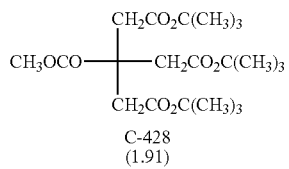
C-428
(1.91)
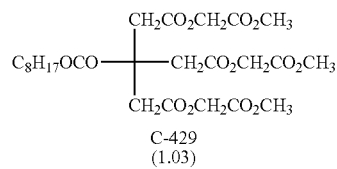
C-429
(1.03)
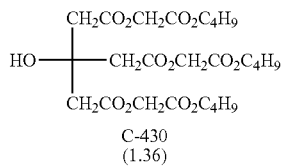
C-430
(1.36)
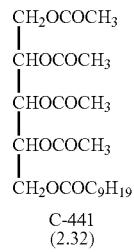
C-441
(2.32)

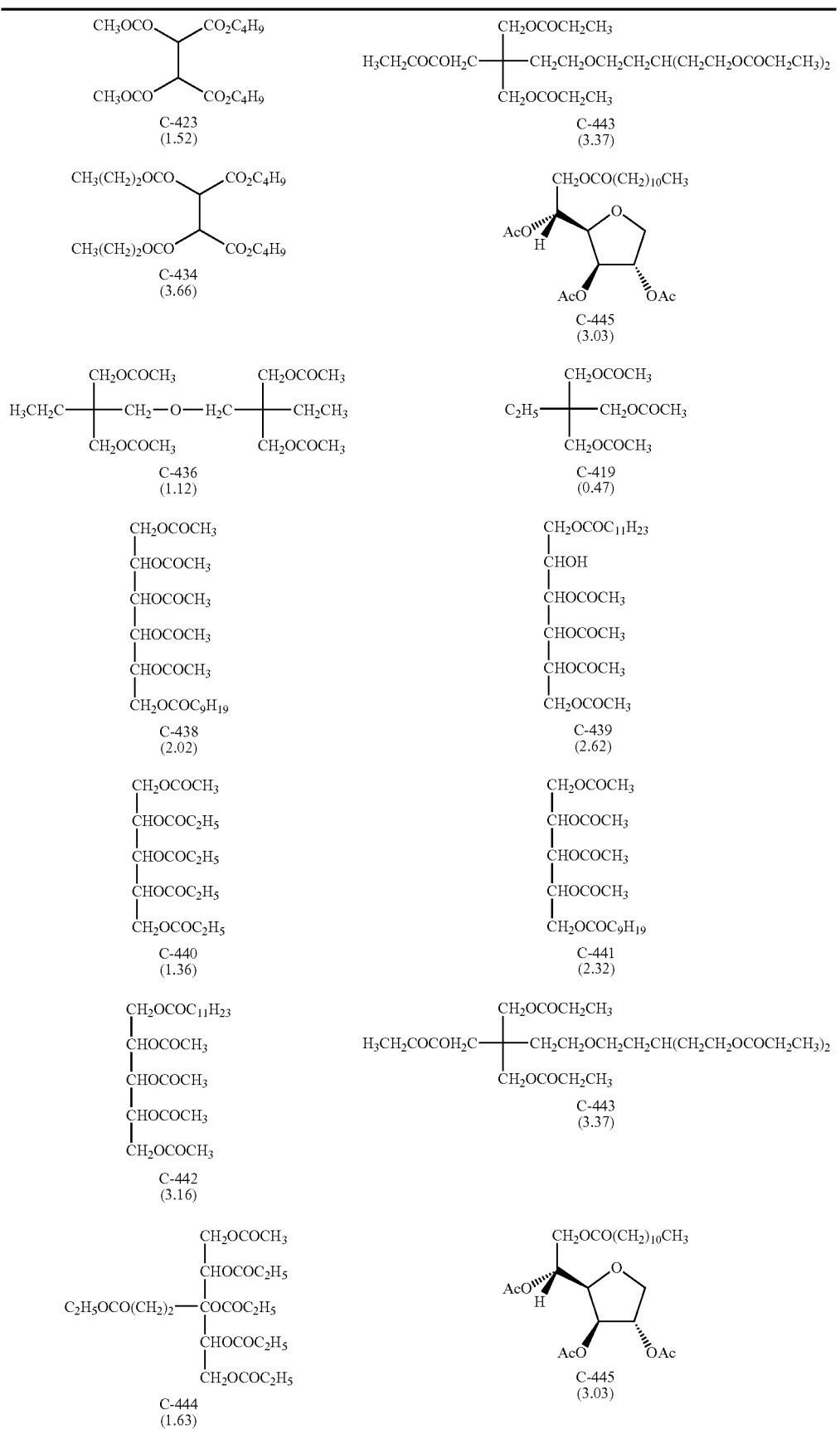

-continued

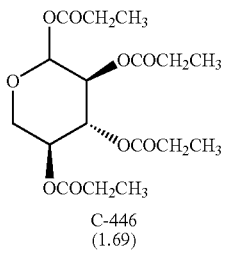

C-446
(1.69)

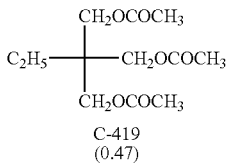

C-419
(0.47)

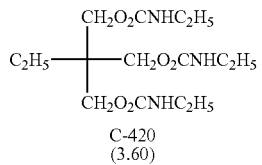

C-420
(3.60)

Compounds of formulae (13) and (14) are described below.

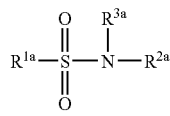 Formula (13)

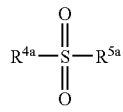 Formula (14)

In formula (13), $R^{1a}$ represents an alkyl group or an aryl group; $R^{2a}$ and $R^{3a}$ each independently represent a hydrogen atom, an alkyl group or an aryl group. Especially preferably, the number of all carbon atoms of $R^{1a}$, $R^{2a}$ and $R^{3a}$ is at least 10. In the formula (14), $R^{4a}$ and $R^{5a}$ each independently represent an alkyl group or an aryl group. The number of all carbon atoms of $R^{4a}$ and $R^{5a}$ is at least 10. The alkyl group and the aryl group may have a substituent For the substituent, preferred examples include a fluorine atom, an alkyl group, an aryl group, an alkoxy group, a sulfone group and a sulfonamido group; and more preferred examples include an alkyl group, an aryl group, an alkoxy group, a sulfone group and a sulfonamido group. The alkyl group may be straight, branched or cyclic, preferably having from 1 to 25 carbon atoms, more preferably from 6 to 25 carbon atoms, especially preferably from 6 to 20 carbon atoms (e.g., methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl, didecyl). The aryl group preferably has from 6 to 30 carbon atoms, more preferably from 6 to 24 carbon atoms (e.g., phenyl, biphenyl, terphenyl, naphthyl, binaphthyl, triphenylphenyl). Preferred examples of the compounds of formulae (13) and (14) are mentioned below, to which the invention should not be limited.

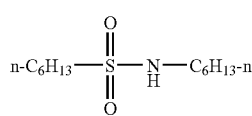

A-1

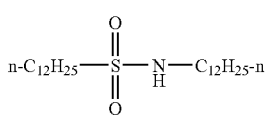

A-2

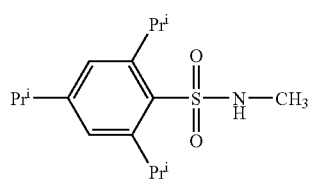

A-3

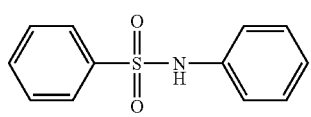

A-4

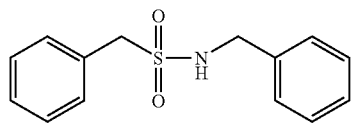

A-5

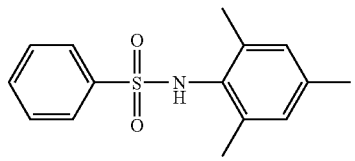

A-6

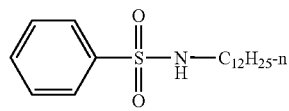

A-7

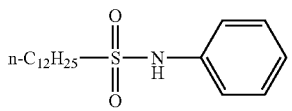

A-8

-continued
A-9
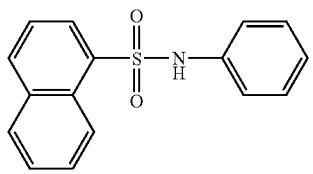
A-10
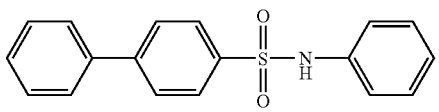
A-11
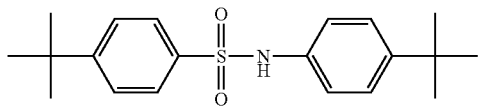
A-12
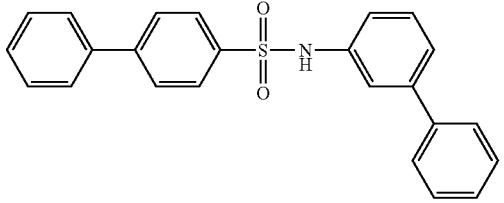
A-13
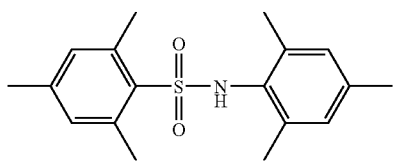
A-14
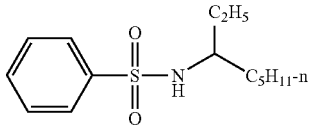
A-15
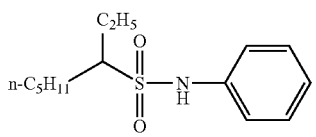
A-16
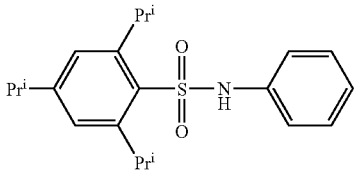
A-17
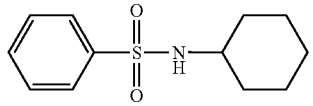
A-18
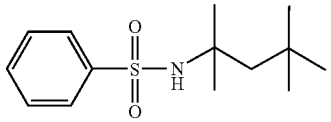
A-19
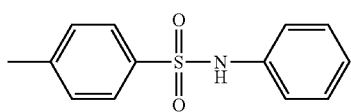
A-20
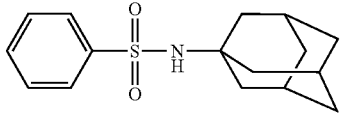
A-21
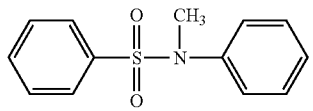
A-22
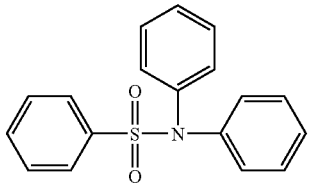
A-23
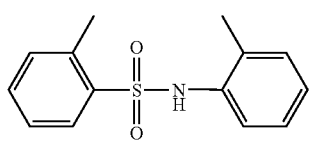
A-24
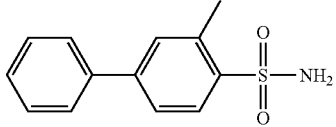
A-25
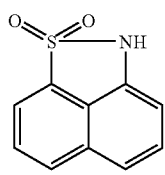
A-26
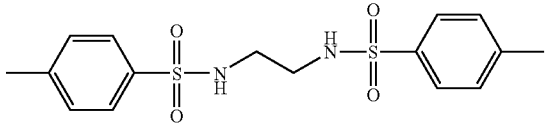

-continued
A-27
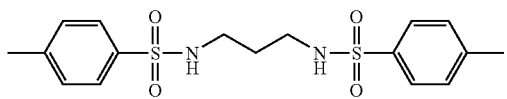
A-28
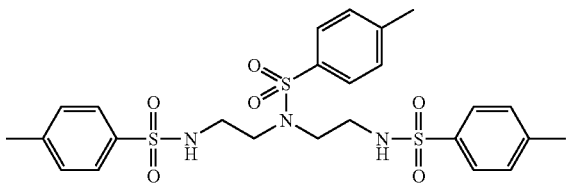
A-29
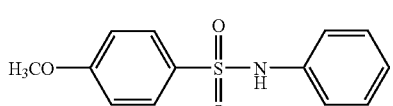
A-30
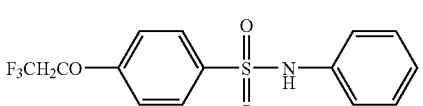
A-31
A-32
A-33
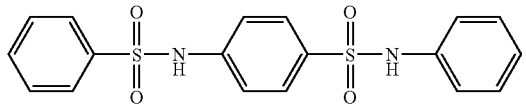
A-34
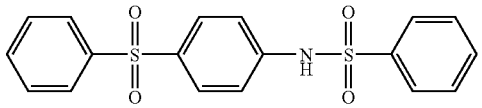
A-35
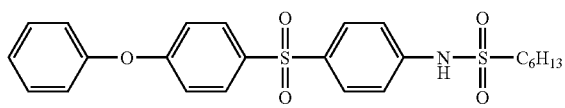
A-36
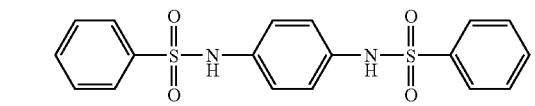
A-37
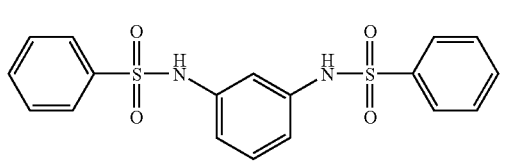
A-38
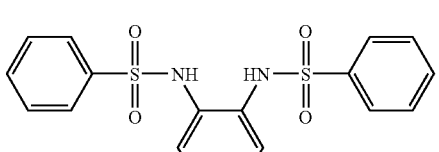
A-39
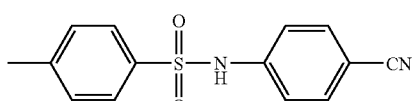
A-40
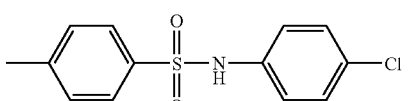
A-41
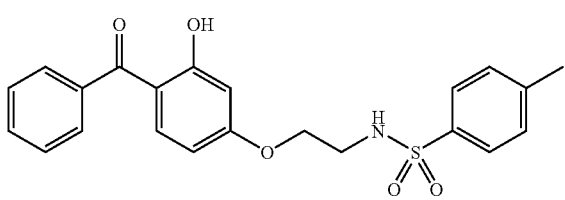
A-42
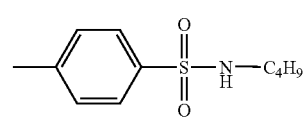
A-43
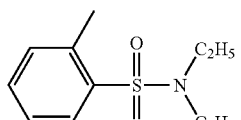
A-44
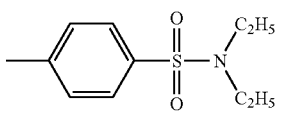
A-45
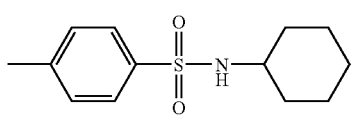
A-46
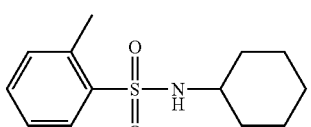

-continued

-continued
| | |
|---|---|
| B-15 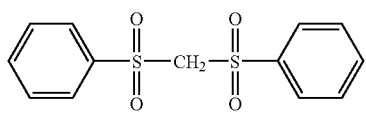 | B-16 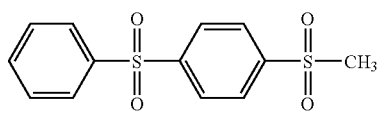 |
| B-17 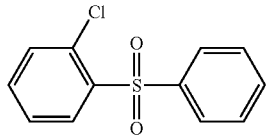 | B-18 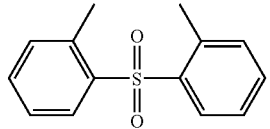 |
| B-19 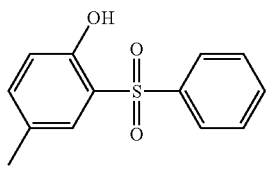 | B-20 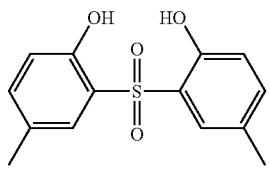 |
| B-21 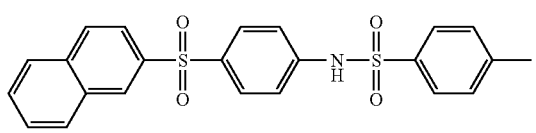 | B-22 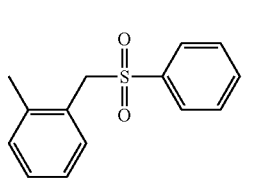 |
| B-23 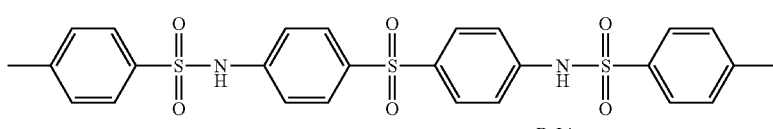 | |
| B-24 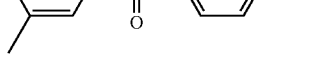 | B-25 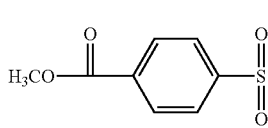 |
| B-26 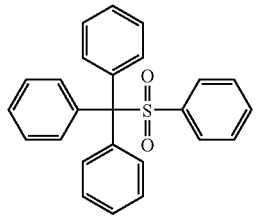 | B-27 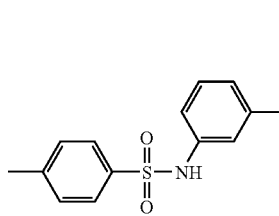 |
| B-28 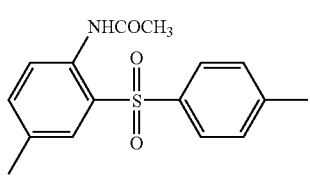 | B-29 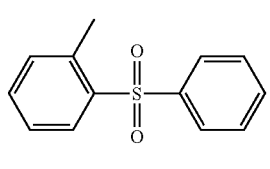 |
| B-30 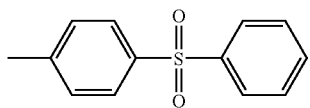 | B-31 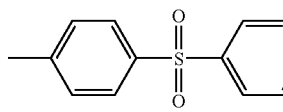 |
| B-32 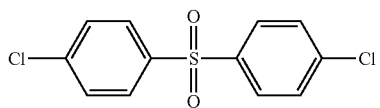 | B-33 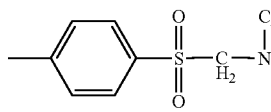 |

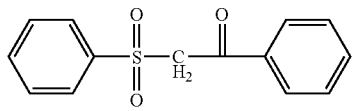
B-34

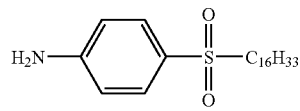
B-35

Compounds of formula (15) are described.

Formula (15)

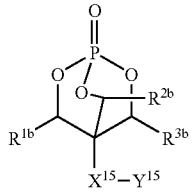

In formula (15), $R^{1b}$, $R^{2b}$ and $R^{3b}$ each independently represent a hydrogen atom or an alkyl group having from 1 to 5 carbon atoms (e.g., methyl, ethyl, propyl, isopropyl, butyl, amyl, isoamyl). More preferably, at least one of $R^{1b}$, $R^{2b}$ and $R^{3b}$ is an alkyl group having from 1 to 3 carbon atoms (e.g., methyl, ethyl, propyl, isopropyl). $X^{15}$ represents a divalent linking group to be formed of one or more groups selected from a single bond, —O—, —CO—, an alkylene group (preferably having from 1 to 6 carbon atoms, more preferably from 1 to 3 carbon atoms, e.g., methylene, ethylene, propylene), and an arylene group (preferably having from 6 to 24 carbon atoms, more preferably from 6 to 12 carbon atoms, e.g., phenylene, biphenylene, naphthylene), more preferably a divalent linking group to be formed of one or more groups selected from —O—, an alkylene group and an arylene group. $Y^{15}$ represents a hydrogen atom, an alkyl group (preferably having from 2 to 25 carbon atoms, more preferably from 2 to 20 carbon atoms, e.g., ethyl, isopropyl, t-butyl, hexyl, 2-ethylhexyl, t-octyl, dodecyl, cyclohexyl, dicyclohexyl, adamantyl), an aryl group (preferably having from 6 to 24 carbon atoms, more preferably from 6 to 18 carbon atoms, e.g., phenyl, biphenyl, terphenyl, naphthyl) or an aralkyl group (preferably having from 7 to 30 carbon atoms, more preferably from to 20 carbon atoms, e.g., benzyl, cresyl, t-butylphenyl, diphenylmethyl, triphenylmethyl), more preferably from an alkyl group, an aryl group or an aralkyl group. Regarding the combination of —$X^{15}$—$Y^{15}$, it is desirable that the number of all carbon atoms of —$X^{15}$—$Y^{15}$ is from 0 to 40, more preferably from 1 to 30, much more preferably from 1 to 25.

Preferred examples of the compounds of formula (15) are mentioned below, to which, however, the invention should not be limited.

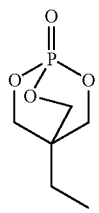
PL-1

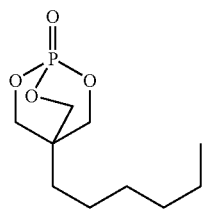
PL-2

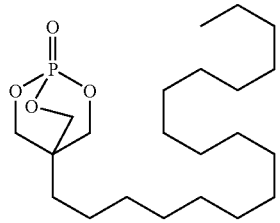
PL-3

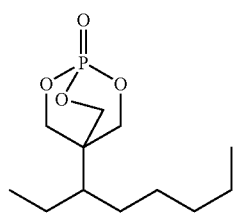
PL-4

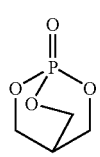
PL-5

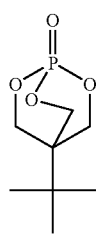
PL-6

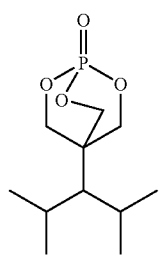
PL-7

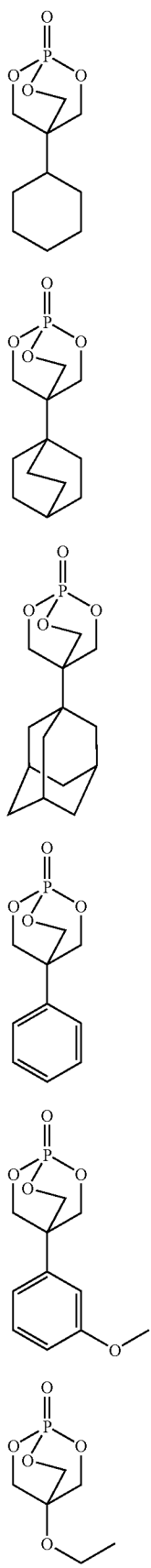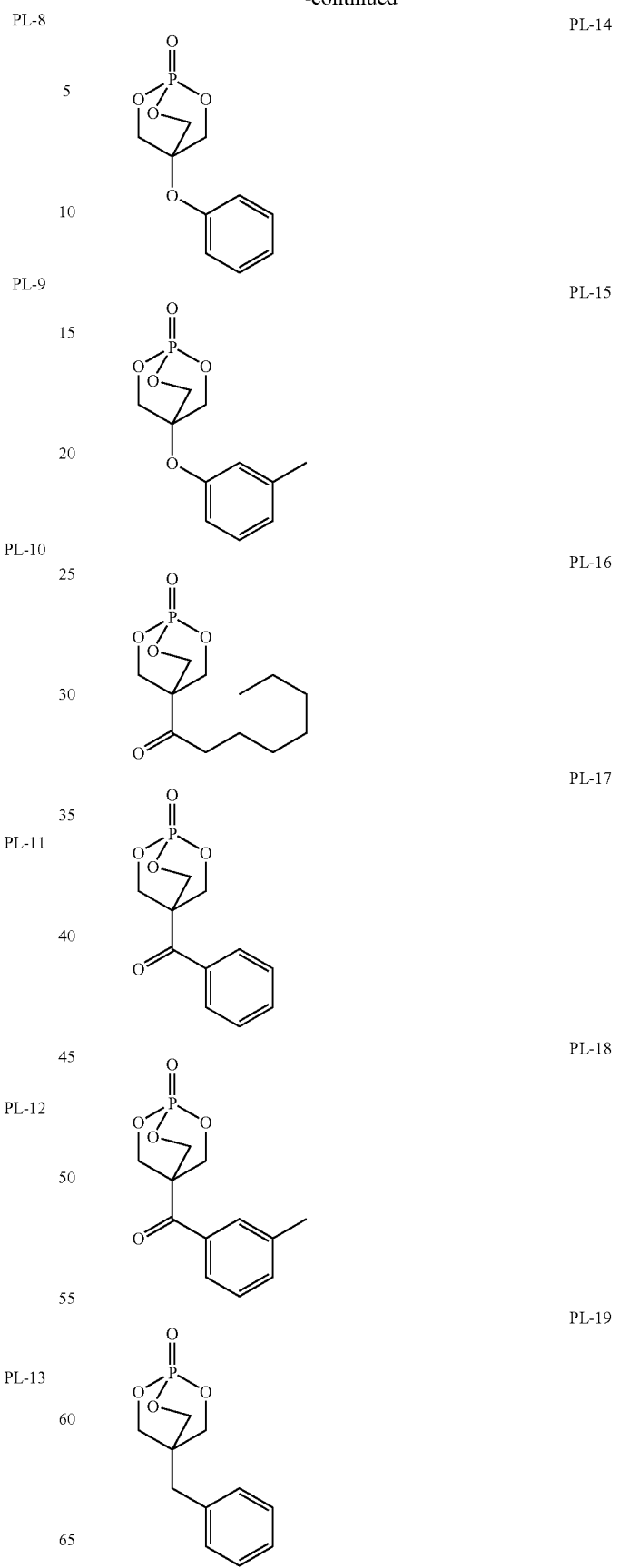

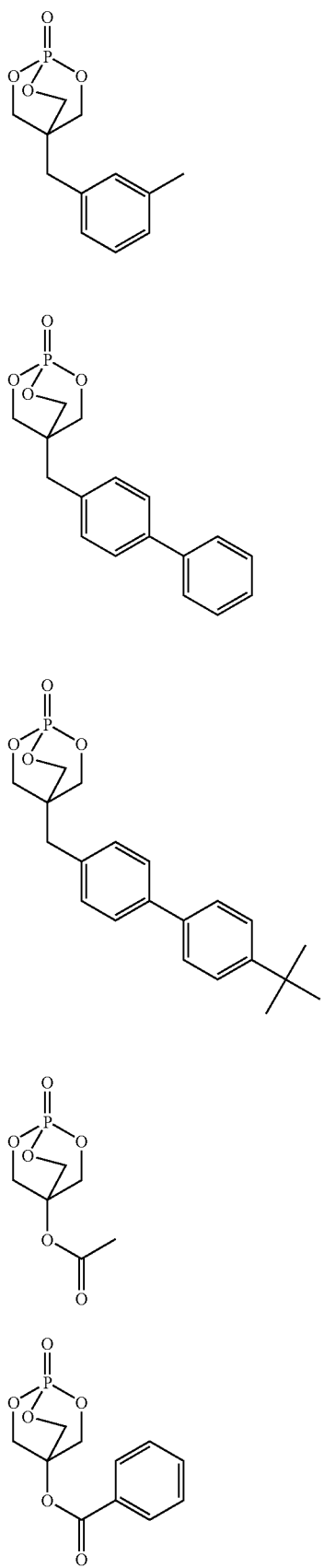
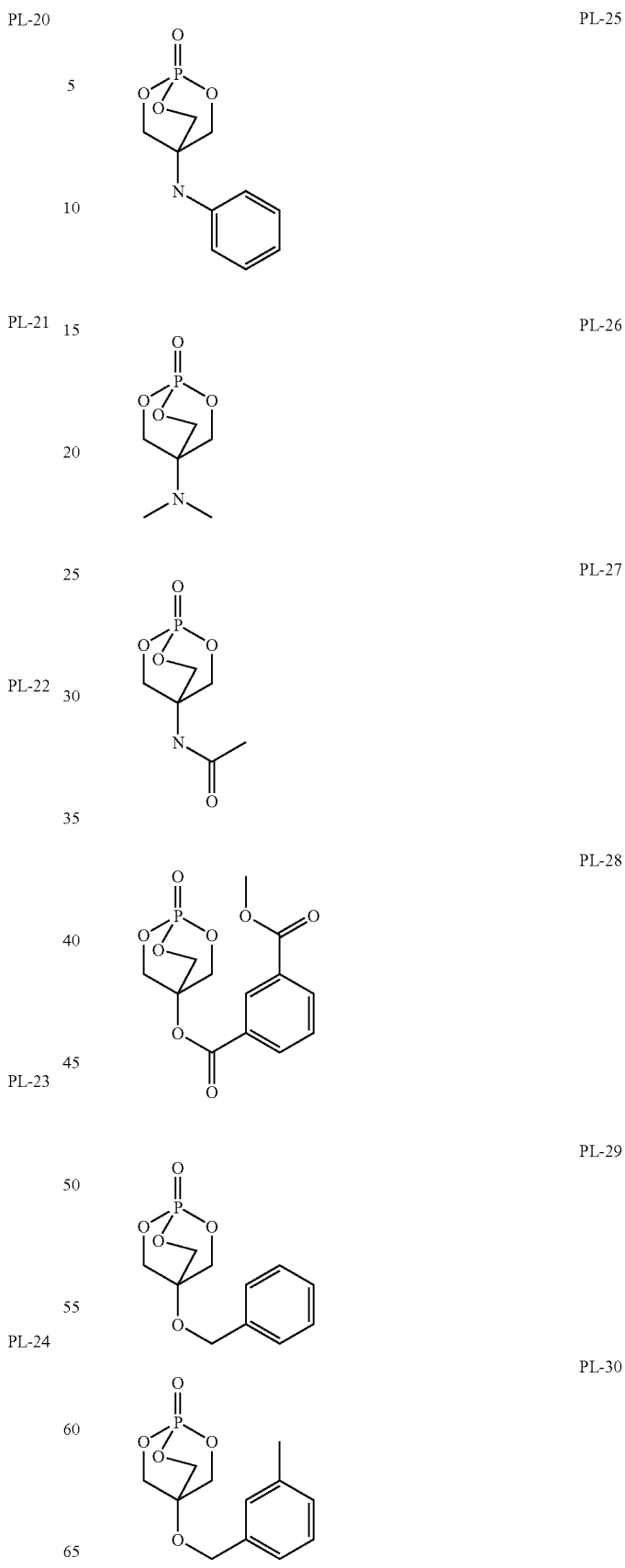

PL-31
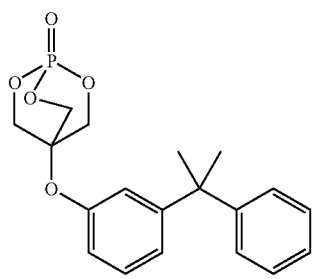
PL-32
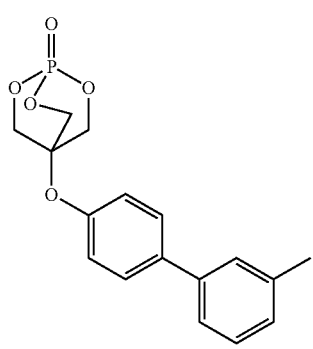
PL-33
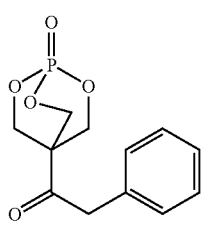
PL-34
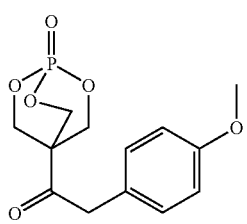
PL-35
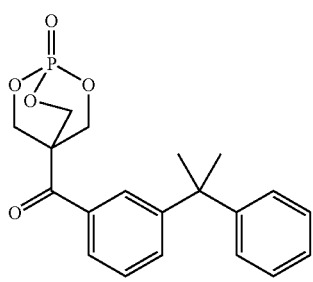
PL-36
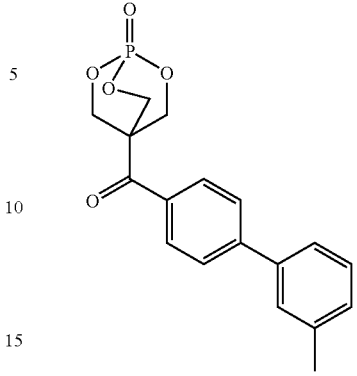
PL-37
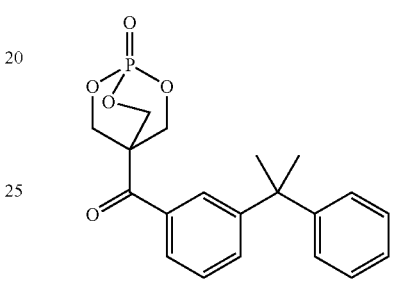
PL-38
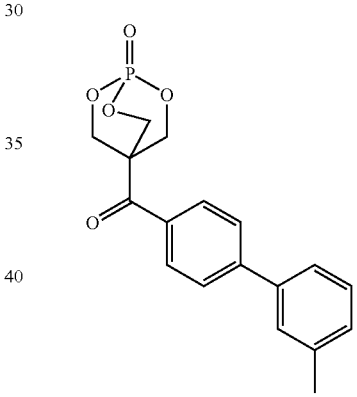
PL-39
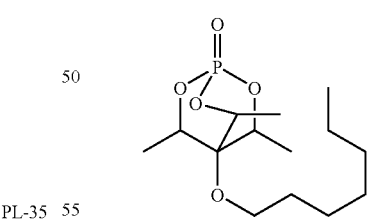
PL-40
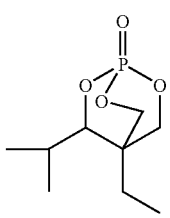

-continued

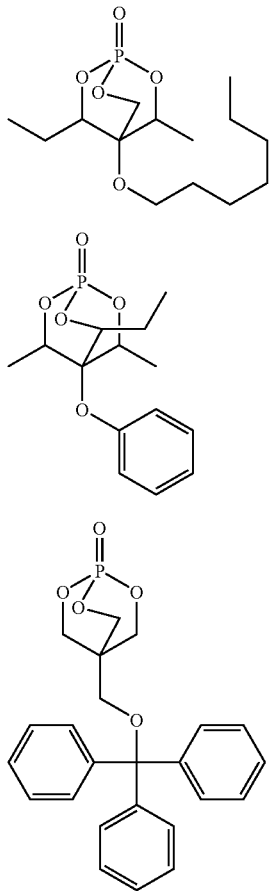

PL-41

PL-42

PL-43

Compounds of formula (16) are described.

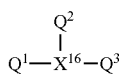

Formula (16)

In the formula, $Q^1$, $Q^2$ and $Q^3$ each independently represent a 5- or 6-membered ring, which may be a hydrocarbon ring or a hetero-ring. The ring may be either a monocyclic ring or a condensed ring with any other ring. The hydrocarbon ring is preferably a substituted or unsubstituted cyclohexane ring, a substituted or unsubstituted cyclopentane ring, or an aromatic hydrocarbon ring, more preferably an aromatic hydrocarbon ring. The hetero-ring is preferably a 5- or 6-membered ring containing at least any one of oxygen, nitrogen and sulfur atoms. The hetero-ring is more preferably an aromatic hetero-ring containing at least one of oxygen, nitrogen and sulfur atoms.

Preferably, $Q^1$, $Q^2$ and $Q^3$ are an aromatic hydrocarbon ring or an aromatic hetero-ring. The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably having from 6 to 12 carbon atoms. Still more preferred is a benzene ring.

The aromatic hetero-ring preferably contains any of oxygen, nitrogen and sulfur atoms. Examples of the hetero-ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole and tetrazaindene. For the aromatic hetero-ring, preferred are pyridine, triazine and quinoline. More preferably, $Q^1$, $Q^2$ and $Q^3$ are an aromatic hydrocarbon ring, even more preferably a benzene ring. $Q^1$, $Q^2$ and $Q^3$ may have a substituent. Examples of the substituent are those of substituent T to be mentioned hereinunder.

$X^{16}$ represents B, C—R (R is a hydrogen atom or a substituent), N, P or P=O. $X^{16}$ is preferably B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom (e.g., fluorine atom, chlorine atom, bromine atom, iodine atom), or a carboxyl group, more preferably an aryl group, an alkoxy group, an aryloxy group, a hydroxy group, or a halogen atom, even more preferably an alkoxy group or a hydroxyl group, still more preferably a hydroxy group), or N. More preferably, $X^{16}$ is C—R or N, even more preferably C—R.

Compounds of formula (17) are described. Formula (17) is one preferred embodiment of formula (16) mentioned above.

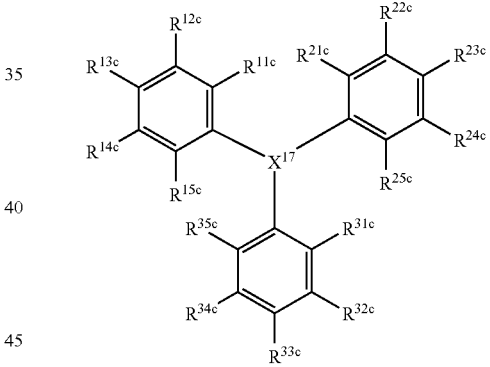

Formula (17)

In the formula, $X^{17}$ represents B, C—R (R is a hydrogen atom or a substituent), N, P, or P=O. Preferably, $X^{17}$ is B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom (e.g., fluorine atom, chlorine atom, bromine atom, iodine atom), or a carboxyl group, more preferably an aryl group, an alkoxy group, an aryloxy group, a hydroxy group, or a halogen atom, even more preferably an alkoxy group or a hydroxyl group, still more preferably a hydroxy group), N, or P=O. More preferably, $X^{16}$ is C—R or N, even more preferably C—R.

$R^{11c}$, $R^{12c}$, $R^{13c}$, $R^{14c}$, $R^{15c}$, $R^{21c}$, $R^{22c}$, $R^{23c}$, $R^{24c}$, $R^{25c}$, $R^{31c}$, $R^{32c}$, $R^{33c}$, $R^{34c}$ and $R^{35c}$ each represent a hydrogen atom or a substituent. For the substituent, referred to are those of the substituent T to be mentioned hereinunder. Preferably, $R^{11c}$, $R^{12c}$, $R^{13c}$, $R^{14c}$, $R^{15c}$, $R^{16c}$, $R^{22c}$, $R^{23c}$, $R^{24c}$, $R^{25c}$, $R^{31c}$, $R^{32c}$, $R^{33c}$, $R^{34c}$ and $R^{35c}$ each are an alkyl group, an alkenyl group, alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoramido group, a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and having, for example, any of nitrogen, oxygen and sulfur atoms as the hetero atom, e.g., imidazolyl, pyridyl, quinolyl, furyl, piperidyl, morpholino, benzoxazolyl, benzimidazolyl, benzothiazolyl), or a silyl group, more preferably an alkyl group, an aryl group, a substituted or unsubstituted amino group, an alkoxy group or an aryloxy group, even more preferably an alkyl group, an aryl group or an alkoxy group.

These substituents may be further substituted. When the compound has two or more substituents, then they may be the same or different. If possible, the substituents may bond to each other to form a ring.

The substituent T is described below. The substituent T includes, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl) an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenoxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atom, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group (preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and having, for example, any of nitrogen, oxygen and sulfur atoms as the hetero atom, concretely, for example, imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. When the compound has two or more substituents, they may be the same or different. If possible, the substituents may bond to each other to form a ring.

Examples of the compounds of formulae (16) and (17) are mentioned below, to which, however, the invention should not be limited.

D-1 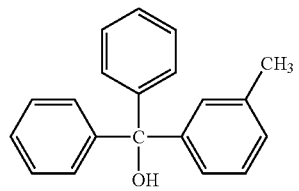
D-2 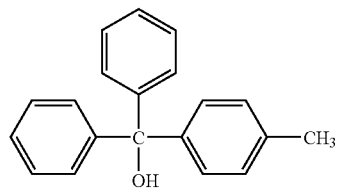
D-3 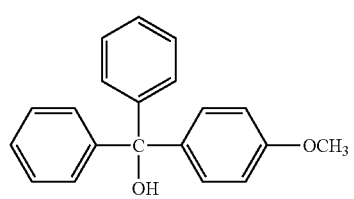
D-4 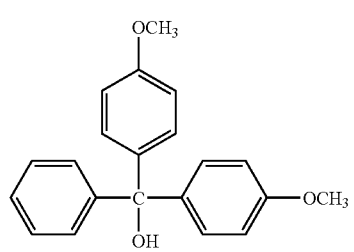
D-5 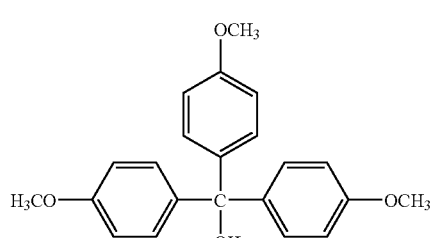
D-6 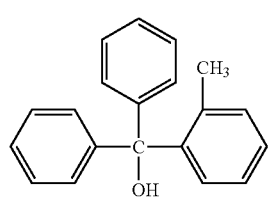
D-7 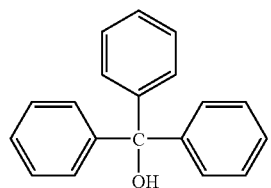
-continued
D-8 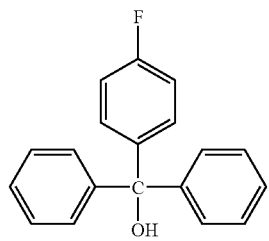
D-9 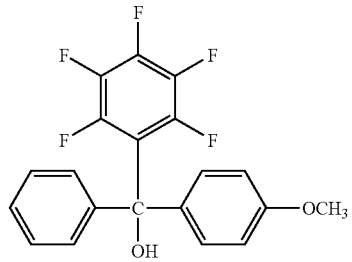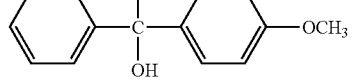
D-10 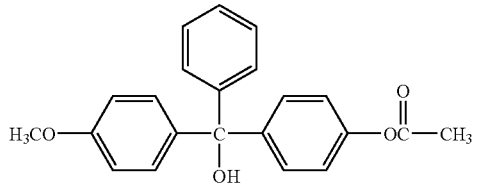
D-11 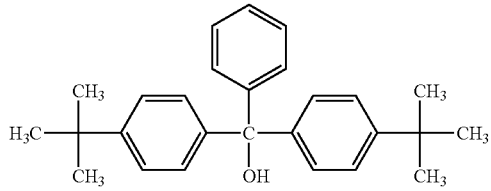
D-12 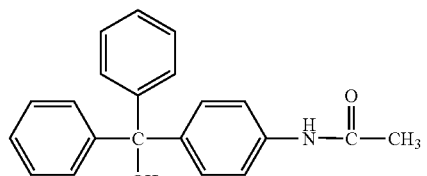
D-13 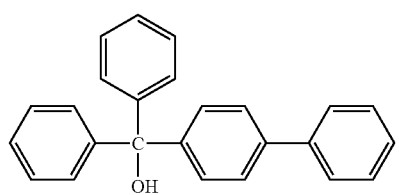
D-14 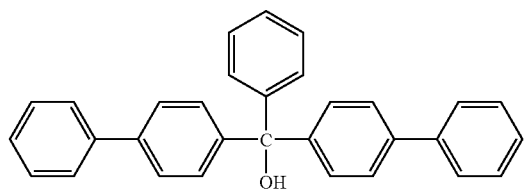

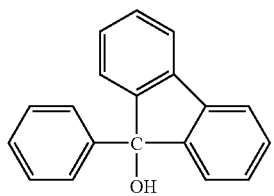
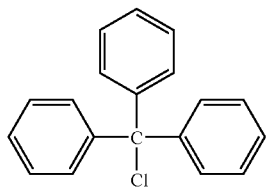
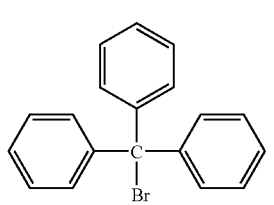
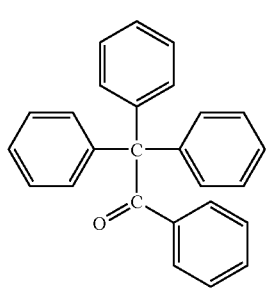
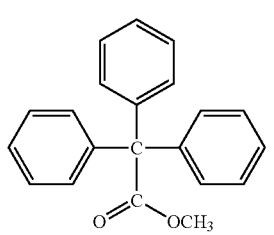
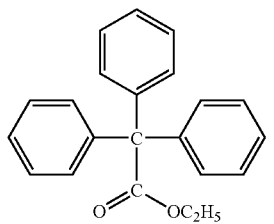
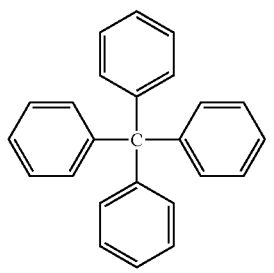
D-15
D-16
D-17
D-18
D-19
D-20
D-21
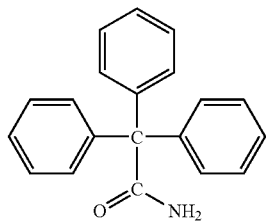
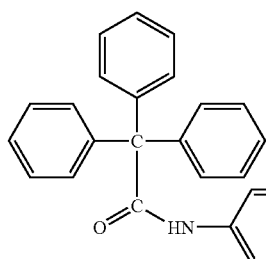
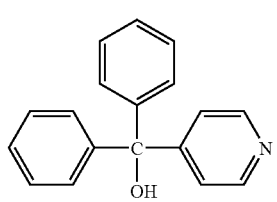
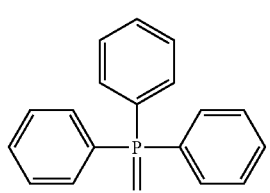
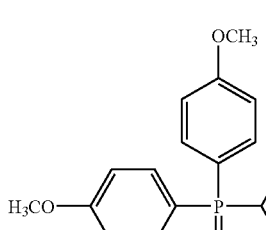
D-22
D-23
D-24
E-1
E-2
E-3
E-4

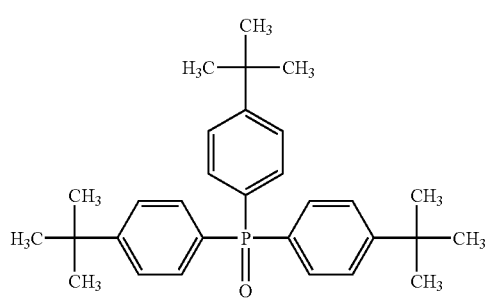 E-5
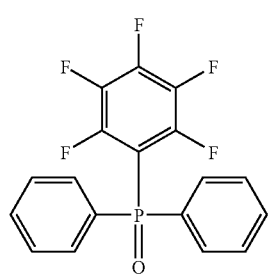 E-6
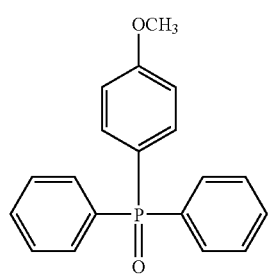 E-7
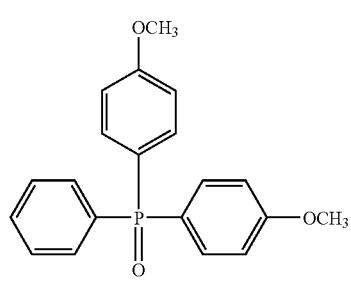 E-8
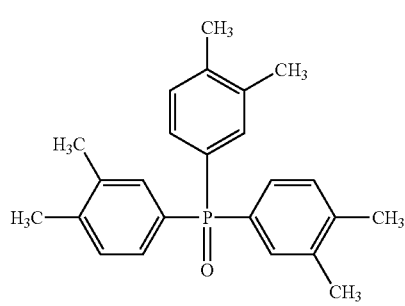 E-9
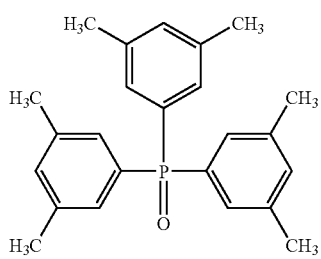 E-10
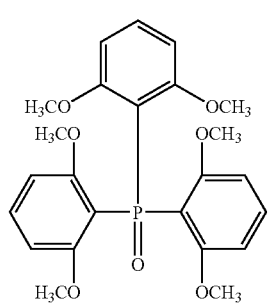 E-11
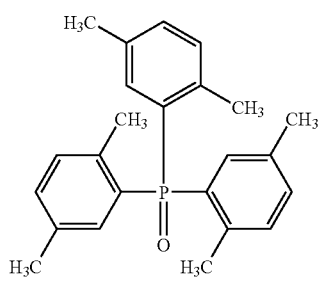 E-12
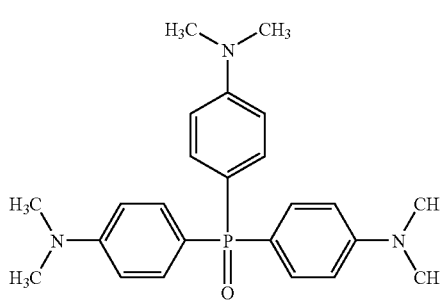 E-13
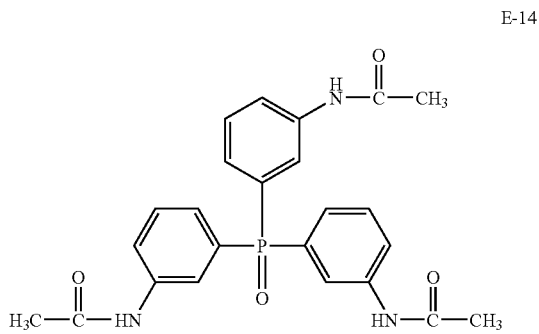 E-14

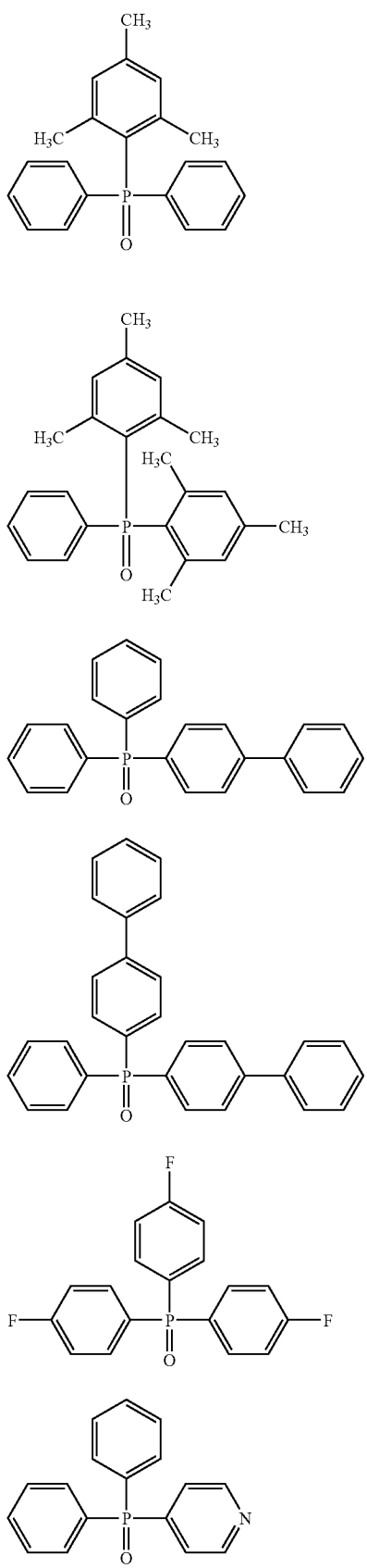
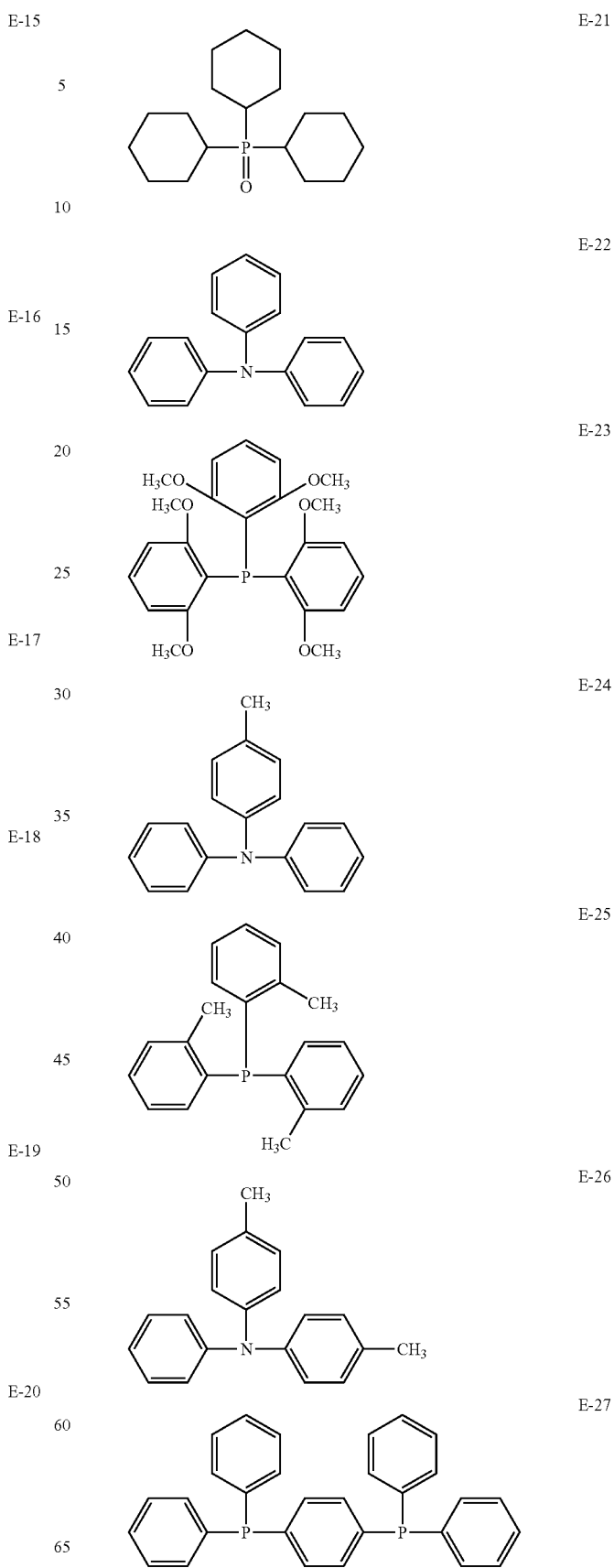

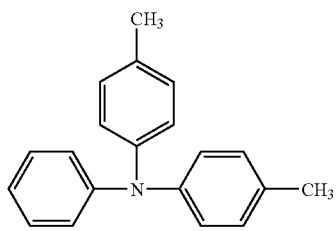
E-28

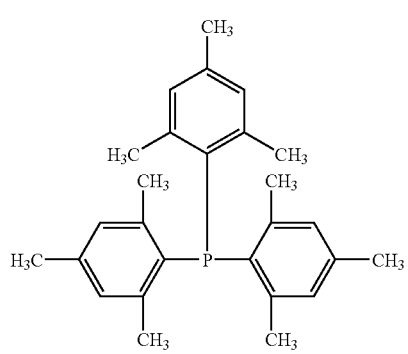
E-29

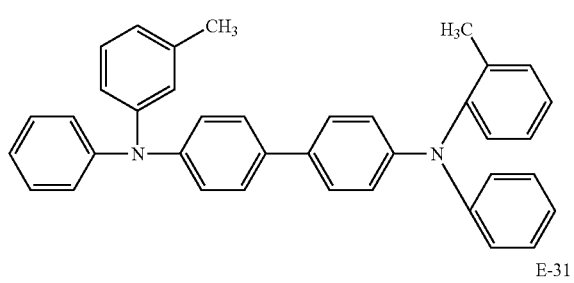
E-30

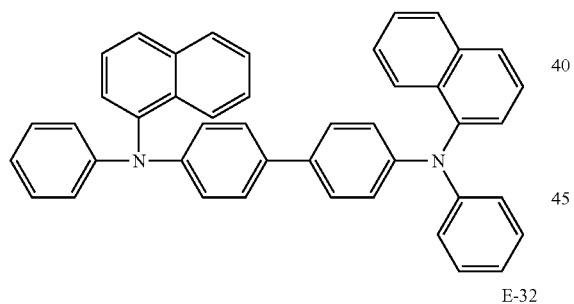
E-31

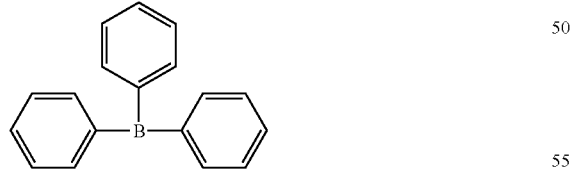
E-32

Formula (18)

In the formula (18), $R^{1d}$ represents an alkyl group or an aryl group; $R^{2d}$ and $R^{3d}$ each independently represent a hydrogen atom, an alkyl group or an aryl group. The alkyl group and the aryl group may have a substituent.

Of the compounds of formula (18), preferred are those of the following formula (19).

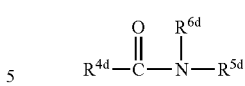
Formula (19)

In formula (19), $R^{4d}$, $R^{5d}$ and $R^{6d}$ each independently represent an alkyl group or an aryl group. The alkyl group may be straight, branched or cyclic, preferably having from 1 to 20 carbon atoms, more preferably from 1 to 15 carbon atoms, most preferably from 1 to 12 carbon atoms. The cyclic alkyl group is especially preferably a cyclohexyl group. The aryl group preferably has from 6 to 36 carbon atoms, more preferably from 6 to 24 carbon atoms.

The alkyl group and the aryl group may have a substituent. For the substituent, preferred are a halogen atom (e.g., chlorine, bromine, fluorine, iodine), an alkyl group, an aryl group, an alkoxy group, an aryloxy group, an acyl group, an alkoxycarbonyl group, an aryloxycarbonyl group, an acyloxy group, a sulfonylamino group, a hydroxy group, a cyano group, an amino group and an acylamino group; more preferred are a halogen atom, an alkyl group, an aryl group, an alkoxy group, an aryloxy group, a sulfonylamino group and an acylamino group; even more preferred are an alkyl group, an aryl group, a sulfonylamino group and an acylamino group.

Preferred examples of the compounds of formulae (18) and (19) are mentioned below, to which, however, the invention should not be limited.

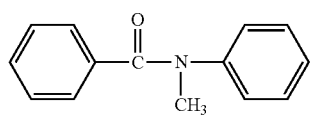
FA-1

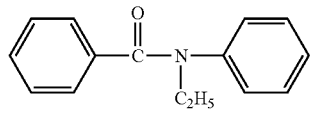
FA-2

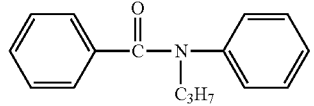
FA-3

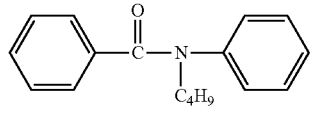
FA-4

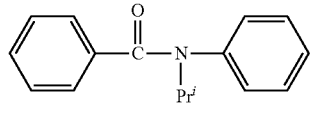
FA-5

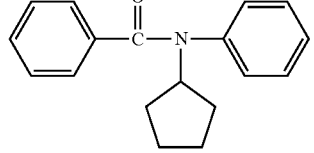
FA-6

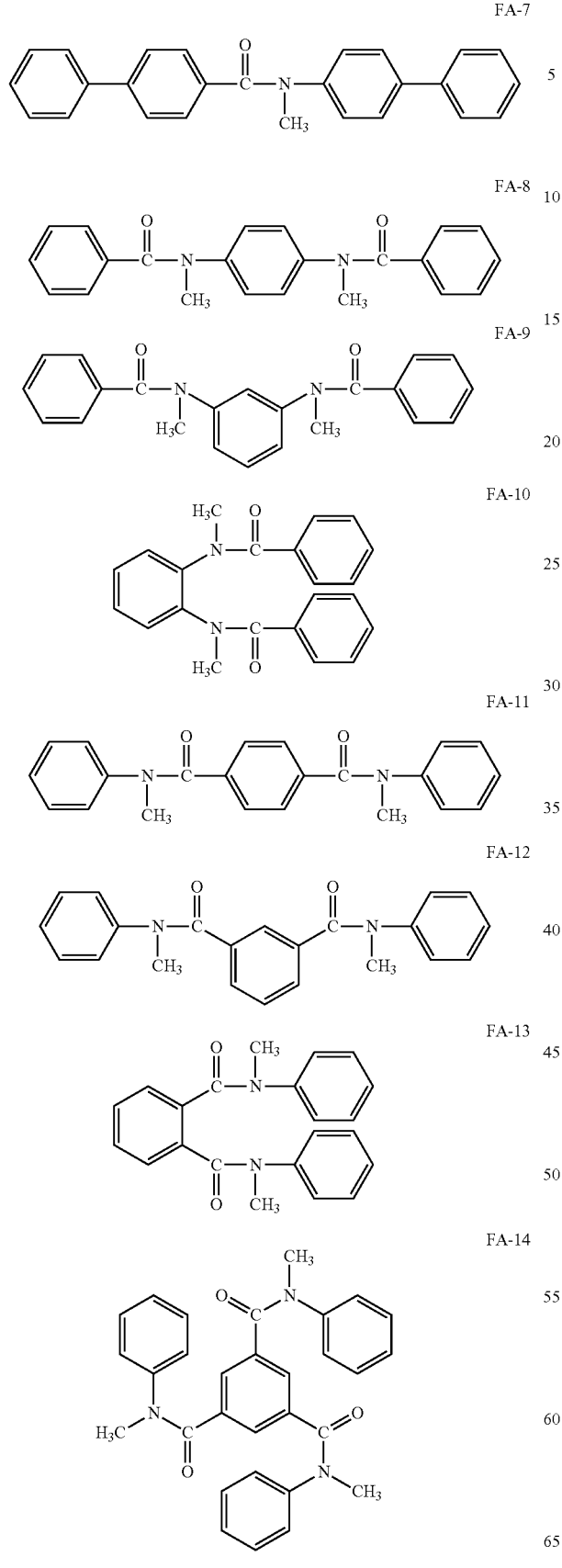
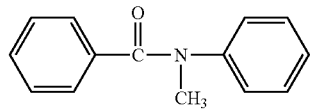
FA-1
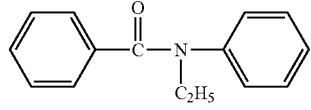
FA-2
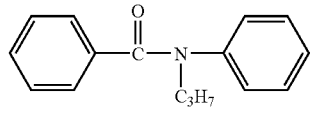
FA-3
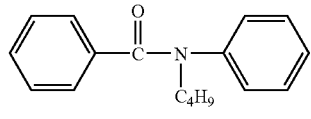
FA-4
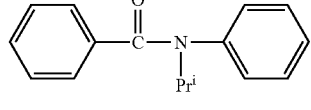
FA-5
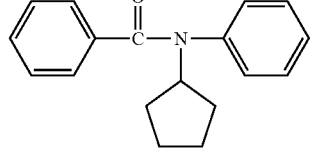
FA-6
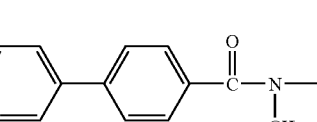
FA-7
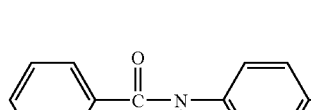
FA-8
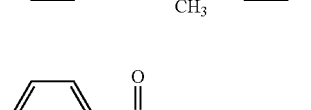
FA-9
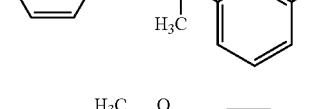
FA-10
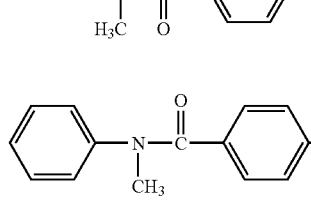
FA-11

FA-12
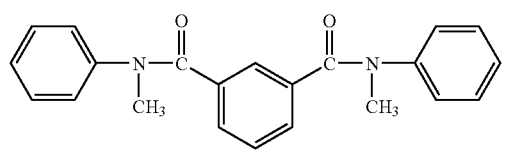
FA-13
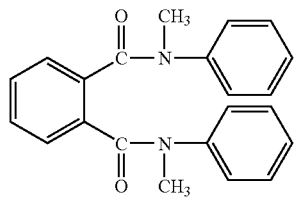
FA-14
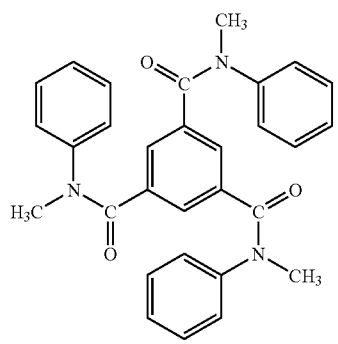
FA-15
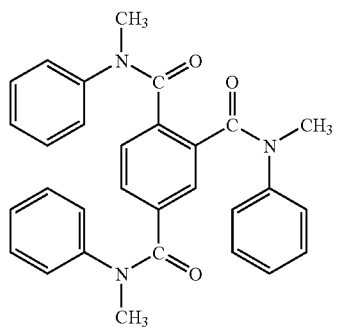
FA-16
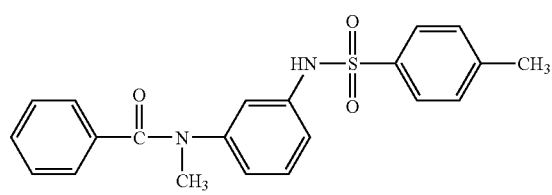
FA-17
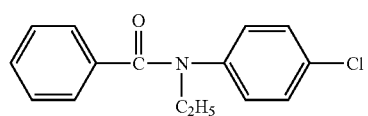
FA-18
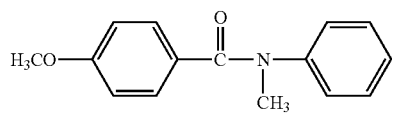
FA-19
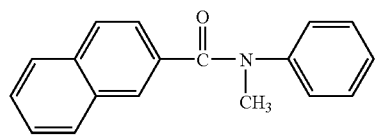
FA-20
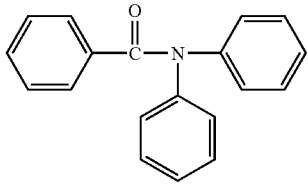
FA-21
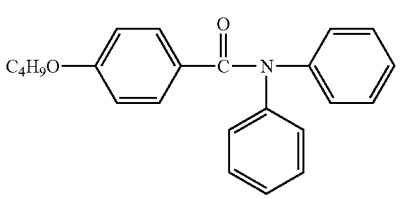
FA-22
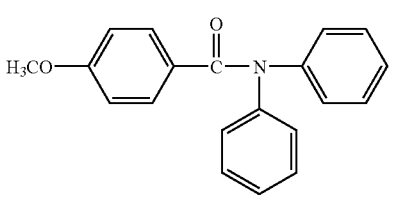
FA-23
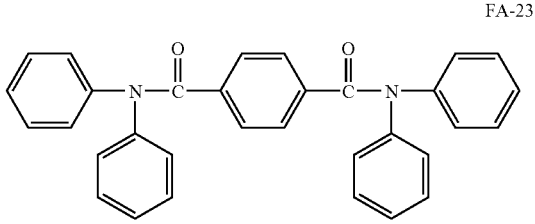
FA-24
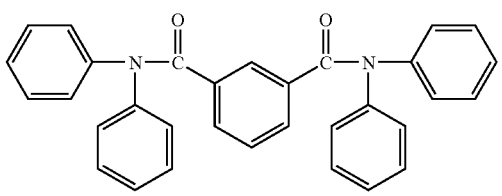
FA-25
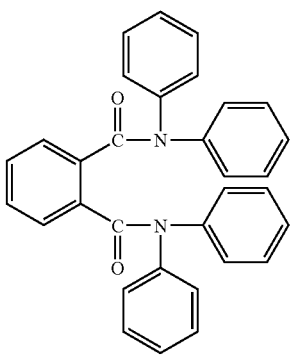

FA-26
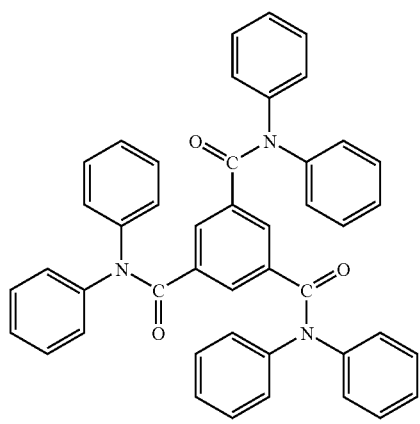
FA-27
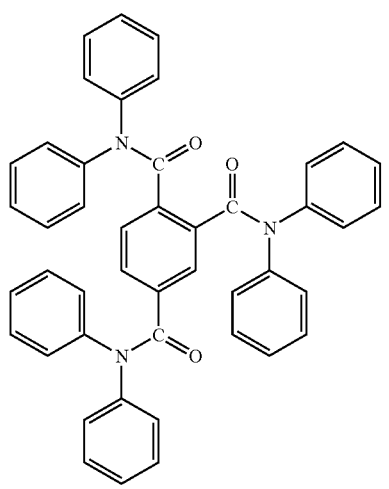
FA-28
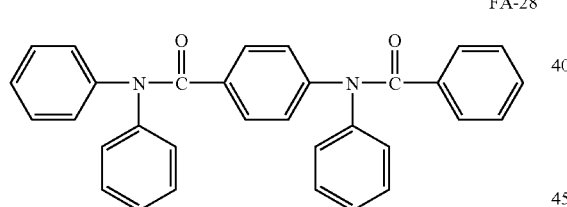
FB-1
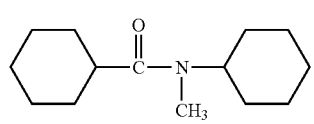
FB-2
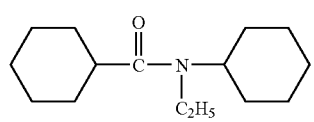
FB-3
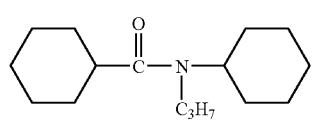
FB-4
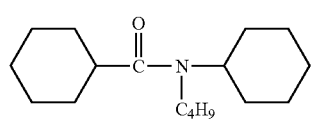
FB-5
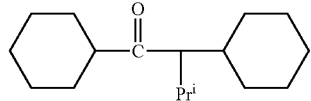
FB-6
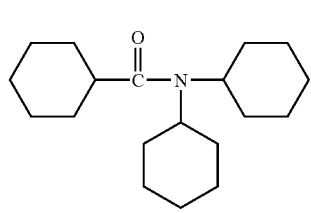
FB-7
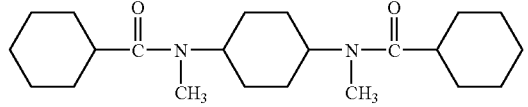
FB-8
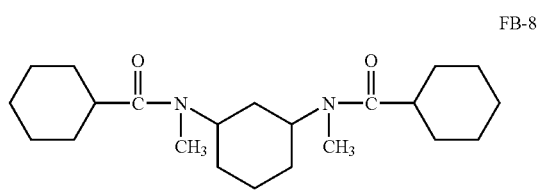
FB-9
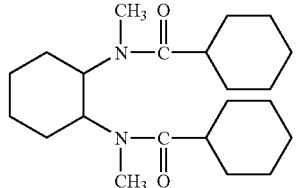
FB-10
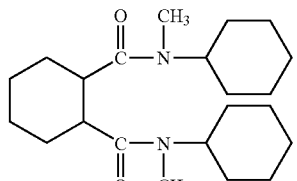
FB-11
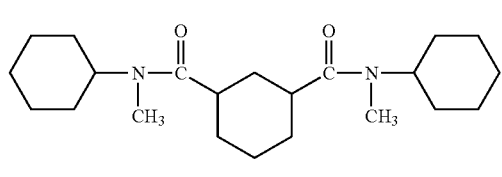
FB-12
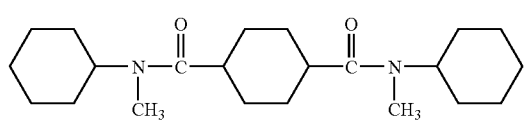

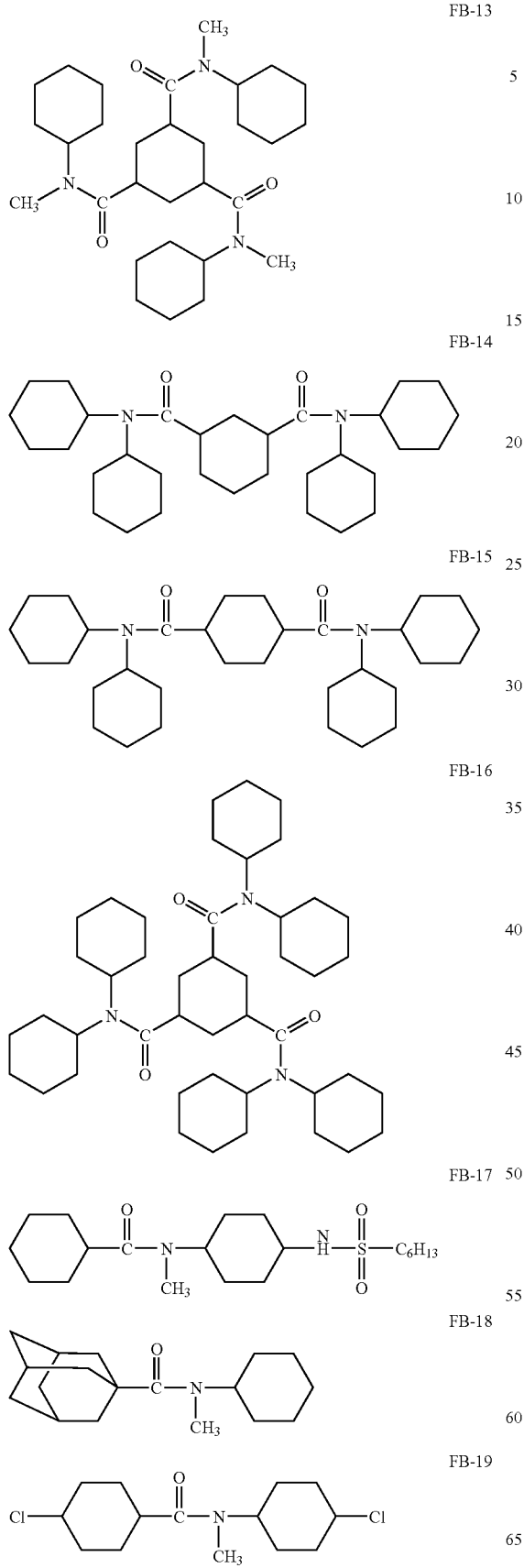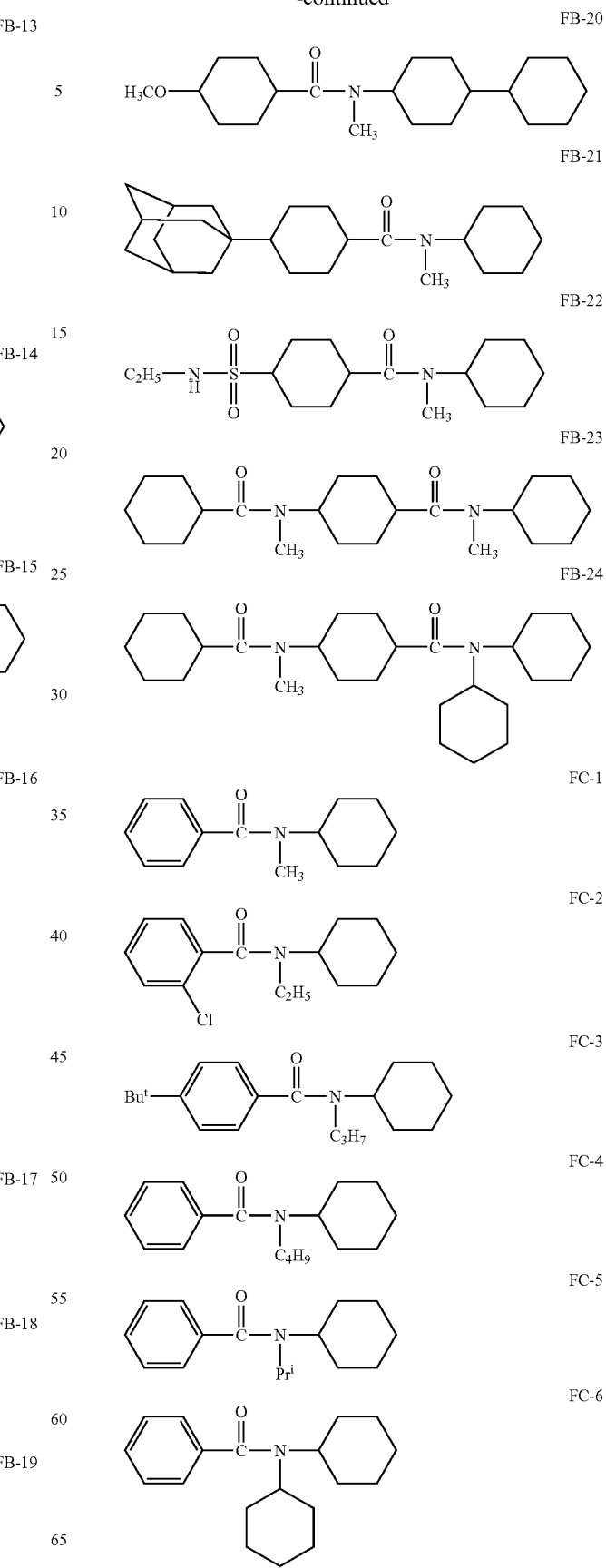

-continued
FC-7
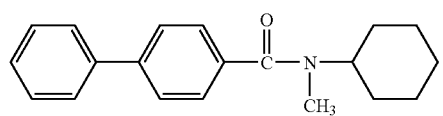
FC-8
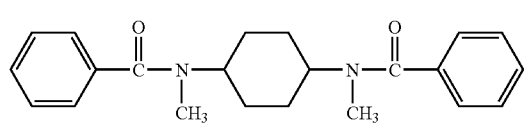
FC-9
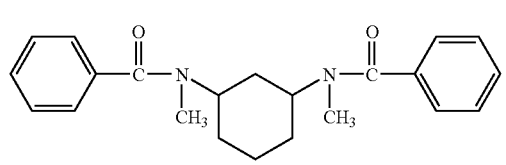
FC-10
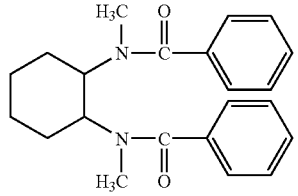
FC-11
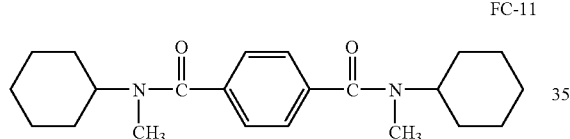
FC-12
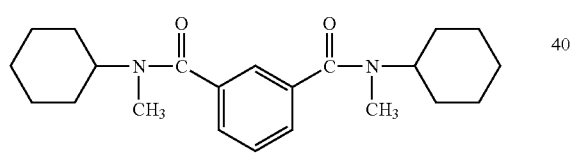
FC-13
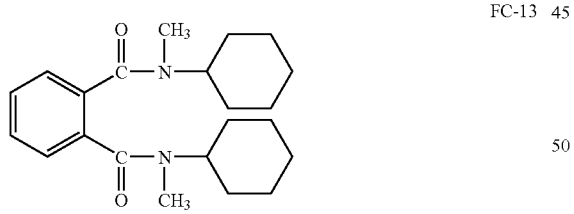
FC-14
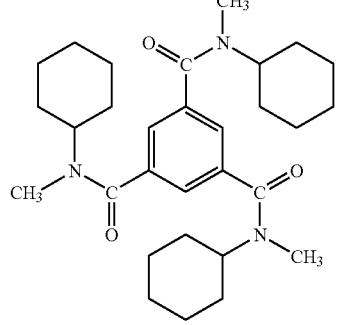
-continued
FC-15
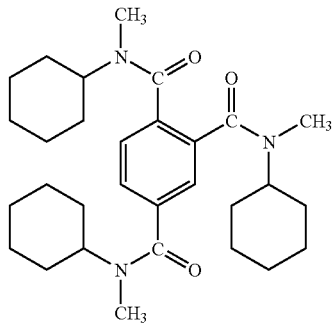
FC-16
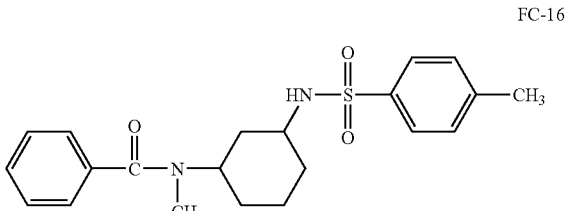
FC-17
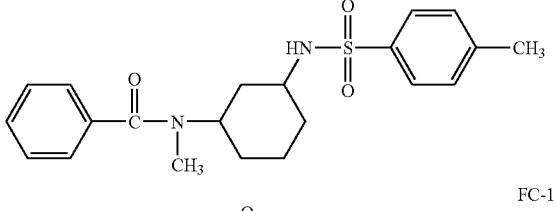
FC-18
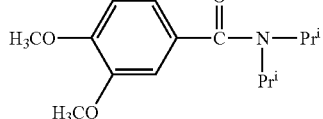
CA-19
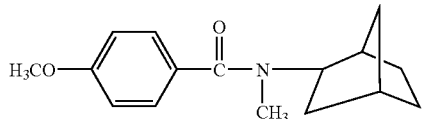
FC-20
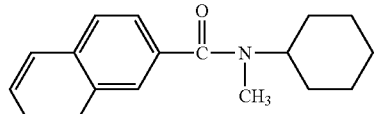
FC-21
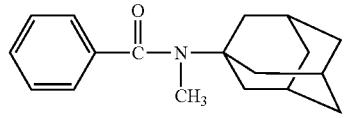
FC-22
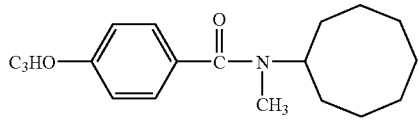
FC-23
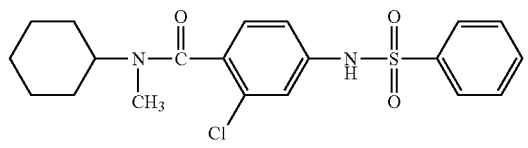

FC-24
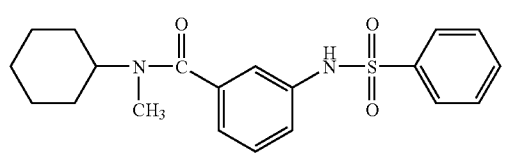
FC-25
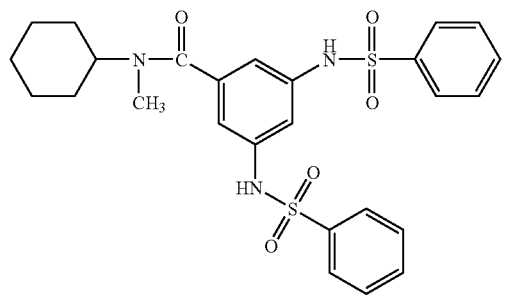
FD-1
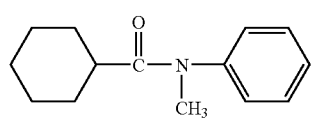
FD-2
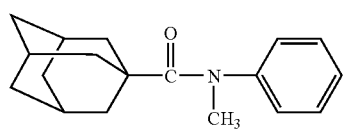
FD-3
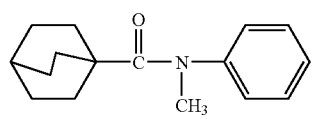
FD-4
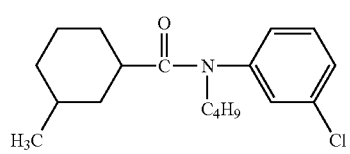
FD-5
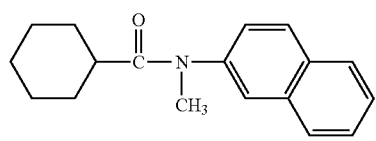
FD-6
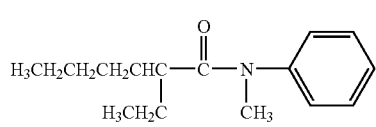
FD-7
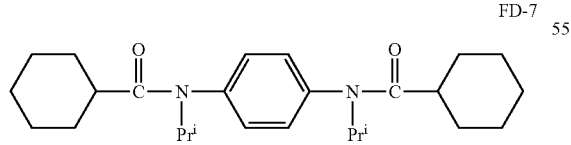
FD-8
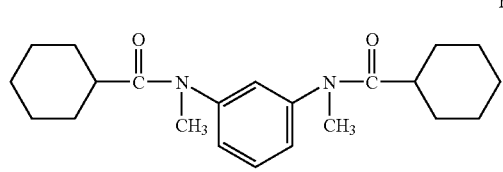
FD-9
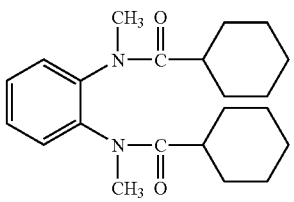
FD-10
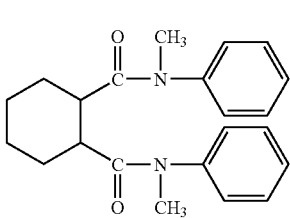
FD-11
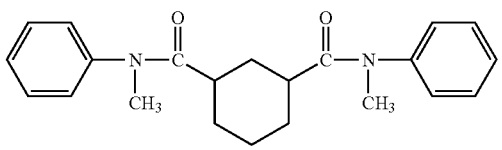
FD-12
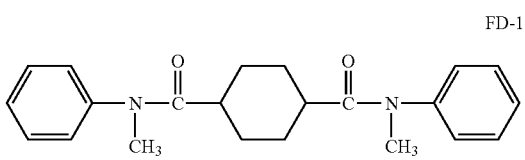
FD-13
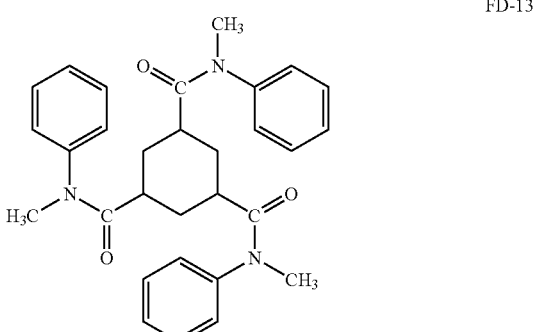
FD-14
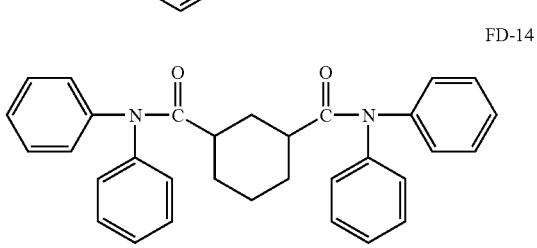
FD-15
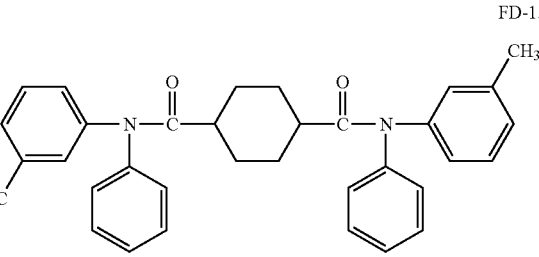

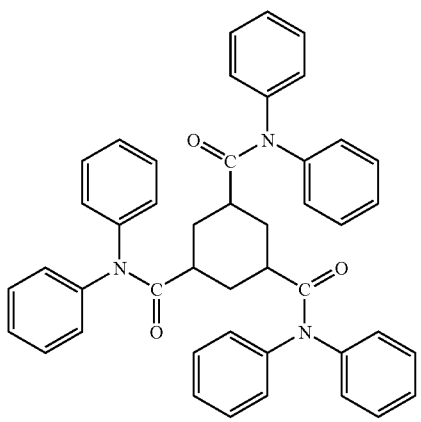 FD-16

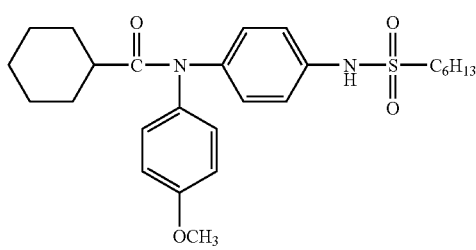 FD-17

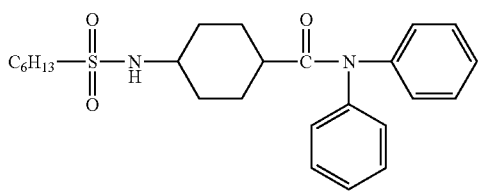 FD-18

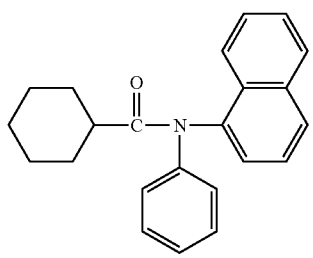 FD-19

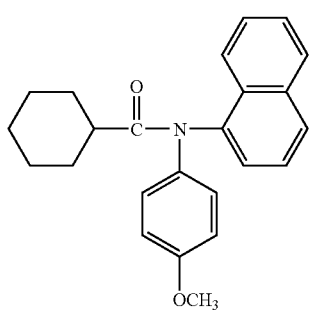 FD-20

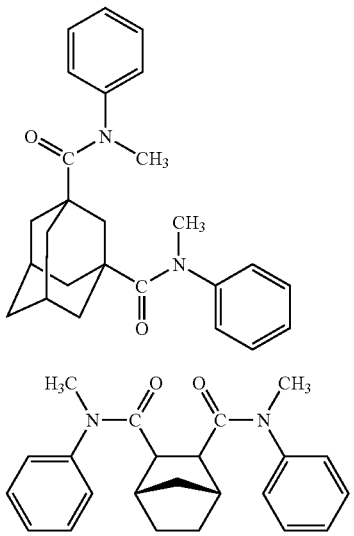 FD-21

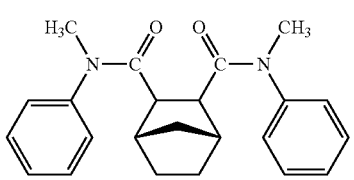 FD-22

Other than the compounds of formulae (1) to (19) mentioned above, there are known some compounds capable of reducing the optical anisotropy of transparent films. For example, when any of polyalcohol ester compounds, carboxylate compounds, polycyclic carboxylic acid compounds or bisphenol derivatives having an octanol-water partition coefficient (log P value) of from 0 to 7 is added to polymer, then the optical anisotropy of the polymer films may be lowered.

Examples of polyalcohol ester compounds, carboxylate compounds, polycyclic carboxylic acid compounds and bisphenol derivatives having an octanol-water partition coefficient (log P value) of from 0 to 7 are mentioned below.

(Polyalcohol Ester Compounds)

The polyalcohol ester for use in the invention is an ester of a di- or higher poly-alcohol with one or more monocarboxylic acids. Examples of the polyalcohol ester compounds are mentioned below, to which, however, the invention should not be limited.

(Polyalcohol)

Preferred examples of polyalcohols include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Especially preferred are triethylene glycol, tetraethylene glycol, dipropylene glycol, tripropylene glycol, sorbitol, trimethylolpropane and xylitol.

(Monocarboxylic Acid)

The monocarboxylic acid for the polyalcohol ester for use in the invention is not specifically defined, for which usable are any known aliphatic monocarboxylic acids, alicyclic monocarboxylic acids and aromatic monocarboxylic acids. Alicyclic monocarboxylic acids and aromatic monocarboxylic acids are preferred, as they may improve the transparent films in point of the moisture permeability, the water content and the water retentiveness thereof.

Preferred examples of the monocarboxylic acids usable herein are mentioned below, to which, however, the invention should not be limited.

The aliphatic monocarboxylic acids are preferably straight or branched fatty acids having from 1 to 32 carbon atoms, more preferably from 1 to 20 carbon atoms, even more preferably from 1 to 10 carbon atoms. Acetic acid is preferred as its compatibility with cellulose esters is high. Using a mixture of acetic acid with any other monocarboxylic acid is also preferred.

Preferred aliphatic monocarboxylic acids are saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid; and unsaturated fatty acids such as undecylenic acid, oleic acid, sorbic acid, linolic acid, linolenic acid, arachidonic acid. These may have a substituent.

Preferred examples of alicyclic monocarboxylic acids are cyclopentanecarboxylic acid, cyclohexanecarboxylic acid, cyclooctanecarboxylic acid, and their derivatives.

Preferred examples of aromatic monocarboxylic acids are benzoic acid; benzoic acid derivatives produced by introducing an alkyl group into the benzene ring of benzoic acid, such as toluic acid; and aromatic monocarboxylic acids having two or more benzene rings such as biphenylcarboxylic acid, naphthalenecarboxylic acid, tetralincarboxylic acid. Benzoic acid is especially preferred.

In the polyalcohol esters for use in the invention, the carboxylic acid moiety may be a single carboxylic acid or a mixture of two or more carboxylic acids. In the polyalcohol, the OH groups may be all esterified, or may remain as they are. Preferably, the ester has at least three aromatic ring or cycloalkyl rings in the molecule.

Examples of the polyalcohol ester compounds are mentioned below, to which, however, the invention should not be limited.

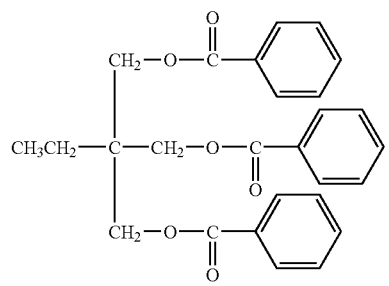

I-1

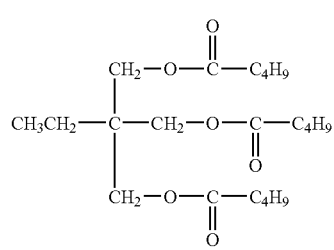

I-2

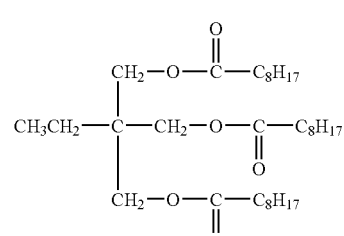

I-3

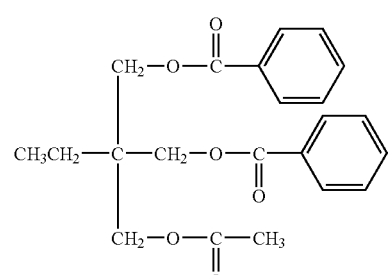

I-4

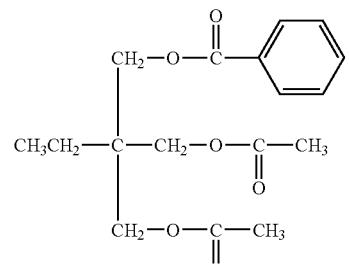

I-5

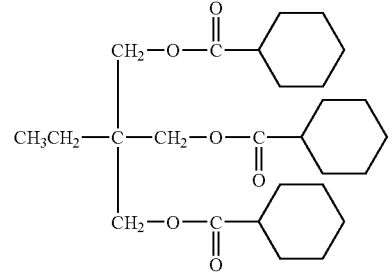

I-6

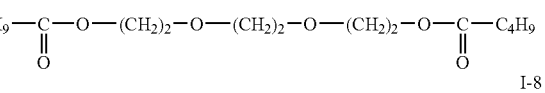

I-7

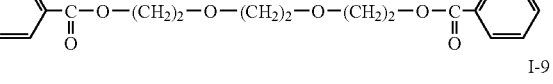

I-8

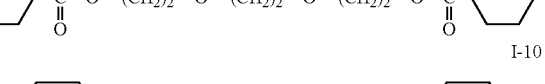

I-9

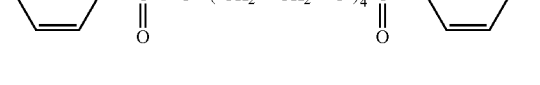

I-10

(Carboxylate Compound)

Examples of the carboxylate compounds usable herein are mentioned below, to which, however, the invention should not be limited. Concretely, phthalates and citrates are usable herein. Examples of the phthalate include dimethyl phthalate, diethyl phthalate, dicyclohexyl phthalate, dioctyl phthalate and diethylhexyl phthalate; and examples of the citrate include acetyltriethyl citrate and acetyltributyl citrate. In addition, butyl oleate, methylacetyl ricinoleate, dibutyl sebacate, triacetin and trimethylolpropane tribenzoate are also usable. Alkylphthalylalkyl glycolates are also preferably used for the object. The alkyl group in alkylphthalylalkyl glycolates has from 1 to 8 carbon atoms. The alkylphthalylalkyl glycolates include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate. Preferred are methylphthalylmethyl glycolate, ethylphthalylethyl glycolate, propylphtyalylpropyl glycolate, butylphthalylbutyl glycolate, octylphthalyloctyl glycolate; and more preferred is ethylphthalylethyl glycolate. Two or more of these alkylphthalylalkyl glycolates may be used herein as combined.

Examples of the carboxylate compounds are mentioned below, to which, however, the invention should not be limited.

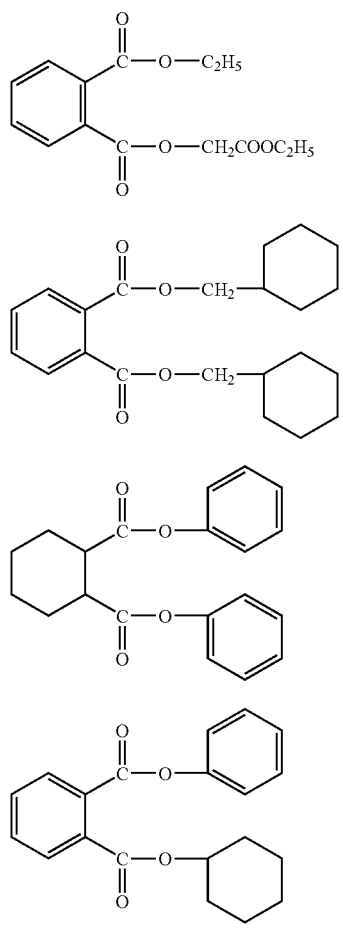

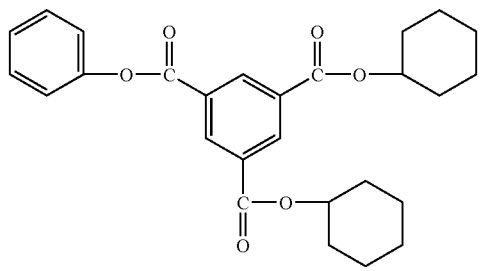

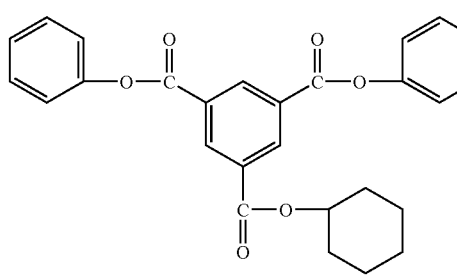

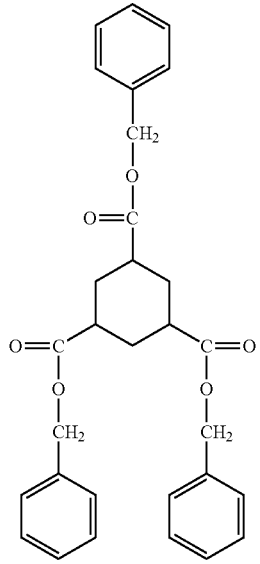

-continued

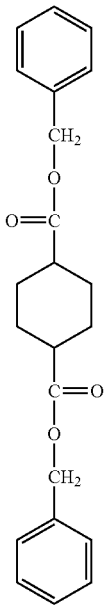

J-9

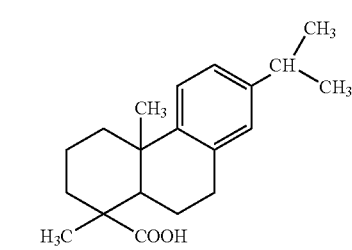

K-2

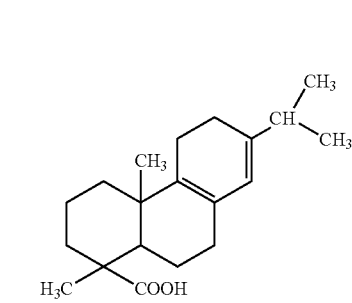

K-3

(Polycyclic Carboxylic Acid Compound)

The polycyclic carboxylic acid compound for use in the invention preferably has a molecular weight of at most 3000, more preferably from 250 to 2000. Regarding the cyclic structure of the compound, the size of the ring is not specifically defined. Preferably, however, the ring is formed of from 3 to 8 atoms. More preferred are 6-membered and/or 5-membered compounds. The ring may contain carbon, oxygen, nitrogen, silicon and any other atoms, and a part of the ring may have an unsaturated bond. For example, the 6-membered ring may be a benzene ring or a cyclohexane ring. The compound for use in the invention may have a plurality of such cyclic structures. For example, it may have both a benzene ring and a cyclohexane ring in the molecule; or it may have two cyclohexane rings; or it may be a naphthalene derivative or any other derivative such as anthracene. More preferably, the compound for use in the invention contains at least three such cyclic structures in the molecule. Also preferably, at least one bond of the cyclic structure in the compound does not contain an unsaturated bond. Concretely, typically mentioned for the compound are abietic acid and abietic acid derivatives such as dehydroabietic acid and parastolic acid. Chemical formulae of these compounds are mentioned below, to which, however, the invention should not be limited.

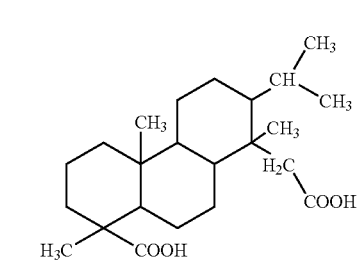

K-4

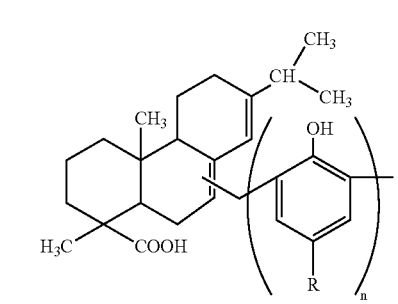

K-5

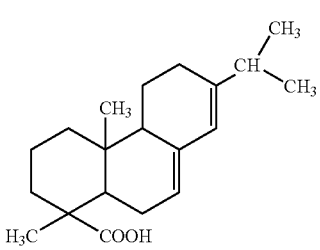

K-1

(Bisphenol Derivative)

The bisphenol derivative for use in the invention preferably has a molecular weight of at most 10000. Within the range, the compound may be a monomer, an oligomer or a polymer. As the case may be, it may be a copolymer with any other polymer, or may be modified with a reactive substituent at its terminal. Chemical formulae of these compounds are mentioned below, to which, however, the invention should not be limited.

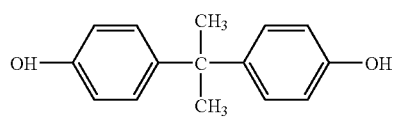

L-1

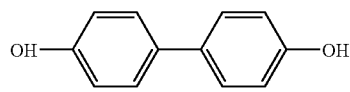

L-2

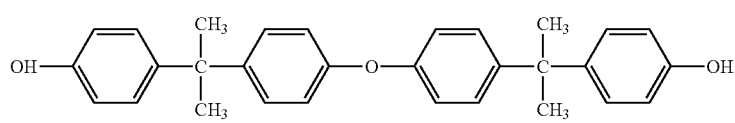

L-3

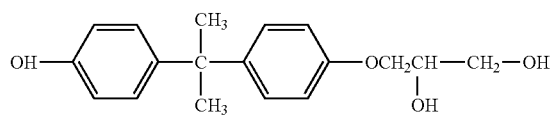

L-4

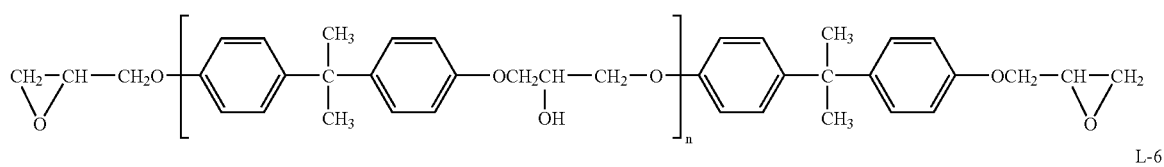

L-5

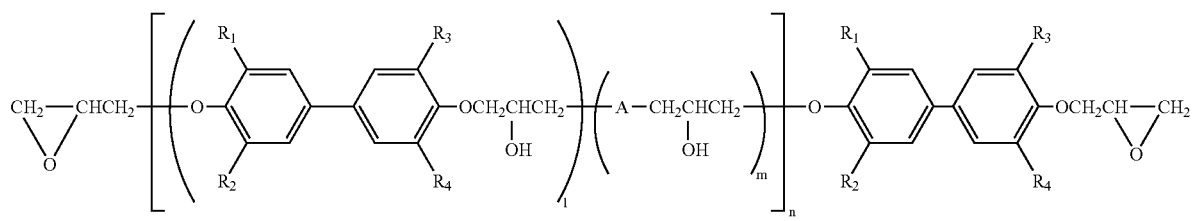

L-6

In the above-mentioned examples of bisphenol derivatives, $R^1$ to $R^4$ each are a hydrogen atom or an alkyl group having from 1 to 10 carbon atoms. l, m and n each indicate the number of repetitive units. Though not limited, they are preferably an integer of from 1 to 100, more preferably an integer of from 1 to 20.

[Wavelength Dispersion-Controlling Agent]

Compound having the ability to reduce the wavelength dispersion of the transparent film of the invention is described. We, the present inventors have assiduously studied and, as a result, have succeeded in controlling the wavelength dispersion of Rth of a transparent film by adding to the film, from 0.01 to 30% by weight (more preferably from 0.1 to 30% by weight) relative to the polymer content of the film, of at least one compound capable of controlling |Rth(400)−Rth(700)| of the film.

In particular, Re and Rth of a polymer, cellulose acetate that is preferred for the transparent film of the invention are characterized in that their wavelength dispersion is generally larger on the long wavelength side than on the short wavelength side. Accordingly, the wavelength dispersion of the film can be smoothed by increasing the relatively small values of Re and Rth on the short wavelength side. On the other hand, a compound having an absorption in a UV region of from 200 to 400 nm is characterized in that its wavelength dispersion of absorbance is larger on the long wavelength side than on the short wavelength side. When the compound itself is isotropically exists inside the transparent film, then the birefringence of the compound itself and therefore the wavelength dispersion of Re and Rth may be larger on the short wavelength side, like the wavelength dispersion of absorbance of the film.

Accordingly, when a compound which has an absorption in a UV region of from 200 to 400 nm and of which the wavelength dispersion of Re and Rth would be larger on the short wavelength side is used in a transparent film, then the wavelength dispersion of Re and Rth of the transparent film could be controlled. For this, the compound having the ability to control the wavelength dispersion must be fully uniformly miscible with the polymer for the film. Preferably, the absorption band range in the UV region of the compound falls between 200 and 400 nm, more preferably between 220 and 395 nm, even more preferably between 240 and 390 nm.

Recently, the optical members for use in liquid-crystal display devices for televisions, notebook-size personal computers, mobile portable terminals and others are desired to have good transmittance for the purpose of increasing the brightness of the devices even when driven with a more reduced power. To that effect, when a compound having an absorption within a UV region of from 200 to 400 nm and capable of reducing |Rth (400)−Rth (700)| of films is added to transparent films, then it is desired that the films may have good spectral transmittance. Preferably, transparent films have a spectral transmittance of from 45% to 95% at a wavelength of 380 nm, and a spectral transmittance of at most 10% at a wavelength of 350 nm.

From the viewpoint of its volatility, it is desirable that the wavelength dispersion-controlling agent that is preferably used in the invention has a molecular weight of from 250 to 1000, more preferably from 260 to 800, even more preferably from 270 to 800, still more preferably from 300 to 800. Having a molecular weight falling within the range, the compound may have a specific monomer structure or may have an oligomer structure or a polymer structure comprising a plurality of such monomer units as combined.

Preferably, the wavelength dispersion-controlling agent is not volatile in any stage of formation of the transparent film of the invention.

(Amount of Compound to be Added)

It is desirable that the amount of the wavelength dispersion-controlling agent preferably used in the invention is from 0.01 to 30% by weight, more preferably from 0.1 to 20% by weight, even more preferably from 0.2 to 10% by weight of the solid content (essentially the polymer) of the film.

(Method of Adding the Compound)

For the wavelength dispersion-controlling agent, one or more different types of compounds may be used either singly or as combined in any desired ratio.

Regarding the time when the wavelength dispersion-controlling agent is added to the film, the compound may be added to the dope in any stage of preparing the dope, or may be added thereto finally after the process of preparing the dope.

Preferred examples of the wavelength dispersion-controlling agent for use in the invention are benzotriazole compounds, benzophenone compounds, cyano group-containing compounds, oxybenzophenone compounds, salicylate compounds, nickel complex compounds. However, the invention should not be limited to these compounds.

Preferable examples of the wavelength dispersion adjusting agent are those represented by a formula (101) below:

$$Q^{1e}\text{-}Q^{2e}\text{-OH} \qquad \text{Formula (3)}$$

In the formula, $Q^{1e}$ represents a nitrogen-containing aromatic heteroring, and $Q^{2e}$ represents an aromatic ring.

The nitrogen-containing aromatic heteroring represented by $Q^{1e}$ is preferably a five-to-seven-membered, nitrogen-containing aromatic heteroring, and more preferably five- or six-membered, nitrogen-containing aromatic heteroring, wherein examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purine, pyridine, pyrazine, pyrimidine, pyridazine, triazine, triazaindene and tetrazaindene. Among others, the five-membered, nitrogen-containing aromatic heteroring is preferable, wherein specific examples thereof include imidazole, pyrazole, triazole, tetrazole, thiazole, oxazole, benzotriazole, benzothiazole, benzoxazole, thiadiazole, and oxadiazole. Benzotriazole is particularly preferable. The nitrogen-containing aromatic heteroring represented by $Q^{1e}$ may further has a substituent group, wherein substituent group T described later is applicable as the substituent group. For the case of having a plurality of substituent groups, the individual substituent groups may bond to each other to thereby form condensed rings.

The aromatic ring represented by $Q^{2e}$ may be an aromatic hydrocarbon ring or may be an aromatic heteroring. The aromatic ring may be monocycle, or may further form a condensed ring with other ring. The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring.

The aromatic heteroring is preferably a nitrogen-atom-containing or sulfur-atom-containing aromatic heteroring. Specific examples of the aromatic heteroring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heteroring is preferably pyridine, triazine or quinoline. $Q^{2e}$ preferably represents an aromatic hydrocarbon ring, more preferably represents a naphthalene ring or benzene ring, and particularly preferably represents a benzene ring.

Each of $Q^{1e}$ and $Q^{2e}$ may further have a substituent group which is preferably selected from the substituent group T listed below.

Substituent Group T:

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl.

These substituents may be substituted by at least one substitutent selected from these. When two substituents are selected, they may be same or different each other. Two or more may, if possible, bond each other to form a ring.

Among the compounds represented by the formula (101), triazole compounds represented by a formula (101-A) are preferred.

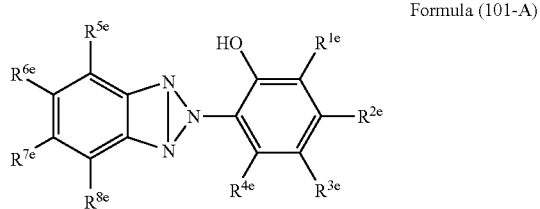

Formula (101-A)

In the formula, $R^{1e}$, $R^{2e}$, $R^{3e}$, $R^{4e}$, $R^{5e}$, $R^{6e}$, $R^{7e}$ and $R^{8e}$ respectively represent a hydrogen atom or a substituent group.

The substituent represented by $R^{1e}$, $R^{2e}$, $R^{3e}$, $R^{4e}$, $R^{5e}$, $R^{6e}$, $R^{7e}$ or $R^{8e}$ is selected from Substituent Group T described above. The substituent may be substituted with at least one substituent group or form a condensed ring by bonding each other.

It is preferred that $R^{1e}$ and $R^{3e}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{1e}$ and $R^{3e}$ respectively represent a hydrogen atom, an alkyl group, an aryl group, an alkoxy group, an aryloxy group or a halogen atom; it is much more preferred that $R^{1e}$ and $R^{3e}$ respectively represent a hydrogen atom or a $C_{1-12}$ alkyl group; and it is further much more preferred that $R^{1e}$ and $R^{3e}$ respectively represent a $C_{1-12}$ (preferably $O_{4-12}$) alkyl group.

It is preferred that $R^{2e}$ and $R^{4e}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{2e}$ and $R^{4e}$ respectively represent a hydrogen atom, an alkyl group, an aryl group, an alkoxy group, an aryloxy group or a halogen atom; it is much more preferred that $R^{2e}$ and $R^{4e}$ respectively represent a hydrogen atom or a $C_{1-12}$ alkyl group; it is further much more preferred that $R^{2e}$ and $R^{4e}$ respectively represent a hydrogen atom or methyl; and it is most preferred that $R^{2e}$ and $R^{4e}$ respectively represent a hydrogen atom.

It is preferred that $R^{5e}$ and $R^{8e}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{5e}$ and $R^{8e}$ respectively represent a hydrogen atom, an alkyl group, an aryl group, an alkoxy group, an aryloxy group or a halogen atom; it is much more preferred that $R^{5e}$ and $R^{8e}$ respectively represent a hydrogen atom or a $C_{1-12}$ alkyl group; it is further much more preferred that $R^{5e}$ and $R^{8e}$ respectively represent a hydrogen atom or methyl; and it is most preferred that $R^{5e}$ and $R^{8e}$ respectively represent a hydrogen atom.

It is preferred that $R^{6e}$ and $R^{7e}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{6e}$ and $R^{7e}$ respectively represent a hydrogen atom, an alkyl group, an aryl group, an alkoxy group, an aryloxy group or a halogen atom; it is much more preferred that $R^{6e}$ and $R^{7e}$ respectively represent a hydrogen atom or a halogen atom; and it is further much more preferred that $R^{6e}$ and $R^{7e}$ respectively represent a hydrogen atom or a chlorine.

Among the compounds represented by the formula (101), the compounds represented by a formula (101-B) are more preferred.

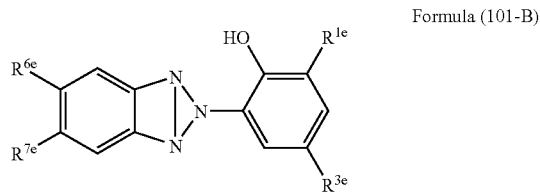

Formula (101-B)

In the formula, $R^{1e}$, $R^{3e}$, $R^{6e}$ and $R^{7e}$ are respectively same as those in the formula (101-A), and the preferred scopes of them are also same.

Examples of the compound represented by the formula (101) include, however not to be limited to, those shown below.

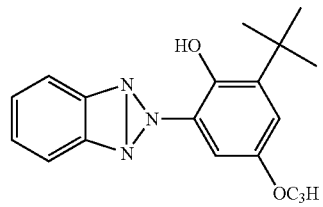

UV-1

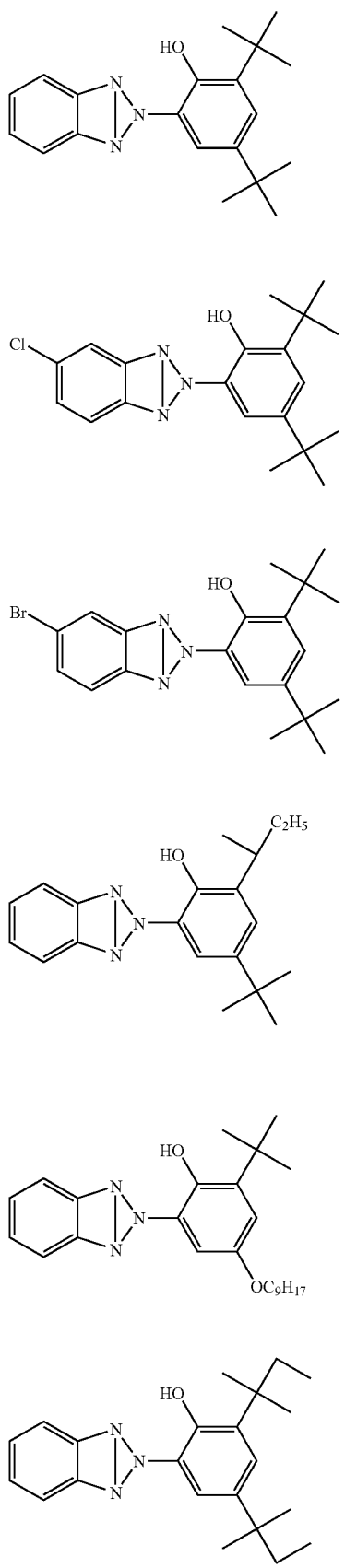
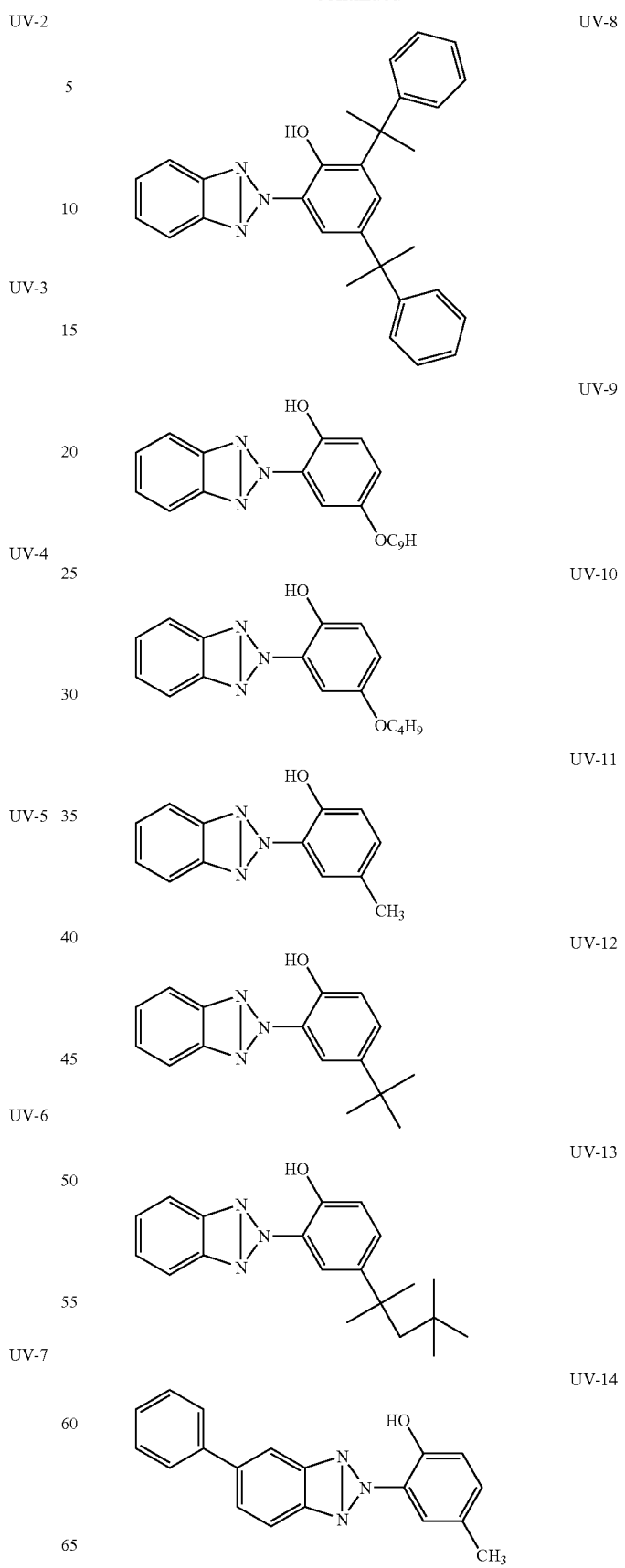

UV-15
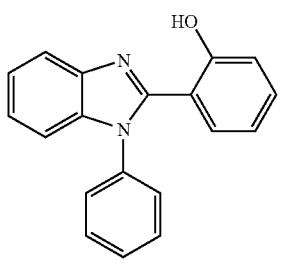

UV-16
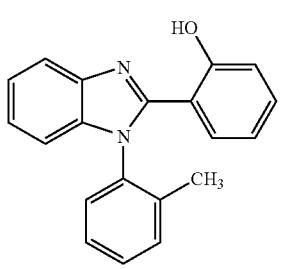

UV-17
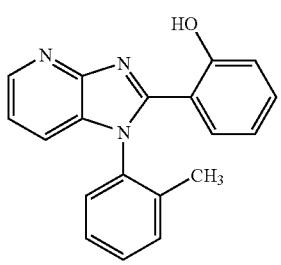

UV-18
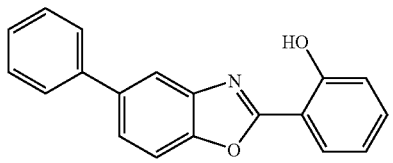

UV-19
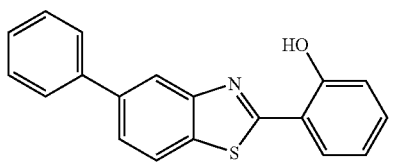

UV-20
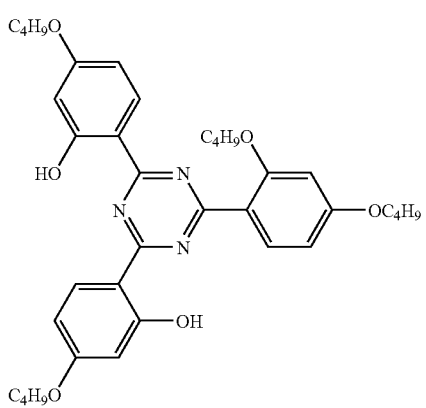

UV-21
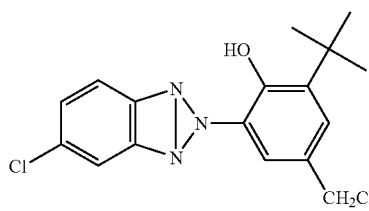

UV-22
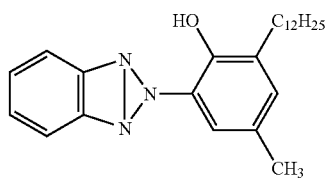

UV-23
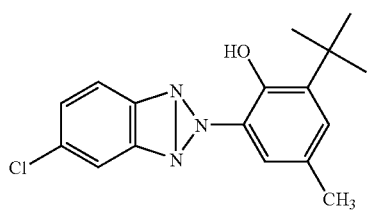

Among benzotriazole compounds shown above as examples, the compounds having a molecular-weight of greater than 320 are preferably used for producing the cellulose acylate film from the viewpoint of retention.

One of other preferable examples of the wavelength dispersion adjusting agent is a compound represented by a formula (102) below.

Formula (102)
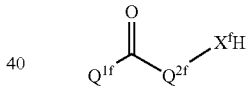

In the formula, $Q^{1f}$ and $Q^{2f}$ independently represent an aromatic ring, and $X^f$ represents NR (R is a hydrogen atom or a substituent group), oxygen atom or sulfur atom.

The aromatic ring represented by $Q^{1f}$ and $Q^{2f}$ may be an aromatic hydrocarbon ring or may be an aromatic heteroring. The aromatic ring may be monocycle, or may further form a condensed ring with other ring. The aromatic hydrocarbon ring represented by $Q^{1f}$ and $Q^{2f}$ is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring. The aromatic heteroring represented by $Q^{1f}$ and $Q^{2f}$ may be an aromatic heteroring preferably containing at least any one of an oxygen atom, nitrogen atom and sulfur atom. Specific examples of the heteroring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heteroring is preferably pyridine, triazine or quinoline. Each of $Q^{1f}$ and $Q^{2f}$ preferably represents an aromatic hydrocarbon ring, more preferably an aromatic hydrocarbon ring having the number of carbon atoms of 6 to 10, and still more preferably a substituted or non-substituted benzene ring. Each of $Q^{1f}$ and $Q^{2f}$ may further have a substituent group. The substituent group may preferably be selected from the substituent group T listed below, but never contain carboxylic acid, sulfonic acid or quaternary ammonium salt. A plurality of the substituent group may bind with each other to produce a cyclic structure.

$X^f$ is preferably NR (R represents a hydrogen atom or a substituent group. The above-described substituent group T is applicable to the substituent group), oxygen atom or sulfur atom, wherein X is preferably NR (R is preferably an acyl group or sulfonyl group, and these substituent groups may further be substituted), or O, and particularly preferably O.

Among the compounds represented by the formula (102), the benzophenone compounds represented by a formula (102-A) are preferred.

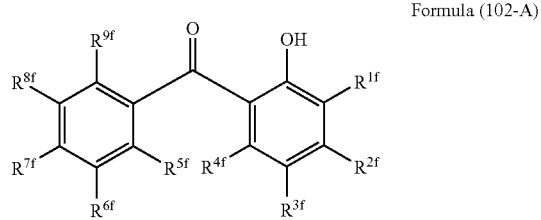

Formula (102-A)

In the formula, $R^{1f}$, $R^{2f}$, $R^{3f}$, $R^{4f}$, $R^{5f}$, $R^{6f}$, $R^{7f}$, $R^{8f}$ and $R^{9f}$ respectively represent a hydrogen atom or a substituent.

The substituent represented by $R^{1f}$, $R^{2f}$, $R^{3f}$, $R^{4f}$, $R^{5f}$, $R^{6f}$, $R^{7f}$, $R^{8f}$ or $R^{9f}$ is selected from Substituent Group T described above. The substituent may be substituted with at least one substituent group or form a condensed ring by bonding each other.

It is preferred that $R^{1f}$, $R^{3f}$, $R^{4f}$, $R^{5f}$, $R^{6f}$, $R^{8f}$ and $R^{9f}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{1f}$, $R^{3f}$, $R^{4f}$, $R^{5f}$, $R^{6f}$, $R^{8f}$ and $R^{9f}$ respectively represent a hydrogen atom, an alkyl group, an aryl group, an alkoxy group, an aryloxy group or a halogen atom; it is much more preferred that $R^{1f}$, $R^{3f}$, $R^{4f}$, $R^{5f}$, $R^{6f}$, $R^{8f}$ and $R^{9f}$ respectively represent a hydrogen atom or a $C_{1-12}$ alkyl group; it is further much more preferred that $R^{1f}$, $R^{3f}$, $R^{4f}$, $R^{5f}$, $R^{6f}$, $R^{8f}$ and $R^{9f}$ respectively represent a hydrogen atom or methyl; and it is most preferred that $R^{1f}$, $R^{3f}$, $R^{4f}$, $R^{5f}$, $R^{6f}$, $R^{8f}$ and $R^{9f}$ respectively represent a hydrogen atom.

It is preferred that $R^{12}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{2f}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{2f}$ represents a $C_{1-20}$ alkoxy group; and it is further much more preferred that $R^{2f}$ represents a $C_{1-12}$ alkoxy group.

It is preferred that $R^{7f}$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{7f}$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{7f}$ represents a hydrogen atom or a $C_{1-20}$ (desirably $C_{1-12}$, more desirably $C_{1-8}$ and much more desirably methyl) alkyl group; and it is further much more preferred that $R^{7f}$ represents a hydrogen atom or methyl.

Among the compounds represented by the formula (102), the compounds represented by a formula (102-B) are more preferred.

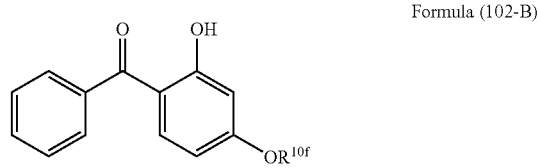

Formula (102-B)

In the formula, $R^{10f}$ represents a hydrogen atom, a substituted or non-substituted alkyl group, a substituted or non-substituted alkenyl group, a substituted or non-substituted alkynyl group or substituted or non-substituted aryl group.

The substituent is selected from Substituent Group T shown above.

It is preferred that $R^{10f}$ represents a substituted or non-substituted alkyl group; it is more preferred that $R^{10f}$ represents a $C_{6-20}$ substituted or non-substituted alkyl group; it is much more preferred that $R^{10f}$ represents $C_{6-12}$ substituted or non-substituted alkyl group such as n-hexyl, 2-ethylhexyl, n-octyl, n-decyl, n-dodecyl or benzyl; and it is further more preferred that $R^{10f}$ represents a $C_{6-12}$ substitute or non-substituted alkyl group such as 2-ethylhexyl, n-octyl, n-decyl, n-dodecyl or benzyl.

The compounds represented by the formula (102) can be synthesized by a publicly-known method disclosed in Japanese Laid-Open Patent Publication "Tokkaihei" No. 11-12219.

Specific examples of the compounds represented by the formula (102) will be listed below, wherein the present invention is by no means limited to the specific examples listed below.

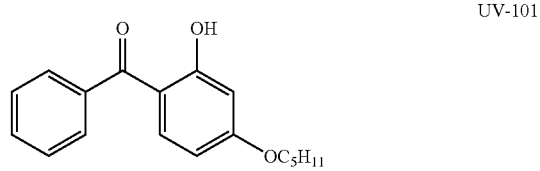

UV-101

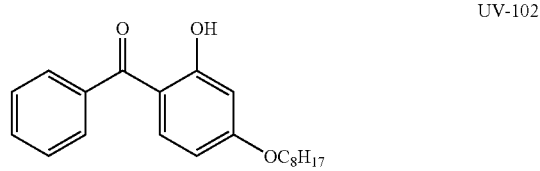

UV-102

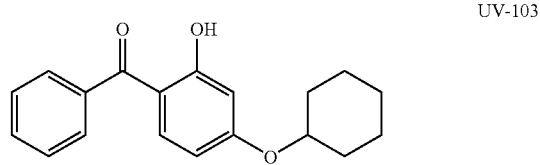

UV-103

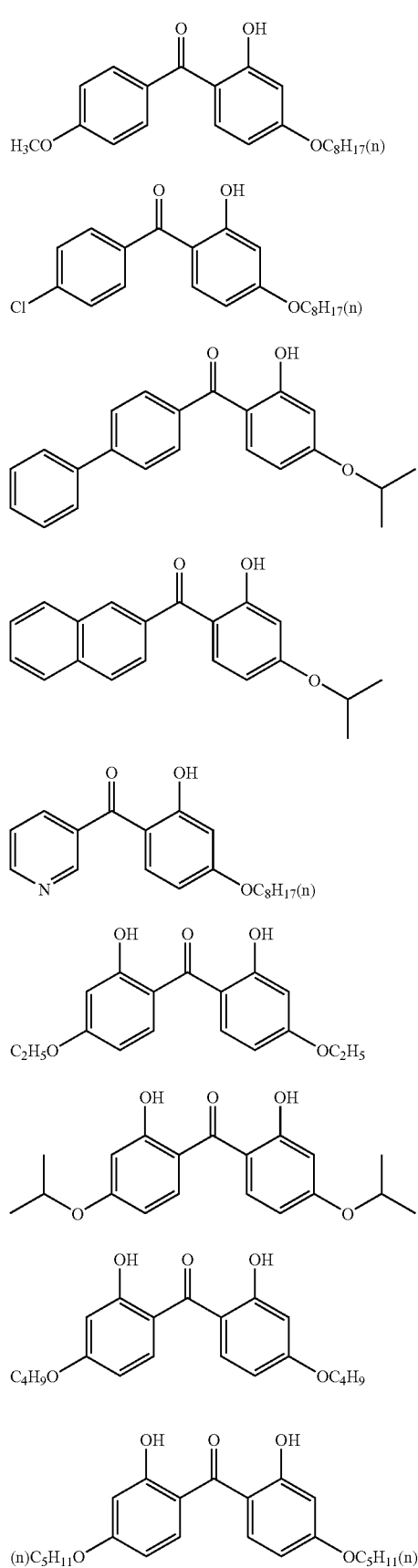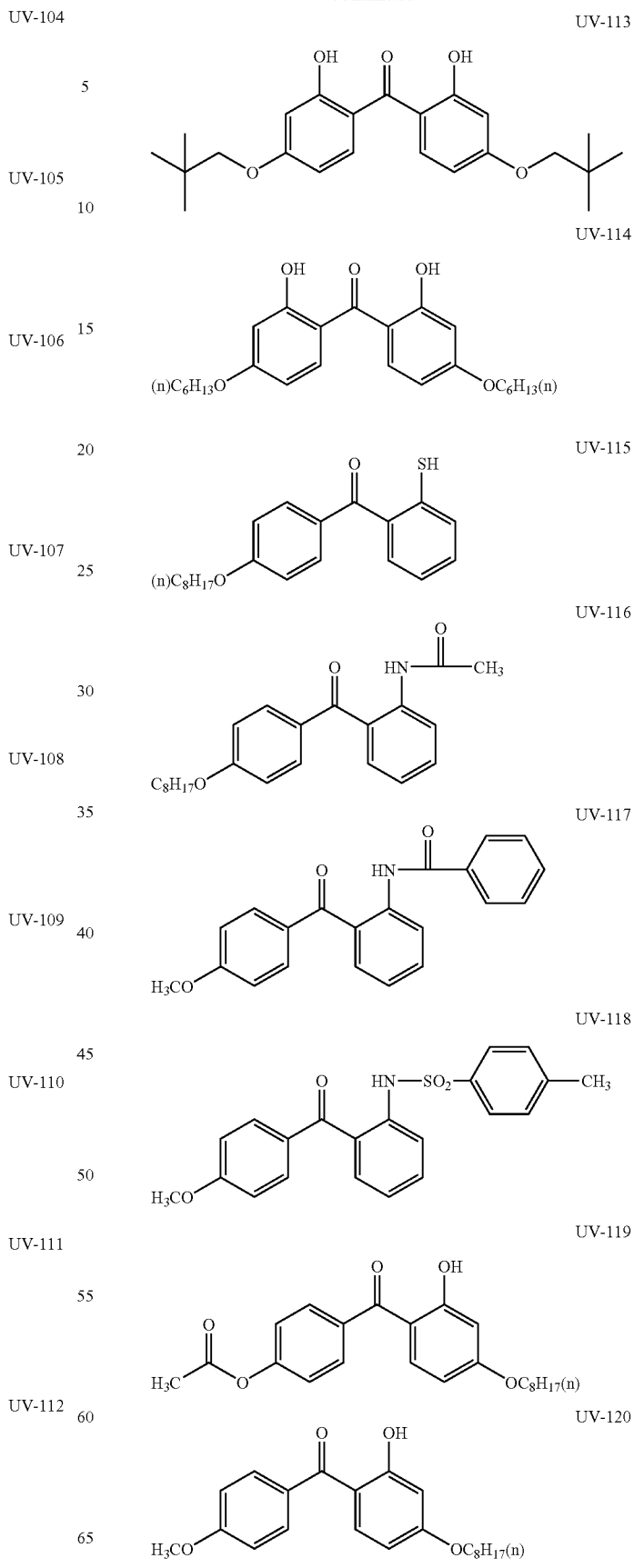

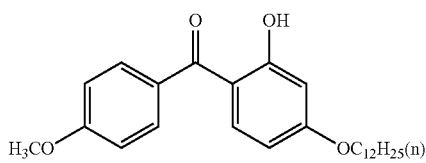

UV-121

One of other preferable examples of the wavelength dispersion adjusting agent is a compound represented by a formula (103) below.

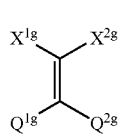

Formula (103)

In the formula, $Q^{1g}$ and $Q^{2g}$ independently represent an aromatic ring. Each of $X^{1g}$ and $X^{2g}$ represents a hydrogen atom or a substituent group, wherein at least either one of which represents a cyano group, carbonyl group, sulfonyl group or aromatic heteroring.

The aromatic ring represented by $Q^{1g}$ and $Q^{2g}$ may be an aromatic hydrocarbon ring or an aromatic heteroring. These may be a monocycle, or may further form a condensed ring with other ring. The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, more preferably an aromatic hydrocarbon ring having the number of carbon atoms of 6 to 12, and still more preferably a benzene ring. The aromatic heteroring is preferably a nitrogen-atom-containing or sulfur-atom-containing aromatic heteroring. Specific examples of the heteroring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene. The aromatic heteroring is preferably pyridine, triazine or quinoline.

Each of $Q^{1g}$ and $Q^{2g}$ preferably represents an aromatic hydrocarbon ring, and more preferably a benzene ring. Each of $Q^{1g}$ and $Q^{2g}$ may further have a substituent group, wherein the substituent group is preferably selected from the above-described substituent group T.

Each of $X^{1g}$ and $X^{2g}$ represents a hydrogen atom or a substituent group, wherein at least either one of which represents a cyano group, carbonyl group, sulfonyl group or aromatic heteroring. The above-described substituent group T is applicable to the substituent group represented by $X^{1g}$ and $X^{2g}$. The substituent group represented by $X^{1g}$ and $X^{2g}$ may further be substituted by other substituent group, or $X^{1g}$ and $X^{2g}$ may be condensed with each other to thereby form a ring structure.

Each of $X^{1g}$ and $X^{2g}$ is preferably a hydrogen atom, alkyl group, aryl group, cyano group, nitro group, carbonyl group, sulfonyl group or aromatic heteroring, more preferably a cyano group, carbonyl group, sulfonyl group or aromatic heteroring, still more preferably a cyano group or carbonyl group, and particularly preferably a cyano group or alkoxycarbonyl group (—C(=O)OR, where R is an alkyl group having the number of carbon atoms of 1 to 20, aryl group having the number of carbon atoms of 6 to 12, and combinations thereof).

Among the compounds represented by the formula (103), the compounds represented by a formula (103-A) are preferred.

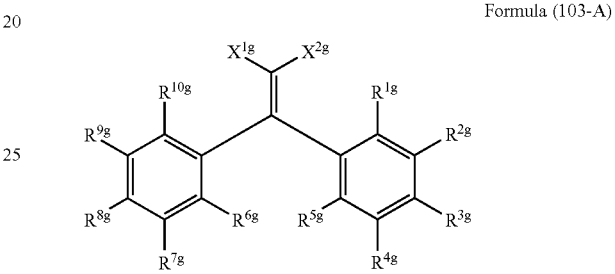

Formula (103-A)

In the formula, $R^{1g}$, $R^{2g}$, $R^{3g}$, $R^{4g}$, $R^{5g}$, $R^{6g}$, $R^{7g}$, $R^{8g}$, $R^{9g}$ and $R^{10g}$ respectively represent a hydrogen atom or a substituent group. The substituent is selected from Substituent Group T shown above. The substituent may be substituted with at least one substituent group or form a condensed ring by bonding each other. $X^{1g}$ and $X^{2g}$ are respectively same as those in the formula (103) and the preferred scopes are also same.

It is preferred that $R^{1g}$, $R^{2g}$, $R^{4g}$, $R^{5g}$, $R^{6g}$, $R^{7g}$, $R^{9g}$ an $R^{10g}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{1g}$, $R^{2g}$, $R^{4g}$, $R^{5g}$, $R^{6g}$, $R^{7g}$, $R^{9g}$ and $R^{10g}$ respectively represent a hydrogen atom, an alkyl group, an aryl group, an alkoxy group, an aryloxy group or a halogen atom; it is much more preferred that $R^{1g}$, $R^{2g}$, $R^{4g}$, $R^{5g}$, $R^{6g}$, $R^{7g}$, $R^{9g}$ and $R^{10g}$ respectively represent a hydrogen atom or a $C_{1-12}$ alkyl group; it is further much more preferred that $R^{1g}$, $R^{2g}$, $R^{4g}$, $R^{5g}$, $R^{6g}$, $R^{7g}$, $R^{9g}$ and $R^{10g}$ respectively represent a hydrogen atom or methyl; and it is most preferred that $R^{1g}$, $R^{2g}$, $R^{4g}$, $R^{5g}$, $R^{6g}$, $R^{7g}$, $R^{9g}$ and $R^{10g}$ respectively represent a hydrogen atom.

It is preferred that $R^{3g}$ and $R^{8g}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^{3g}$ and $R^{8g}$ respectively represent a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^{3g}$ and $R^{8g}$ respectively represent a hydrogen atom, a $C_{1-12}$ alkyl group or a $C_{1-12}$ alkoxy group; and it is most preferred that $R^{3g}$ and $R^{8g}$ respectively represent a hydrogen atom.

Among the compounds represented by the formula (103), the compounds having a cyano group represented by a formula (103-B) are more preferred.

Formula (103-B)

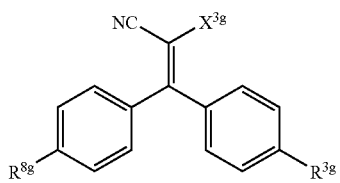

In the formula, $R^{3g}$ and $R^{8g}$ are respectively same as those in the formula (103-A), and the preferred scopes are also same. $X^{3g}$ represents a hydrogen atom or a substituent group. The substituent is selected from Substituent Group T shown above. The substituent may be substituted with at least one substituent group or form a condensed ring by bonding each other.

It is preferred that $X^{3g}$ represents a hydrogen atom, an alkyl group, an aryl group, a cyano group, a nitro group, a carbonyl group, a sulfonyl group or an aryl heteroring; it is more preferred that $X^{3g}$ represents a cyano group, a carbonyl group, a sulfonyl group or an aryl heteroring; it is much more preferred that $X^{3g}$ represents a cyano group or a carbonyl group; and it is further much more preferred that $X^{3g}$ represents a cyano group or an alkoxycarbonyl group, or in other words —C(=O)OR where R represents a $C_{1-20}$ alkyl group, a $C_{6-12}$ aryl group or a combination thereof.

Among the compounds represented by the formula (103), the compounds represented by a formula (103-C) are much more preferred.

Formula (103-C)

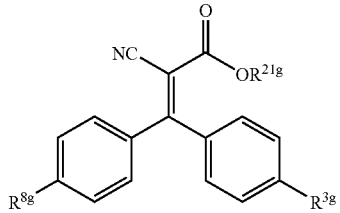

In the formula, $R^{3g}$ and $R^{8g}$ are respectively same as those in the formula (103-A), and the preferred scopes are also same. $R^{21g}$ represents a $C_{1-20}$ alkyl group.

When both of $R^{3g}$ and are hydrogen atoms, $R^{21g}$ preferably represents a $C_{2-12}$ alkyl group, more preferably represents a $C_{4-12}$ alkyl group, much more preferably represents a $C_{6-12}$ alkyl group, further much more preferably n-octyl, tert-octyl, 2-ethylhexyl, n-decyl or n-dodecyl, and most preferably represents 2-ethylhexyl.

When neither $R^{3g}$ nor are hydrogen atoms, $R^{21g}$ is preferably selected from alkyl groups having 20 or more carbon atoms such that the molecular weight of the compound represented by the formula (103-C) is not less than 300.

The compounds represented by the formula (103) can be synthesized by a method described in Journal of American Chemical Society, Vol. 63, p. 3452, (1941).

Specific examples of the compounds represented by the formula (103) will be listed below, wherein the present invention is by no means limited to the specific examples listed below.

UV-201
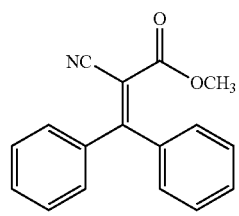

UV-202
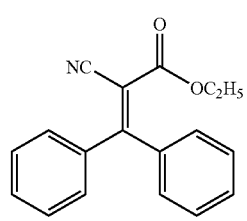

UV-203
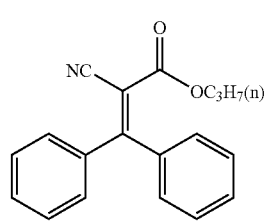

UV-204
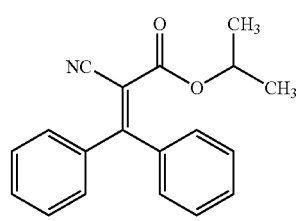

UV-205
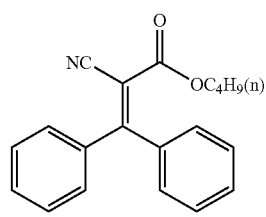

UV-206
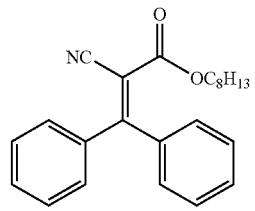

UV-207
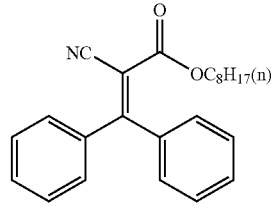

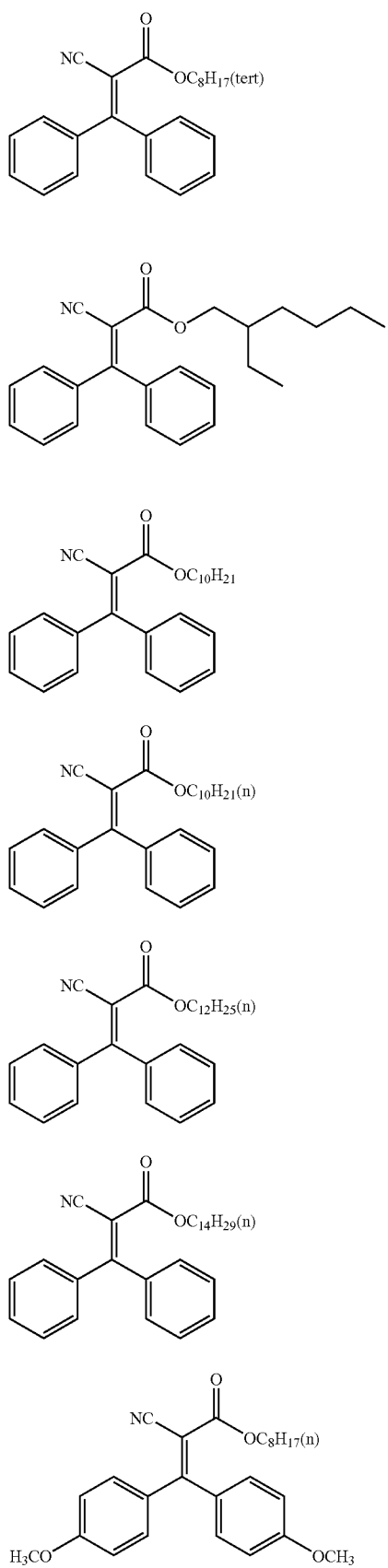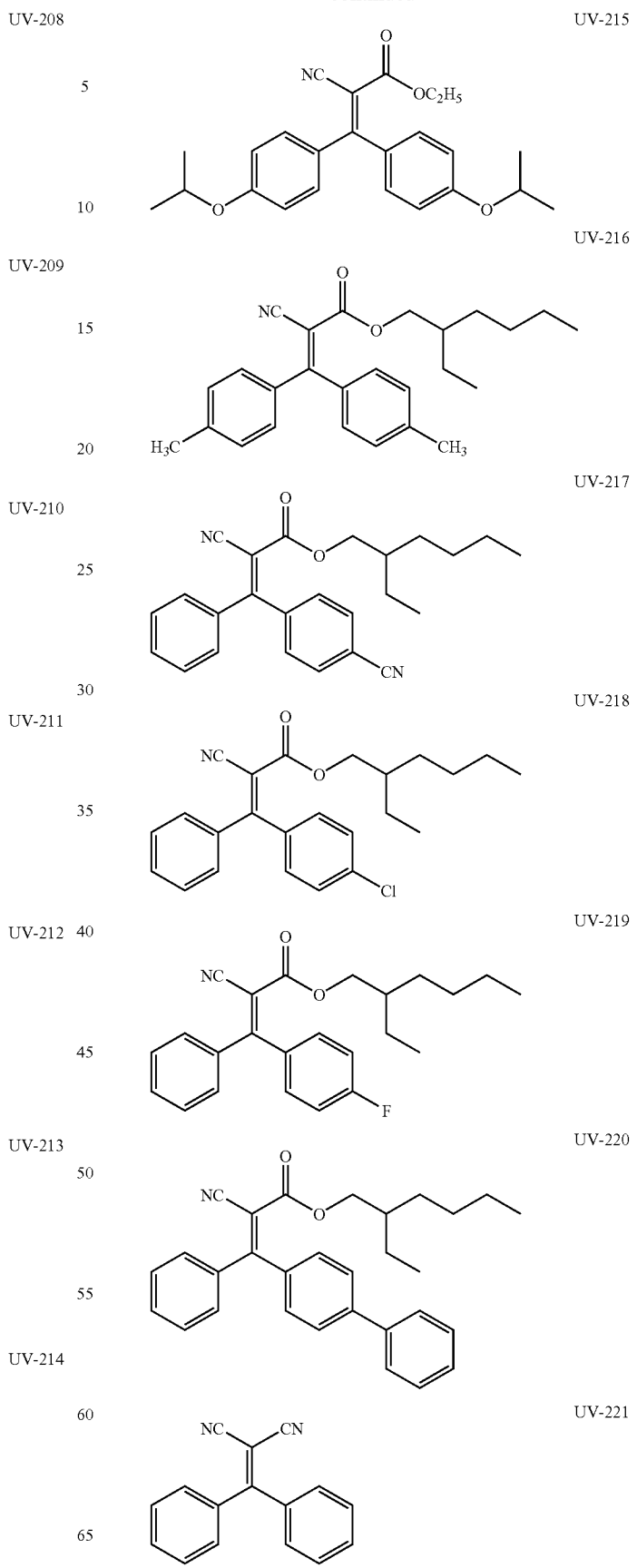

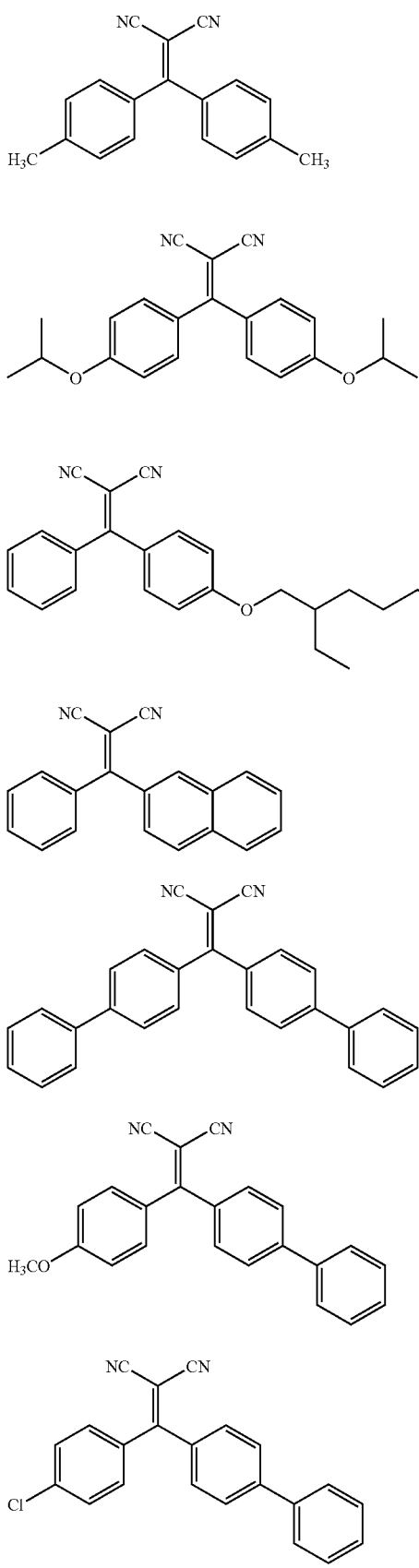

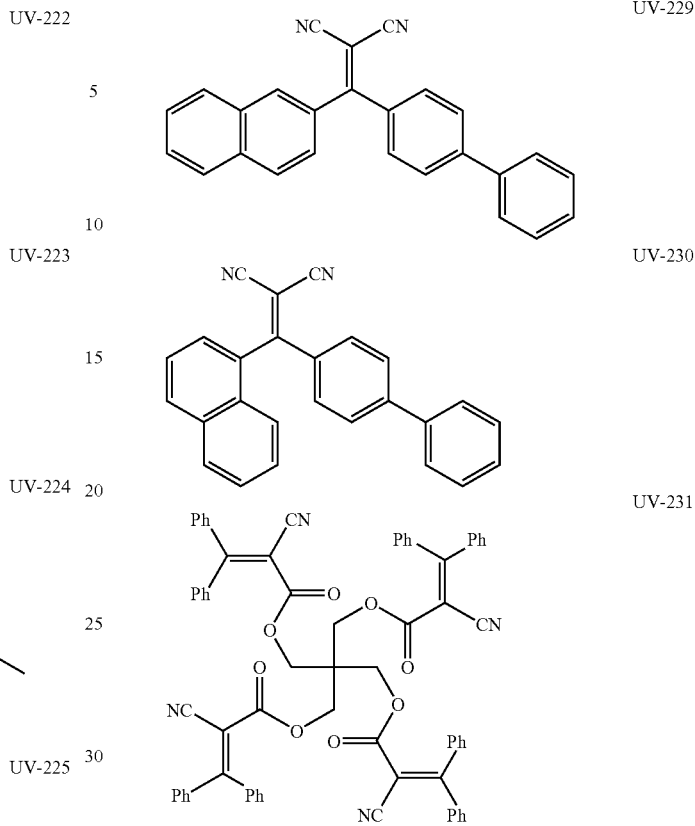

[Mat Agent Fine Particles]

The transparent film preferably comprises fine particles as a mat agent. The fine particles usable in the invention are silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate, and calcium phosphate. Preferably, the fine particles contain silicon as they are effective for reducing the haze of films. Especially preferably, they are silicon dioxide. It is desirable that the silicon dioxide fine particles have a primary mean particle size of at most 20 nm and an apparent specific gravity of at least 70 g/liter. More preferably, the mean particle size of the primary particles is small, falling between 5 and 16 nm, as they are effective for reducing the haze of the film. More preferably, the apparent specific gravity is from 90 to 200 g/liter, even more preferably from 100 to 200 g/liter. The particles having a larger apparent specific gravity may make it easier to form a dispersion having a higher concentration, and they are desirable as reducing the film haze and as preventing the formation of aggregates of the particles in the film.

The fine particles generally form secondary particles having a mean particle size of from 0.1 to 3.0 μm, and they exist as aggregates of their primary particles in the film, therefore forming projections having a size of from 0.1 to 3.0 μm in the film surface. The secondary mean particle size is preferably from 0.2 μm to 1.5 μm, more preferably from 0.4 μm to 1.2 μm, most preferably from 0.6 μm to 1.1 μm. The primary and secondary particle sizes are the diameters of the circumscribed circles of the particles in the film observed with a scanning electronic microscope. Concretely, 200 particles in different sites are observed and analyzed, and their mean value is the mean particle size.

As fine particles of silicon dioxide, for example, commercial products of Aerosil R972, R972V, R974, R812, 200, 200V, 300, R202, OX50, TT600 (all by Nippon Aerosil) are usable. As fine particles of zirconium oxide, for example, commercial products of Aerosil R976 and R811 (both by Nippon Aerosil) are usable.

Of those, Aerosil 200V and Aerosil R972V are fine particles of silicon dioxide having a primary mean particle size of at most 20 nm and having an apparent specific gravity of at least 70 g/liter, and these are especially preferred as they are effective for reducing the friction factor of optical films while keeping the haze of the films low.

For obtaining transparent films that contain particles having a small secondary mean particle size in the invention, some methods for preparing dispersions of fine particles may be taken into consideration. For example, one method employable herein comprises preparing a dispersion of fine particles by stirring and mixing a solvent and fine particles, then adding the resulting dispersion to a small amount of a polymer solution prepared separately and dissolving it therein, and thereafter mixing the resulting solution with the main polymer dope solution. This method is preferred in that the silicon dioxide fine particles may well disperse and they hardly re-aggregate. Another method comprises adding a small amount of a cellulose ester to a solvent and dissolving it with stirring, and then adding fine particles to it and dispersing them with a disperser to prepare an additive dispersion of the fine particles, and finally well mixing the additive dispersion with a dope solution in an in-line mixer. The invention should not be limited to these methods. Preferably, the concentration of silicon dioxide fine particles to be mixed and dispersed in a solvent to prepare a dispersion of the particles is from 5 to 30% by mass, more preferably from 10 to 25% by mass, most preferably from 15 to 20% by mass. The dispersion concentration is preferably higher, as the liquid turbidity could be smaller relative to the amount of the particles in the dispersion, the haze of the film could be lower and the content of the aggregates in the film could be smaller. The amount of the mat agent to be finally in the polymer dope solution is preferably from 0.01 to 1.0 $g/m^2$, more preferably from 0.03 to 0.3 $g/m^2$, most preferably from 0.08 to 0.16 $g/m^2$.

When the transparent film of the invention is formed from a dope solution, lower alcohols may be used as the solvent in the process of casting the dope and drying it. Preferred examples of the lower alcohols are methyl alcohol, ethyl alcohol, propyl alcohol, isopropyl alcohol, butyl alcohol. The other solvents than such lower alcohols are not specifically defined for use herein. Preferably, the solvents generally used in film formation from cellulose esters may be used.

[Plasticizer, Antioxidant, Release Agent]

In addition to the optical anisotropy-reducing compound and the wavelength dispersion-controlling agent mentioned above, the transparent film of the invention may contain various additives (e.g., plasticizer, UV inhibitor, antioxidant, release agent, IR absorbent) added thereto in the process of producing it and in accordance with the use of the film. The additives may be solid or oily. In other words, they are not specifically defined in point of their melting point and boiling point. For example, UV-absorbing materials may be mixed at 20° C. or lower and at 20° C. or higher; and the same may apply to mixing plasticizers. For example, this is described in JPA No. 2001-151901. Further, IR-absorbing dyes are described in, for example, JPA No. 2001-194522. The time when the additives are added may be anytime in the process of preparing dopes. As the case may be, the additives may be added in the final step of the process of preparing dopes. The amount of each additive to be added is not specifically defined so far as the additive could exhibit its function. When the transparent film has a multi-layer structure, then the type and the amount of the additives to be added to each layer may differ. For example, this is described in JPA No. 2001-151902, and the technique is well known in the art. Its details are described in Hatsumei Kyokai's Disclosure Bulletin No. 2001-1745 (issued Mar. 15, 2001), p. 16 to p. 22, and the materials described therein are preferably used in the invention.

[Blend Ratio of Compound]

In the transparent film of the invention, the overall amount of the compounds having a molecular weight of at most 3000 is preferably from 5 to 45% of the solid content (essentially the polymer) of the film, more preferably from 10 to 40%, even more preferably from 15 to 30%. As so mentioned hereinabove, the compounds include an optical anisotropy-reducing compound, a wavelength dispersion-controlling agent, a UV inhibitor, a plasticizer, an antioxidant, fine particles a release agent and an IR absorbent. Preferably, they have a molecular weight of at most 3000, more preferably at most 2000, even more preferably at most 1000. If the overall amount of these compounds is smaller than 5%, then it may be problematic in that the properties of the polymer itself may be too noticeable in the film and, for example, the optical properties and the physical strength of the film may readily fluctuate depending on the change of the ambient temperature and humidity. If, however, the overall amount of the compounds is larger than 45%, then the compounds will be over the limit of their miscibility in the transparent film and it may be also problematic in that the excess compounds may deposit in the film surface and the film may be thereby whitened (bleeding out from film).

[Organic Solvent in Polymer Solution]

In the invention, employable is any method of hot melt film formation or dope film formation (solvent casting method). For producing transparent films having better surface condition, preferred is a method of dope film formation (solvent casting method), in which films are produced by the use of a solution (dope) of a polymer dissolved in an organic solvent. The organic solvent preferably used as the main solvent in the invention is selected from esters, ketones and ethers having from 3 to 12 carbon atoms, and halogenohydrocarbons having from 1 to 7 carbon atoms. Esters, ketones and ethers for use herein may have a cyclic structure. Compounds having any two or more functional groups of esters, ketones and ethers (i.e., —O—, —CO— and —COO—) may also be used herein as the main solvent, and for example, they may have any other functional group such as alcoholic hydroxyl group. The number of the carbon atoms that constitute the main solvent having two or more functional groups may fall within the range of any of the functional group-having compounds.

For the transparent film of the invention, chlorine-based halogenohydrocarbons may be used as the main solvent, or non-chlorine solvents as in Hatsumei Kyokai's Disclosure Bulletin 2001-1745 (pp. 12-16) may also be used as the main solvent. Anyhow, the main solvent is not limitative for the transparent film of the invention.

In addition, the solvents for the polymer solution and the film and also methods for dissolution therein are disclosed in the following patent publications, and these are preferred embodiments for use in the invention. For example, they are described in JPA No. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, 11-60752. These patent publications disclose not only solvents preferred for polymers but also the physical properties of their solutions as well as substances that may coexist along with them, and these are also preferred embodiments for use in the invention.

[Method for Producing Transparent Film in a Mode of Dope Film Formation]

A method for producing the transparent film of the invention in a mode of dope film formation is described in detail hereinunder.

[Dissolution Step]

The method for dissolving a polymer in a solvent to prepare a polymer solution (dope solution) is not specifically defined. It may be prepared at room temperature or may be prepared in a mode of cooling dissolution or high-temperature dissolution or in a mode of their combination. A process comprising a step of preparing the polymer solution for use in the invention and a subsequent step of concentration and filtration of the solution is described in detail in Hatsumei Kyokai's Disclosure Bulletin 2001-1745 (issued Mar. 15, 2001, pp. 22-25), and this is preferably employed in the invention.

(Transparency of Dope Solution)

Preferably, the dope transparency of the polymer solution is at least 85%, more preferably at least 88%, even more preferably at least 90%. We, the present inventors have confirmed that various additives well dissolve in the polymer dope solution in the invention. A concrete method for determining the dope transparency is described. A dope solution is put into a glass cell having a size of 1 $cm^2$, and its absorbance at 550 nm is measured with a spectrophotometer (UV-3150 by Shimadzu). The solvent alone is measured as a blank, and the transparency of the polymer solution is calculated from the ratio of the solution absorbance to the blank absorbance.

[Casting, Drying and Winding Step]

Next, a process of forming a film from the polymer solution is described. For the method and the equipment for producing the transparent film, herein employable are the solvent-casting method and the solvent-casting equipment heretofore generally used in the art for cellulose triacetate film formation. A dope (polymer solution) prepared in a dissolver (tank), is once stored in a storage tank, in which the dope is defoamed and is thus finally prepared. From the dope take-out mouth of the tank, the dope is taken out and fed into a pressure die via a metering pressure gear pump capable of feeding it with accuracy, for example, based on the revolution number thereof, and then the dope is uniformly cast onto the endlessly-running cast member of a metal support via the slit of the pressure die, and at a peel point to which the metal support makes nearly one revolution, the still wet dope film (this may be referred to as a web) is peeled from the metal support. While both ends of the thus-obtained web are clipped to ensure its width, the web is conveyed with a tenter and dried, and then further conveyed with rolls in a drier in which the web is completely dried, and thereafter this is wound up around a winder to predetermined width. The combination of the tenter and the drier with rolls may vary depending on the object of the film to be produced. When the essential applications of the transparent film of the invention are for functional protective films for optical structures in electronic displays or for silver halide photographic materials, then additional coating devices may be fitted to the solvent casting apparatus for producing the film. The additional devices are for further processing the surface of the film by forming thereon a subbing layer, an antistatic layer, an antihalation layer and a protective layer. This is described in detail in Hatsumei Kyokai's Disclosure Bulletin 2001-1745 (issued Mar. 15, 2001, pp. 25-30). It includes casting (including co-casting), metal support, drying and peeling, and these are preferably employed in the invention.

Preferably, the thickness of the transparent film of the invention is from 10 to 120 μm, more preferably from 20 to 100 even more preferably from 30 to 90 μm.

[Evaluation of Physical Properties of Transparent Film]
[Glass Transition Temperature Tg of Film]

The glass transition temperature Tg of the transparent film falls between 80 and 165° C. From the viewpoint of the heat resistance of the film, Tg preferably falls between 100 and 160° C., more preferably between 110 and 150° C. The glass transition temperature Tg is determined as follows: 10 mg of a sample of the transparent film of the invention is heated from room temperature up to 200° C. at a heating rate of 5° C./min, and the R quantity of heat of the sample is measured with a differential scanning calorimeter (DSC 2910 by T.A. Instrument), and the glass transition temperature Tg of the film is calculated from it.

[Haze of Film]

Preferably, the haze of the transparent film falls between 0.01 and 2.0%, more preferably between 0.05 and 1.5%, even more preferably between 0.1 and 1.0%. The film transparency is a matter of importance when the film serves as an optical film. The haze may be determined as follows: A sample of the transparent film of the invention having a size of 40 mm×80 mm is measured with a haze meter (HGM-2DP by Suga Test Instruments) at 25° C. and 60% RH, according to JIS K-6714.

[Humidity Dependence of Re and Rth of Film]

Preferably, the humidity-dependent change of the in-plane retardation Re and the thickness-direction retardation Rth of the transparent film of the invention is as small as possible. Concretely, the difference between Rth at 25° C. and 10% RH and Rth at 25° C. and 80% RH, ΔRth (=Rth10% RH−Rth80% RH) falls between 0 and 50 nm, more preferably between 0 and 40 nm, even more preferably between 0 and 35 nm.

[Equivalent Water Content of Film]

The equivalent water content of the transparent film of the invention is described. When the transparent film is used as a protective film for polarizing plates, then the equivalent water content thereof at 25° C. and 80% RH is preferably from 0 to 4%, more preferably from 0.1 to 3.5%, even more preferably from 1 to 3% irrespective of the film thickness, in order not to detract from the adhesiveness of the film to water-soluble polymer such as polyvinyl alcohol. If the equivalent water content is higher than 4%, then it is undesirable since the humidity-dependent retardation of the film may be too great when the film is used as a support for optical compensatory sheets.

The water content is determined as follows: A sample of the transparent film of the invention having a size of 7 mm×35 mm is analyzed with a water content analyzer combined with a sample drier (CA-03, VA-05, both by Mitsubishi Chemical), according to a Karl-Fisher method. The amount of water (g) in the sample thus measured is divided by the weight thereof (g).

[Moisture Permeability of Film]

Preferably, the moisture permeability of the transparent film to be used for optical compensatory sheets of the invention, as determined at a temperature of 60° C. and at a humidity of 95% RH according to JIS Z0288 and converted in terms of a standard film thickness of 80 μm, is from 400 to 2000 $g/m^2 \cdot 24$ h, more preferably from 500 to 1800 $g/m^{20} \cdot 24$ h, even more preferably from 600 to 1600 $g/m^{20} \cdot 24$ h. If it is over than 2000 $g/m^{20} \cdot 24$ h, then the humidity-dependent absolute values Re and Rth of the film may be significantly higher than 0.5 nm/% RH. In addition, it is also unfavorable when an optically-anisotropic layer is laminated on the transparent film of the invention to fabricate an optical compensatory sheet, since the humidity-dependent absolute values Re and Rth of the sheet may also be significantly higher than 0.5 nm/% RH. When the optical compensatory sheet or the polarizing plate of the type is built in liquid-crystal display devices, then it may cause discoloration and viewing angle reduction. On the other hand, if the moisture permeability of the transparent film is smaller than 400 g/m$^{20}$·24 h, then the film may interfere with drying of adhesive when it is stuck to both faces of a polarizing film to fabricate a polarizing plate, or that is, the film may cause adhesion failure in the polarizing plate.

When the thickness of the transparent film is larger, then the moisture permeability thereof may be smaller; and when the thickness is smaller, then the moisture permeability may be larger. Accordingly, the moisture permeability of every sample having a different thickness must be determined, as converted in terms of a standard film thickness of 80 μm. Depending on the film thickness thereof, the moisture permeability of the film is determined as follows: Moisture permeability as converted in terms of standard film thickness of 80 μm=(measured moisture permeability)×(measured film thickness μm/80 μm).

Regarding the method of measuring the moisture permeability, referred to are the methods described in Physical Properties of Polymer II (Polymer Experimental Lecture 4, Kyoritsu Publishing), pp. 285-297, "Determination of Vapor Permeation (mass method, temperature method, vapor pressure method, adsorption method)". Briefly, a sample of the transparent film having a size of 70 mmϕ is conditioned at 25° C. and 90% RH, and at 60° C. and 95% RH both for 24 hours. Using a permeability tester (KK-709007 by Toyo Seiki), the water content per unit area of the sample is measured (g/m$^2$) according to JIS Z-0208, and the moisture permeability of the sample is calculated as follows: Moisture permeability=weight of conditioned sample−weight of unconditioned sample.

[Dimensional Change of Film]

The dimensional stability of the transparent film of the invention is preferably as follows: The dimensional change of the film after stored at 60° C. and 90% RH for 24 hours (high-humidity storage), and the dimensional change of the film after stored at 90° C. and 5% RH for 24 hours (high-temperature storage) are both at most 0.5%.

More preferably, the dimensional change is at most 0.3%, even more preferably at most 0.15%.

A concrete method for the measurement is described. Two samples of the transparent film of the invention, having a size of 30 mm×120 mm, are prepared and conditioned at 25° C. and 65% % H for 24 hours. Using an automatic pin gauge (by Shinto Kagaku), holes of 6 mmϕ are formed on both sides of the samples each at intervals of 100 mm. The original hole-to-hole distance is L0. One sample is processed at 60° C. and 90% RH for 24 hours, and then the hole-to-hole distance is measured (L1); and the other sample is processed at 90° C. and 5% RH for 24 hours, and the hole-to-hole distance is measured (L2). The minimum gauge limit in every measurement is 1/1000 mm. The dimensional change is determined as follows: Dimensional change at 60° C. and 90% RH (high-humidity storage)={|L0−L1|/L0}×100. Dimensional change at 90° C. and 5% RH (high-temperature storage)={|L0−L2|/L0}×100.

[Elastic Modulus of Film]
(Elastic Modulus)

Preferably, the elastic modulus of the transparent film of the invention is from 200 to 500 kgf/mm$^2$, more preferably from 240 to 470 kgf/mm$^2$, even more preferably from 270 to 440 kgf/mm$^2$. A concrete method for measuring it is as follows: Using a universal tensile tester, Toyo Boldwin's STM T50BP, a sample of the film is pulled in an atmosphere of 23° C. and 70% RH at a pulling rate of 10%/min, and its stress to yield 0.5% elongation is measured. This is the elastic modulus of the sample.

[Photoelasticity Coefficient of Film]
(Photoelasticity Coefficient)

Preferably, the photoelasticity coefficient of the transparent film of the invention is at most 50×10$^{-13}$ cm$^2$/dyne, more preferably at most 30×10$^{-13}$ cm$^2$/dyne, even more preferably at most 20×10$^{-13}$ cm$^2$/dyne. A concrete method for measuring it is as follows: A tensile stress is imparted to a sample of the transparent film of the invention having a size of 12 mm×120 mm, in the direction of the major axis thereof, whereupon the retardation of the sample is measured with an ellipsometer (Nippon Bunko's M150), and the photoelasticity coefficient of the sample is derived from the retardation change thereto relative to the stress applied to the sample.

[Methods for Evaluation of Transparent Film]

For evaluating the transparent film of the invention, it is analyzed and tested according to the methods mentioned below.

(Retardation Re)

A sample of 70 mm×100 mm is conditioned at 25° C. and 60% RH for 2 hours. Using an automatic birefringence meter (Oji Keisoku's KOBRA21DH), the retardation at 589 nm in the vertical direction of the sample is measured, and Re of the sample is extrapolated from it.

$$Re=(nx-ny) \times d.$$

As the case may be, any other wavelength than 589 nm may also be employed.

(Retardation Rth)

A sample of 30 mm×40 mm is conditioned at 25° C. and 60% RH for 2 hours. Using an ellipsometer (Nippon Bunko's M150), the retardation at 632.8 nm in the vertical direction and in an inclined direction of the sample is measured, and Rth of the sample is extrapolated from the data.

$$Rth=\{(nx+ny)/2-nz\} \times d.$$

(Molecule Alignment Axis)

A sample of 70 mm×100 mm is conditioned at 25° C. and 60% RH for 2 hours. Using an automatic birefringence meter (Oji Keisoku's KOBRA21DH), the molecule alignment axis is computed from the retardation measured by changing the incident angle in vertical light introduction.

(Axis Shifting)

Using an automatic birefringence meter (Oji Keisoku's KOBRA21DH), the axis shifting angle is measured. 20 points at regular intervals in the entire width of the sample in the cross direction are measured, and the absolute values thus measured are averaged. The range of the slow axis angle (axis shifting) is as follows: 20 points at regular intervals in the entire width of the sample in the cross direction are measured, and the difference between the mean value of the four points having given larger four absolute values of axis shifting, and the mean value of the four pints having given smaller four absolute values of axis shifting is obtained.

(Transmittance)

Using a transparency meter (AKA phototube colorimeter by Kotaki Seisakusho) at 25° C. and 60% RH, the visible light (615 nm) transmittance of a sample of 20 mm×70 mm is measured.

(Spectral Characteristic)

Using a spectral photometer (U-3210 by Hitachi) at 25° C. and 60% RH, the transmittance of a sample of 13 mm×40 mm is measured within a wavelength range of from 300 to 450 nm. The inclination width is obtained as (wavelength for 72%)−(wavelength for 5%). The limiting wavelength is represented by (inclination width/2)+(wavelength for 5%). The absorption end is represented by a wavelength for transmittance 0.4%. The transmittance of the sample at 380 nm and 350 nm is obtained.

[Surface Property of Film]

The surface property of the transparent film of the invention is described. Preferably, the arithmetic mean roughness (Rq) of the surface roughness of the film, according to JIS B0601-1994, is at most 0.1 µm, and the maximum height (Ry) thereof is at most 0.5 µm. More preferably, the arithmetic mean roughness (Ra) is at most 0.05 µm, and the maximum height (Ry) is at most 0.2 p.m. The profile of the recesses and the projections of the film surface may be analyzed with an atomic force microscope (AFM).

[Storage Stability of Film]

The transparent film of the invention is required to well retain various compounds added thereto. Concretely, when the transparent film is stored at 80° C. and 90% RH for 48 hours, the mass change of the film is preferably from 0 to 5%, more preferably from 0 to 3%, even more preferably from 0 to 2%.

<Method of Evaluation of Storage Stability>

A sample is cut into a size of 10 cm×10 cm, and stored at 23° C. and 55% RH for 24 hours, and its mass is measured. Then, this is stored at 80±5° C. and 90±10% RH for 48 hours. After processed, the surface of the sample is gently wiped, and then further stored at 23° C. and 55% RH for 1 day, and the mass of the sample is again measured. The storage stability of the sample is calculated as follows:

Storage Stability(mass %)={(mass before storage–mass after storage)/(mass before storage)}×100.

[Mechanical Characteristics of Film]

(Curl)

The curl value in the cross direction of the transparent film of the invention is preferably from −10/m to +10/m. The transparent film is subjected to surface treatment as will be mentioned hereinunder, or rubbed before coated with an optically-anisotropic layer, or coated or laminated with an alignment layer or an optically-anisotropic layer. For these treatments, the film is processed while it is a long film. If the curl value of the long, transparent film in width direction falls outside the scope as above, then the film may be difficult to handle and it may be cut or broken. If so, in addition, the edges and the center part of the film may be strongly contacted with conveyor rolls to give dust, and, as a result, much impurity may deposit on the film. In that condition, the frequency of spot defects and coating streaks may be over the acceptable level. In addition, when the curl value is controlled to fall within the defined range, then it is favorable since a trouble of color mottles that may often occur when coated with an optically-anisotropic layer may be reduced, and, in addition, the film may be prevented from catching bubbles when laminated with a polarizing film.

The curl value may be determined according to the method defined by the American National Standard Institute (ANSI/ASCPH1.29-1985).

(Tear Strength)

Preferably, the transparent film having a thickness of from 20 to 80 µm has a tear strength of at least 2 g, measured according to the tear test method of JISK7128-2:1998 (Elmendorf tear test method), more preferably from 5 to 25 g, even more preferably from 6 to 25 g. Also preferably, the tear strength of the film having a thickness of 60 µm is at least 8 g, more preferably from 8 to 15 g. Concretely, a sample piece having a size of 50 mm×64 mm is conditioned at 25° C. and 65% RH, and then tested with a light load tear strength tester to measure its tear strength.

[Solvent Remaining in Film]

It is desirable that the transparent film of the invention is dried under the condition under which the solvent amount remaining in the film could be from 0.01 to 1.5% by mass, more preferably from 0.01 to 1.0% by mass. The solvent amount to remain in the transparent support for use in the invention is controlled to at most 1.5%, whereby the film curling may be reduced. More preferably, it is at most 1.0%. The essential reason for it may be because, since the solvent amount to remain in the film formed according to the above-mentioned solvent casting method is reduced, the free volume of the film could be reduced.

[Moisture-Absorbing Expansion Coefficient of Film]

Preferably, the moisture-absorbing expansion coefficient of the transparent film of the invention is at most $30 \times 10^{-5}$/% RH, more preferably at most $15 \times 10^{-5}$/% RH, even more preferably at most $10 \times 10^{-5}$/% RH. The moisture-absorbing expansion coefficient of the transparent film is preferably smaller, but in general, it may be at least $1.0 \times 10^{-5}$/% RH. The moisture-absorbing expansion coefficient means the change of the length of a sample when the relative humidity around the sample is changed at a constant temperature. When the moisture-absorbing expansion coefficient is controlled as above and when the transparent film is used as a support for optical compensatory films, then frame-like transmittance increase, or that is, strain-caused light leakage can be prevented while the optical compensatory function of the optical compensatory films is kept as such.

[Surface Treatment]

If desired, the transparent film of the invention may be subjected to surface treatment to thereby increase the adhesiveness of the film to various functional layers (e.g., undercoat layer, back layer). For example, the film may be subjected to glow discharge treatment, UV irradiation treatment, corona treatment, flame treatment, or acid or alkali treatment. The glow discharge treatment may be effected with low-temperature plasma to occur in low-pressure gas at $10^{-3}$ to 20 Torr, but atmospheric plasma treatment may be preferred for it. Plasma-excitable vapor is a vapor capable of being plasma-excited under the condition as above, including, for example, argon, helium, neon, krypton, xenon, nitrogen, carbon dioxide, flons such as tetrafluoromethane, and their mixtures. These are described in detail in Hatsumei Kyokai's Disclosure Bulletin 2001-1745 (issued Mar. 15, 2001, pp. 30-32), and are preferably used in the invention.

[Functional Layer]

The applications of the transparent film of the invention include optical applications and photographic materials. The optical applications of the film are especially preferably for liquid-crystal display devices, more preferably those that comprise a liquid-crystal cell carrying liquid crystal between two electrode substrates, two polarizing elements disposed on both sides thereof, and at least one optical compensatory sheet disposed between the liquid-crystal cell and the polarizing element. For the liquid-crystal display devices, preferred are TN, IPS, FLC, AFLC, OCB, STN, ECB, VA and HAN.

When the optical film is used for these optical applications, various functional layers may be added to it. The layers are, for example, antistatic layer, cured resin layer (transparent hard coat layer), antireflection layer, easily-adhesive layer, antiglare layer, optical compensatory layer, alignment layer, liquid-crystal layer. These functional layers and their materials that may be used for the transparent film includes surfactant, lubricant, mat agent, antistatic layer and hard coat layer, and they are described in detail in Hatsumei Kyokai's Disclosure Bulletin 2001-1745 (issued Mar. 15, 2001, pp. 32-45), and are preferably used also in the invention.

[Use (Polarizing Plate)]

Use of the transparent film of the invention is described.

The transparent film of the invention is especially useful for a protective film for polarizing plates. When it is used as a protective film for polarizing plates, then the method of forming polarizing plates is not specifically defined, and polarizing plates may be formed in any ordinary method. For example, employable is a method that comprises processing a transparent film with alkali, and laminating it onto both faces of a polarizer prepared by dipping and stretching a polyvinyl alcohol film in an iodine solution, with an aqueous solution of a completely-saponified polyvinyl alcohol. In place of the alkali treatment, the film may be subjected to any other adhesiveness-improving treatment as in JPA No. 6-94915 and 6-118232.

The adhesive to be used for laminating the polarizer with a protective film on its processed surface includes, for example, polyvinyl alcohol-type adhesives such as polyvinyl alcohol and polyvinyl butyral; and vinyl-type latexes such as butyl acrylate.

A polarizing plate is composed of a polarizer and a protective film to protect both faces of the polarizer, and, in addition, it has a protect film stuck to one surface thereof and a separate film stuck to the other surface thereof. The protect film and the separate film are used for the purpose of protecting the polarizing plate during its transportation and inspection. In this case, the protect film is stuck for the purpose of protecting the surface of the polarizing plate, and it is stuck to the polarizing plate on the side thereof opposite to the side to be stuck to a liquid-crystal plate. The separate film is used for the purpose of covering the adhesive layer to be stuck to a liquid-crystal plate, and this is used on the side via which the polarizing plate is stuck to a liquid-crystal plate In general, a liquid-crystal display device comprises a liquid crystal-containing substrate sandwiched between two polarizing plates. In this, the transparent film of the invention that serves as the protective film for the polarizing plate may be disposed in any position, and the device exhibits good display capability. In particular, since the protective film for the polarizing plate to be on the outermost surface of the display panel of a liquid-crystal display device has a transparent hard coat layer, an antiglare layer and an antireflection layer formed thereon, it is especially desirable that the transparent film of the invention is used for the protective film for the polarizing plate to be in that place.

[Use (Optical Compensatory Film)]

The transparent film of the invention has many applications. The transparent film of the present invention is especially useful as an optical compensatory film in liquid-crystal display devices. An optical compensatory film is generally used in liquid-crystal display devices, and this is an optical member for compensating retardation. The optical compensatory film has the same meaning as that of a phase retarder and an optical compensatory sheet. The optical compensatory film has a property of birefringence, and it is used for the purpose of removing coloration of display panels of liquid-crystal display devices and for improving the viewing angle characteristics of the devices.

Accordingly, when the transparent film of the invention is used as an optical compensatory film in liquid-crystal display devices, it may be combined with an optically-anisotropic layer of any type required in optical compensatory films, not limited by the optical property and the driving system of the liquid-crystal cell in the liquid-crystal display device in which the film is to be used. The optically-anisotropic layer to be combined with the film may be formed of a composition containing a liquid-crystal compound, or may be formed of a polymer film having a property of birefringence.

The liquid-crystal compound is preferably a discotic liquid-crystal compound or a rod-like liquid-crystal compound.

For example, when the transparent film of the invention is used in IPS-mode liquid-crystal display devices, it is preferably combined with two optical compensatory films. In an embodiment comprising a first polarizing film, a second optical compensatory film, a first optical compensatory film, an IPS-mode liquid-crystal cell, a transparent film and a second polarizing film disposed in this order, a preferred example of the combination of the first and second optical compensatory films to be combined is a combination of a second optical compensatory film having Re of not greater than 100 nm and a thickness-direction retardation Rth of not greater than 200 nm, and a first optical compensatory film of which the refractivity anisotropy is negative and the optical axis is substantially parallel to the layer face and of which Re falls within the range from 50 nm to 400 nm. In this example, the first optical compensatory film is so disposed that its slow axis is parallel to the transmission axis of the first polarizing film and to the slow axis direction of the liquid-crystal molecules contained in the liquid-crystal cell in a black state.

Another preferred example of the combination of the first and second optical compensatory films to be combined is a combination of a second optical compensatory film having Re of not greater than 100 nm and Rth of not greater than 200 nm, and a first optical compensatory film which satisfies Nz=(nx−nz)/(nx−ny) falling within the range from 0.2 to 0.8 where nx and ny are the in-plane refractive index of the film (nx≧ny), nz is the thickness-direction refractive index of the film, and d is the thickness of the film, and of which Re falls within the range from 50 nm to 400 nm.

The IPS-mode liquid-crystal display is described hereinafter.

(Second Optical Compensatory Film)

In both examples, the optical characteristics of the second optical compensatory film are preferably as follows: The in-plane retardation Re defined by Re=(nx−ny)×d, where nx and ny are the in-plane refractive index of the film (nx≧ny), nz is the thickness-direction refractive index of the film, and d is the thickness of the film, is not greater than 100 nm, more preferably not greater than 70 nm. Also in both the former and latter examples, the thickness-direction retardation Rth defined by Rth={(nx+ny)/2−nz}×d is preferably not greater than 200 nm, more preferably from 60 nm to 150 nm, even more preferably from 70 nm to 130 nm. When Re is not greater than 20 nm, then the slow axis direction of the first optical compensatory film is not specifically defined; but when Re is greater than 20 nm, then it is more desirable that the slow axis direction of the first optical compensatory film is nearly perpendicular to or nearly parallel to the transmission axis of the second polarizing film.

(First Optical Compensatory Film)

In the former example, the first optical compensatory film is preferably as follows: Its refractivity anisotropy is negative and its optical axis is substantially parallel to the layer face, and its Re falls within the range from 50 nm to 400 nm, more preferably from 80 to 250 nm, even more preferably from 100 to 150 nm. In the latter example, Nz preferably falls within the range from 0.2 to 0.8, more preferably between 0.2 and 0.6, even more preferably between 0.25 and 0.5, and Re preferably falls within the range from 50 nm to 400 nm, more preferably from 80 to 300 nm, even more preferably from 100 to 280 nm. When the first optical compensatory film is formed of discotic liquid-crystal molecules, then its Re is controlled by controlling the thickness of the discotic liquid-crystal layer of the film. Further, the discotic liquid-crystal compound must be so aligned that its disc face is substantially vertical to the film face (at a mean tilt angle falling within the range from 70 to 90 degrees). The discotic liquid-crystal compound may be aligned obliquely, or may be so aligned that its tilt angle gradually varies (hybrid alignment). In the case of tilt alignment or hybrid alignment, it is desirable that the mean tilt angle falls within the range from 70° to 90°, more preferably from 75° to 90°, most preferably from 80° to 90°. If the mean tilt angle is smaller than the range, then the light leakage distribution may be asymmetric.

When the first optical compensatory film is formed of a biaxially-stretched film, for example, it may be formed as follows: A shrinkable film is adhered to and laminated on one or both surfaces of a resin film to fabricate a laminate, and this is stretched under heat. In that manner, the thus-stretched resin film may receive a shrinking force given thereto in the direction perpendicular to the stretching direction of the film. The resin film to be stretched may be formed in any method, for example, according to a casting method or an extrusion method. The resin may have positive or negative birefringence characteristics, and preferably it may form films of high transparency. The resin having positive birefringence characteristics may be any ordinary resin, including, for example, polycarbonate, polyvinyl alcohol, cellulose acetate, polyester, polyarylate, polyimide, polyolefin. In particular, amorphous and transparent thermoplastic resin and aromatic polycarbonate are preferably used. The resin having negative birefringence characteristics includes, for example, polystyrene, styrene-based copolymer, polymethyl methacrylate, and methyl methacrylate-based copolymer. In particular, preferred for use herein are polystyrene and styrene-based copolymer such as styrene/acrylonitrile copolymer, styrene/methacrylic acid copolymer, styrene/methyl methacrylate copolymer, styrene/butadiene copolymer, styrene/maleic anhydride copolymer. For giving a shrinking force to the film being stretched, in the direction perpendicular to the stretching direction of the film, for example, employable is a method of adhering a shrinking film capable of shrinking in the direction perpendicular to or crossing the stretching direction of the film being stretched, to one or both faces of the resin film to be stretched under heat, and heating and stretching the laminate film. Accordingly, based on the shrinking force running in the perpendicular or crossing direction of the shrinking film, the resin film being stretched may receive a stretching stress generated in the thickness direction of the film and therefore an optical compensatory film that satisfies the desired Nz value can be obtained. This is described in detail in JPA NO. 5-157911.

The first and second optical compensatory films may have an optically-anisotropic layer of liquid-crystal molecules, or may be formed of a stretched polymer film. Preferably, at least one of them has an optically-anisotropic layer of discotic liquid-crystal molecules, or at least one of them is formed of a biaxially-stretched polymer film.

(Discotic Liquid-Crystal Compound)

Examples of the discotic liquid-crystal compound usable in the invention are described in various references (C. Destrade et al., *Mol. Cryst. Liq. Cryst.*, Vol. 71, p. 111 (1981); *Quarterly Journal of Outline of Chemistry*, by the Chemical Society of Japan, No. 22, Chemistry of Liquid Crystal, Chap. 5, Chap. 10 Sec. 2 (1994); B. Kohne et al., *Angew. Chem. Soc. Chem. Comm.*, p. 1794 (1985); J. Zhang et al., *J. Am. Chem. Soc.*, Vol. 116, p. 2655 (1994)).

Preferably, the discotic liquid-crystal compound has a polymerizable group so that it may be fixed through polymerization. For example, the discotic liquid-crystal compound may have a structure having a disc core with a polymerizable group substituent bonding thereto. However, when a polymerizable group is directly bonded to the disc core, then the compound could hardly keep the aligned state thereof during polymerization. Therefore, the compound preferably has a structure which has a linking group between the disc core and the polymerizable group. Specifically, it is desirable that the polymerizable group-having discotic liquid-crystal compound is represented by the following formula:

$$D(-L-P)_n$$

wherein D represents a disc core; L represents a divalent linking group; P is a polymerizable group; n indicates an integer of from 4 to 12. Preferred examples of the disc core (D), the divalent linking group (L) and the polymerizable group (P) in the formula are (D1) to (D15), (L1) to (L25) and (P1) to (P18), respectively, described in JPA NO. 2001-4837; and the contents of the patent publication are preferably employed in the invention.

The optically-anisotropic layer of discotic liquid-crystal molecules may be formed as follows: A coating solution that comprises a discotic liquid-crystal compound and optionally additives such as a polymerization initiator and an air interface horizontal aligning agent (e.g., described in Japanese Patent Application No. 2003-388308) is applied onto a horizontally-aligned film formed on a support. The alignment film that acts to horizontally align the discotic liquid-crystal layer may be a polymer alignment film of polyvinyl alcohol, polyimide, polyamide or acryl having a solid (e.g., organic acid, salt) content of smaller than 0.1% by mass. After the alignment film has been formed, it may be or may not be rubbed.

The retardation film formed of the birefringent polymer film having the above-mentioned optical characteristics may be readily formed by monoaxially or biaxially stretching a polymer film (e.g., JPA NO. 2002-139621, 2002-146045). Cellulose acylates having the optical characteristics described above can be also produced merely by casting them and without stretching the cast films. The cellulose acylates are described in JPA NO. 2000-275434, 2001-166144, 2002-161144, 2002-90541, and these may be used herein. As the material of polymer films, generally used are synthetic polymers (e.g., polycarbonate, polysulfone, polyether sulfone, polyacrylate, polymethacrylate, norbornene resin, cellulose acetate).

Examples of the retardation film formed on a transparent support in a mode of coating or transferring are described. A chiral structure unit-containing, rod-like cholesteric liquid-crystal composition is so aligned that its helical axis could be nearly perpendicular to the substrate, and then fixed. A discotic liquid-crystal compound having a negative birefringence is aligned horizontally (its director is vertical to the substrate). A polyimide polymer is cast and fixed on the substrate.

For the polymer film to form the retardation film on a transparent support in a mode of coating or transferring, usable is at least one polymer material selected from polyamide, polyimide, polyester, polyether ketone, polyamidimide-polyester imide, and polyaryl-ether ketone. This is dissolved in a solvent, then the resulting solution is applied to a substrate, and the solvent is evaporated away to form a film on the film. This method is favorably employed herein. In this case, also preferred is a method of stretching the polymer film and the substrate so as to make the film have optical anisotropy, and the film thus processed may be used as an optically-anisotropic layer. The transparent film of the invention is preferably used as the support in these embodiments. Another preferred method is as follows: The polymer film is formed on a different substrate, and this is peeled from it, and then this is stuck to the transparent film of the invention to give an optically-anisotropic layer having a laminate structure. In this method, the polymer film may be thinned, and its thickness is preferably at most 50 μm, more preferably from 1 to 20 μm.

(Rod-Like Liquid-Crystal Compound)

Examples of the rod-like liquid-crystal compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substitutedphenylpyrimidines, phenyldioxanes, tolans, and alkenylcyclohexylbenzonitriles. Not only such low-molecular liquid-crystal compounds, but also high-molecular liquid-crystal compounds may also be usable herein.

In the optically-anisotropic layer, it is desirable that the rod-like liquid-crystal molecules are fixed in an aligned state, most preferably they are fixed through polymerization. Examples of the polymerizable rod-like liquid-crystal compound usable in the invention are described in *Makrornol. Chem., Vol.* 190, p. 2255 (1989); *Advanced Materials, Vol.* 5, p. 107 (1993); U.S. Pat. Nos. 4,683,327, 5,622,648, 5,770,107; International Patents (WO) 95/22586, 95/24455, 97/00600/98/23580, 98/52905; JPA NO. 1-272551, 6-16616, 7-110469, 11-80081, 2001-328973.

(Optically-Anisotropic Layer of Polymer Film)

As described in the above, the optically-anisotropic layer may be formed of a polymer film. The polymer film is formed from a polymer capable of expressing optical anisotropy. Examples of the polymer are polyolefin (e.g., polyethylene, polypropylene, norbornene-based polymer), polycarbonate, polyarylate, polysulfone, polyvinyl alcohol, polymethacrylate, polyacrylate and cellulose ester (e.g., cellulose triacetate, cellulose diacetate). Copolymers or mixtures of these polymers may also be usable herein.

The optical anisotropy of the polymer film is preferably generated by stretching. The stretching is preferably monoaxial stretching or biaxial stretching. Concretely, preferred is machine-direction monoaxial stretching to be attained by utilizing the peripheral speed difference between two or more rolls; or tenter stretching to be attained by clipping both sides of a polymer film and stretching it in the cross direction; or biaxial stretching comprising a combination of these. If desired, two or more polymer films may be used so that the overall optical properties of these two or more films may satisfy the above-mentioned conditions. Preferably, the polymer film is produced according to a solvent casting method in order that the birefringence unevenness of the film is reduced as much as possible. Preferably, the thickness of the polymer film falls between 20 and 500 most preferably between 40 and 100 μm.

(Constitution of General Liquid-Crystal Display Device)

When the transparent film of the invention is used as an optical compensatory film, the transmission axis of the polarizer element may be at any angle to the slow axis of the optical compensatory film of the transparent film. A liquid-crystal display device comprises a liquid-crystal cell that carries a liquid crystal between two electrode substrates, two polarizing elements disposed on both sides of the cell, and at least one optical compensatory film disposed between the liquid-crystal cell and the polarizing element.

The liquid-crystal layer of the liquid-crystal cell is generally formed by introducing a liquid crystal into the space formed by two substrates via a spacer put therebetween, and sealed up in it. A transparent electrode layer is formed on a substrate as a transparent film that contains a conductive substance. The liquid-crystal cell may further has a gas barrier layer, a hard coat layer or an undercoat layer (for adhesion to transparent electrode layer). These layers are generally formed on a substrate. The substrate of the liquid-crystal cell generally has a thickness of from 50 μm to 2 mm.

(Type of Liquid-Crystal Display Device)

The transparent film of the invention may be used for liquid-crystal cells of various display modes. Various display modes such as TN (twisted nematic), IPS (in-plane switching), FLC (ferroelectric liquid-crystal), AFLC (anti-ferroelectric liquid-crystal), OCB (optically-compensatory bend), STN (super-twisted nematic), VA (vertically aligned), ECB (electrically-controlled birefringende) and HAN (hybrid aligned nematic) modes have been proposed. Display mode in which the above-described display modes are alignment-divided is also proposed. The transparent film of the invention is effective in liquid-crystal display devices of any display mode. Further, it is also effective in any of transmission-type, reflection-type and semitransmission-type liquid-crystal display devices.

(TN-Mode Liquid-Crystal Display Device)

The transparent film of the invention may be used as a support of the optical compensatory sheet in TN-mode liquid-crystal cell-having TN-mode liquid-crystal display devices. TN-mode liquid-crystal cells and TN-mode liquid-crystal display devices are well known from the past. The optical compensatory sheet to be used in TN-mode liquid-crystal display devices is described in JPA NO. 3-9325, 6-148429, 8-50206, 9-26572. In addition, it is also described in Mori et al's reports (*Jpn. J. Appl. Phys., Vol.* 36 (1997), p. 143; *Jpn. J. Appl. Phys., Vol.* 36 (1997), p. 1068).

(STN-Mode Liquid-Crystal Display Device)

The transparent film of the invention may be used as a support of the optical compensatory sheet in STN-mode liquid-crystal cell-having STN-mode liquid-crystal display devices. In general, the rod-like liquid-crystal molecules in the liquid-crystal cell in an STN-mode liquid-crystal display device are twisted within a range of from 90 to 360 degrees, and the product of the refractivity anisotropy (Δn) of the rod-like liquid-crystal molecules and the cell gap (d), And falls within the range from 300 to 1500 nm. The optical compensatory sheet to be used in STN-mode liquid-crystal display devices is described in JPA NO. 2000-105316.

(VA-Mode Liquid-Crystal Display Device)

The transparent film of the invention is especially favorable for a support of the optical compensatory sheet in VA-mode liquid-crystal cell-having VA-mode liquid-crystal display devices. Preferably, the optical compensatory sheet for use in VA-mode liquid-crystal display devices has a retardation Re of from 0 to 150 nm and a retardation Rth of from 70 to 400 nm. More preferably, the retardation Re of the sheet is from 20 to 70 nm. When two optically-anisotropic polymer films are used in a VA-mode liquid-crystal display device, then the retardation Rth of the films preferably falls within the range from 70 to 250 nm. When one optically-anisotropic polymer film is used in a VA-mode liquid-crystal display device, then the retardation Rth of the film preferably falls within the range from 150 to 400 nm. The VA-mode liquid-crystal display devices for the invention may have an alignment-divided system, for example, as in JPA NO. 10-123576.

(IPS-Mode Liquid-Crystal Display Device, and ECB-Mode Liquid-Crystal Display Device)

The transparent film of the invention is also favorable for a support of the optical compensatory sheet and for a protective film of the polarizing plate in IPS-mode or ECB-mode liquid-crystal cell-having IPS-mode liquid-crystal display devices and ECB-mode liquid-crystal display devices. In these modes, the liquid-crystal material is aligned nearly in parallel to the film face in a black state, and the liquid-crystal molecules are aligned in parallel to the surface of the substrate when no voltage is applied to the device for a black state. In these embodiments, the polarizing plate that comprises the transparent film of the invention contributes to enlarging the viewing angle and to improving the image contrast. In these embodiments, the retardation value of the optically-anisotropic layer disposed between the protective film of the polarizing plate and the liquid crystal cell is preferably at most 2 times the value of Δn·d of the liquid-crystal layer. Also preferably, the absolute value of Rth|Rth| is not greater than 25 nm, more preferably not greater than 20 nm, and even more preferably not greater than 15 nm. Accordingly, the transparent film of the invention is favorably used.

(OCB-Mode Liquid-Crystal Display Device, and HAN-Mode Liquid-Crystal Display Device)

The transparent film of the invention is also favorable for a support of the optical compensatory sheet in OCB-mode liquid-crystal cell-having OCB-mode liquid-crystal display devices and HAN-mode liquid-crystal cell-having HAN-mode liquid-crystal display devices. Preferably, the optical compensatory sheet for use in OCB-mode liquid-crystal display devices and HAN-mode liquid-crystal display devices is so designed that the direction in which the absolute value of the retardation of the sheet is the smallest does not exist both in the in-plane direction and in the normal line direction of the optical compensatory sheet. The optical properties of the optical compensatory sheet for use in OCB-mode liquid-crystal display devices and HAN-mode liquid-crystal display devices are determined, depending on the optical properties of the optically-anisotropic layer, the optical properties of the support and the positional relationship between the optically-anisotropic layer and the support. The optical compensatory sheet for use in OCB-mode liquid-crystal display devices and HAN-mode liquid-crystal display devices is described in JPA NO. 9-197397. It is described also in Mori et al's reports (*Jpn. J. Appl. Phys.*, Vol. 38 (1999), p. 2837).

(Reflection-Type Liquid-Crystal Display Device)

The transparent film of the invention is also favorably used for an optical compensatory film in TN-mode, STN-mode, HAN-mode or GH (guest-host)-mode reflection-type liquid-crystal display devices. These display modes are well known from the past. TN-mode reflection-type liquid-crystal devices are described in JPA NO. 10-123478, WO 98-48320, and Japanese Patent 3022477. The optical compensatory film for use in reflection-type liquid-crystal display devices is described in WO 00-65384.

(Other Liquid-Crystal Display Devices)

The transparent film of the invention is also favorably used as a support of the optical compensatory sheet in ASM (axially symmetric aligned microcell)-mode liquid-crystal cell-having ASM-mode liquid-crystal display devices. The liquid-crystal cell in ASM-mode devices is characterized in that it is supported by a resin spacer capable of controlling and varying the thickness of the cell. The other properties of the cell are the same as those of the liquid-crystal cell in TN-mode devices. ASM-mode liquid-crystal cells and ASM-mode liquid-crystal display devices are described in Kume et al's report (Kume et al., *SID* 98 Digest 1089 (1998)).

(Hard Coat Film, Antiglare Film, Antireflection Film)

The transparent film of the invention is favorably applied to hard coat films, antiglare films and antireflection films. For the purpose of improving the visibility of flat panel displays such as LCD, PDP, CRT, EL, any or all of a hard coat layer, an antiglare layer and an antireflection layer may be fitted to one or both faces of the transparent film of the invention. Preferred embodiments of such antiglare films and antireflection films are described in Hatsumei Kyokai's Disclosure Bulletin 2001-1745 (issued Mar. 15, 2001, pp. 54-57), and the transparent film of the invention may be favorably used in these.

(Photographic Film Support)

The transparent film, preferably cellulose acylate film, of the invention is applicable to supports of silver halide photographic materials. Various materials and formulations and methods for processing them are described in some patent publications, and they may apply to the invention. Regarding the techniques, JPA NO. 2000-105445 has detailed descriptions of color negative films, and the cellulose acylate film of the invention is favorably used in these. Also preferably, the film of the invention is applicable to supports of color reversal silver halide photographic materials, and various materials and formulations and methods for processing them described in JPA NO. 11-282119 are applicable to the invention.

(Transparent Substrate)

Since the transparent film, preferably cellulose acylate film, of the invention does not almost have optical anisotropy and has good transparency, it may be substitutable for the glass substrate for liquid-crystal cells in liquid-crystal display devices, or that is, it may be usable as a transparent support for sealing up the driving liquid crystals in the devices. Since the transparent substrate for sealing up liquid crystal must have a good gas-barrier property, a gas-barrier layer may be optionally fitted to the surface of the cellulose acylate film of the invention, if desired. The morphology and the material of the gas-barrier layer are not specifically defined. For example, $SiO_2$ may be deposited on at least one face of the cellulose acylate film of the invention, or a polymer coating layer of a vinylidene-based polymer or a vinyl alcohol-based polymer having a relatively higher gas-barrier property may be formed on the film of the invention. These techniques may be suitably selected for use in the invention. When the film of the invention is used as a transparent substrate for sealing up liquid crystal, a transparent electrode may be fitted to it for driving liquid crystal through voltage application thereto. The transparent electrode is not specifically defined. For example, a metal film or a metal oxide film may be laminated on at least one surface of the cellulose acylate film of the invention so as to form a transparent electrode on it. Above all, a metal oxide film is preferred in view of the transparency, the electroconductivity and the mechanical characteristics of the film; and a thin film of indium oxide essentially comprising tin oxide and containing from 2 to 15% of zinc oxide is more preferred. This technique is described in detail, for example, in JPA NO. 2001-125079 and 2000-22760.

EXAMPLES

The invention is described more concretely with reference to the following Examples. The material, the reagent, the blend ratio and the treatment shown in the following Examples may be suitably changed and modified not overstepping the scope and the sprit of the invention. Accordingly, the scope of the invention should not be limited by the following Examples.

Example 1-1

Formation of Transparent Film

A polycarbonate film "Panlite C1400" (by Teijin Chemical), a thermoplastic norbornene resin (JSR's Arton) and Zeonoa (by Nippon Zeon) were dissolved in methylene chloride to prepare a solution. A compound having the ability to reduce optical anisotropy (Re (λ) and Rth (λ)), shown in Table 1-1, was added to the solution in a predetermined amount relative to the polymer solid content of the solution, and the resulting solution was cast to form a transparent film having a thickness of 40 μm (001 to 006). Regarding the optical properties thereof, it is understood that the positivity/negativity of Rth of the transparent films of the invention, 002, 004 and 006 is reversed at 400 nm and 700 nm.

TABLE 1-1

| Sample Number | | Polymer Material | Optical Anisotropy-Reducing Agent | | Film Thickness μm | Re (630) nm | Rth (630) nm | Rth (400) nm | Rth (700) nm |
| --- | --- | --- | --- | --- | --- | --- | --- | --- | --- |
| | | | Compound | Amount Added % (polymer solid content 100) | | | | | |
| Com. Ex. *1 | 001 | Panlite C1400 | No | — | 40 | 12 | 21 | 7 | 27 |
| In. *2 | 002 | Panlite C1400 | A-19 | 5% | 40 | 6 | 13 | −1 | 20 |
| Com. Ex. *1 | 003 | Arton | No | — | 40 | 6 | 13 | 11 | 13 |
| In. *2 | 004 | Arton | A-19 | 5% | 40 | 4 | 7 | −2 | 11 |
| In. *2 | 005 | Zeonoa | No | — | 40 | 2 | 9 | 8 | 9 |
| In. *2 | 006 | Zeonoa | A-19 | 5% | 40 | 1 | 4 | −2 | 6 |

*1 Comparative Example
*2 the Invention (Fabrication of Polarizing Plate)

A rolled polyvinyl alcohol film having a thickness of 80 μm was continuously stretched by 5 times in an aqueous iodine solution, and dried to obtain a polarizing film having a thickness of 20 μm. Two transparent films 001 were prepared. Using an adhesive, these were stuck to both faces of the polarizing film so that the polarizing film was thus sandwiched between the two transparent films. A polarizing plate of which the two faces were protected with the transparent film 001 was fabricated. In this case, the transparent films 001 were so stuck to the polarizing film that the slow axis of the film 001 could be parallel to the transmission axis of the polarizing film. A polarizing plate 001 was thus fabricated. In the same manner as herein, other transparent films 002 to 006 were used to fabricate polarizing plates. These are polarizing plates 002 to 006.

Example 1-2

Formation of Transparent Film (Preparation of Cellulose Acylate Solution)

Using various cellulose acylates as in Table 1-2, the following composition was put into a mixing tank and stirred to dissolve the components, thereby preparing a cellulose acylate solution.
(Composition of Cellulose Acylate Solution)

| Cellulose acylate | 100.0 mas. pts. |
| --- | --- |
| Methylene chloride (first solvent) | 402.0 mas. pts. |
| Methanol (second solvent) | 60.0 mas. pts. |

(Preparation of Mat Agent Solution)

20 parts by mass of silica particles having a mean particle size of 16 nm (Aerosil R972 by Nippon Aerosil) and 80 parts by weight of methanol were well stirred and mixed for 30 minutes to prepare a dispersion of silica particles. The dispersion was put into a disperser along with the following composition thereinto, and further stirred therein for 30 minutes or more to dissolve the components, thereby preparing a mat agent solution.
(Composition of Mat Agent Solution)

| Dispersion of silica particles having a mean particle size of 16 nm | 10.0 mas. pts. |
| --- | --- |

-continued

| Methylene chloride (first solvent) | 76.3 mas. pts. |
| --- | --- |
| Methanol (second solvent) | 3.4 mas. pts. |
| Cellulose acylate solution | 10.0 mas. pts. |

(Preparation of Additive Solution)

The following composition was put into a mixing tank, and heated with stirring to dissolve the components, thereby preparing a cellulose acylate solution. The optical anisotropy-reducing compound and the wavelength dispersion-controlling agent used herein are shown in Table 1-2.
(Composition of Additive Solution)

| Optical anisotropy-reducing compound | 49.3 to 76.7 mas. pts. |
| --- | --- |
| Wavelength dispersion-controlling agent | 10.1 mas. pts. |
| Methylene chloride (first solvent) | 58.4 mas. pts. |
| Methanol (second solvent) | 8.7 mas. pts. |
| Cellulose acylate solution | 12.8 mas. pts. |

(Fabrication of Transparent Film of Cellulose Acylate)

94.6 parts by mass of the cellulose acylate solution, 1.3 parts by mass of the mat agent solution, and 4.1 parts by mass of the additive solution were separately filtered, and then mixed. Using a band caster, the mixture was cast on a band. In the above-mentioned composition, the ratio by mass of the optical anisotropy-reducing compound and the wavelength dispersion-controlling agent to cellulose acylate was 12% and 1.8%, respectively. The film having a remaining solvent content of 30% was peeled away from the band, and dried at 140° C. for 40 minutes. Comparative samples 101 and 102, and transparent film samples of the invention 103 to 121 were thus fabricated. The remaining solvent content of the transparent films thus fabricated was at most 0.2%, and the thickness thereof was from 40 to 104 Regarding the optical properties thereof, it is understood that the positivity/negativity of Rth of the transparent films of the invention, 103 to 121 is reversed at 400 nm and 700 nm.

TABLE 1-2

| Sample Number | | Polymer Material | Degree of Acyl Substitution of Cellulose Acylate | Optical Anisotropy-Reducing Agent compound (log P) | Optical Anisotropy-Reducing Agent amount added % (polymer solid content 100) | Wavelength Dispersion-Controlling Agent compound | Wavelength Dispersion-Controlling Agent amount added | Film Thickness μm | Re (630) nm | Rth (630) nm | Rth (400) nm | Rth (700) nm | Light Leakage (%) (Example 1-3) |
|---|---|---|---|---|---|---|---|---|---|---|---|---|---|
| Com. Ex. | 101 | cellulose acylate | 2.86 (acetyl 2.86) | No | — | no | — | 40 | 3.1 | 33 | 5 | 44 | 0.42 |
| Com. Ex. | 102 | cellulose acylate | 2.86 (acetyl 2.86) | BDP (7.73) | 12% | no | — | 40 | 2.7 | 34 | 7 | 41 | 0.37 |
| In. | 103 | cellulose acylate | 2.86 (acetyl 2.86) | A-19 (2.9) | 12% | no | — | 40 | 0.4 | −1 | −29 | 10 | 0.03 |
| In. | 104 | cellulose acylate | 2.86 (acetyl 2.86) | A-19 (2.9) | 12% | UV-102 | 2.4% | 40 | 0.6 | 3 | −5 | 7 | 0.03 |
| In. | 105 | cellulose acylate | 2.86 (acetyl 2.86) | A-19 (2.9) | 12% | UV-102 | 2.4% | 80 | 1.2 | 9 | −17 | 19 | 0.03 |
| In. | 106 | cellulose acylate | 2.86 (acetyl 2.86) | A-19 (2.9) | 16% | UV-102 | 2.4% | 40 | 0.5 | 2 | −7 | 5 | 0.02 |
| In. | 107 | cellulose acylate | 2.86 (acetyl 2.86) | A-19 (2.9) | 16% | UV-102 | 2.4% | 80 | 1.0 | 7 | −13 | 16 | 0.02 |
| In. | 108 | cellulose acylate | 2.86 (acetyl 2.86) | FB-6 (5.3) | 12% | UV-102 | 2.4% | 40 | 0.4 | 1 | −7 | 5 | 0.02 |
| In. | 109 | cellulose acylate | 2.86 (acetyl 2.86) | B-10 (4.8) | 12% | UV-102 | 2.4% | 40 | 0.6 | −2 | −10 | 2 | 0.03 |
| In. | 110 | cellulose acylate | 2.92 (acetyl 2.92) | A-19 (2.9) | 12% | UV-102 | 2.4% | 40 | 0.5 | 1 | −7 | 5 | 0.02 |
| In. | 111 | cellulose acylate | 2.92 (acetyl 2.92) | A-19 (2.9) | 12% | UV-102 | 2.4% | 80 | 1.1 | 7 | −19 | 17 | 0.04 |
| In. | 112 | cellulose acylate | 2.92 (acetyl 2.92) | A-19 (2.9) | 16% | UV-102 | 2.4% | 40 | 0.4 | 0 | −9 | 3 | 0.02 |
| In. | 113 | cellulose acylate | 2.92 (acetyl 2.92) | A-19 (2.9) | 16% | UV-102 | 2.4% | 80 | 0.9 | 5 | −15 | 14 | 0.03 |
| In. | 114 | cellulose acylate | 2.85 (acetyl 2.06 + propionyl 0.79) | A-19 (2.9) | 12% | UV-102 | 2.4% | 40 | 0.4 | −1 | −9 | 3 | 0.03 |
| In. | 115 | cellulose acylate | 2.85 (acetyl 2.06 + propionyl 0.79) | A-19 (2.9) | 12% | UV-102 | 2.4% | 80 | 1.0 | 5 | −21 | 15 | 0.04 |
| In. | 116 | cellulose acylate | 2.85 (acetyl 2.06 + propionyl 0.79) | A-19 (2.9) | 16% | UV-102 | 2.4% | 40 | 0.3 | −2 | −11 | 1 | 0.03 |
| In. | 117 | cellulose acylate | 2.85 (acetyl 2.06 + propionyl 0.79) | A-19 (2.9) | 16% | UV-102 | 2.4% | 80 | 0.8 | 3 | −17 | 12 | 0.03 |
| In. | 118 | cellulose acylate | 2.7 (acetyl 1.0 + butyryl 1.7) | A-19 (2.9) | 18% | UV-102 | 2.4% | 80 | 0.3 | 0 | −8 | 4 | 0.03 |
| In. | 119 | cellulose acylate | 2.7 (acetyl 1.0 + butyryl 1.7) | A-19 (2.9) | 20% | UV-102 | 2.4% | 88 | 0.9 | 6 | −20 | 16 | 0.04 |

TABLE 1-2-continued

| | | | Degree of Acyl Substitution of Cellulose Acylate | Optical Anisotropy-Reducing Agent | | Wavelength Dispersion-Controlling Agent | | Film Thickness μm | Re (630) nm | Rth (630) nm | Rth (400) nm | Rth (700) nm | Light Leakage (%) |
|---|---|---|---|---|---|---|---|---|---|---|---|---|---|
| Sample Number | | Polymer Material | | compound (log P) | amount added % (polymer solid content 100) | compound | amount added | | | | | | (Example 1-3) |
| In. | 120 | cellulose acylate | 2.7 (acetyl 1.0 + butyryl 1.7) | A-19 (2.9) | 21% | UV-102 | 2.4% | 96 | 0.2 | −1 | −10 | 2 | 0.03 |
| In. | 121 | cellulose acylate | 2.7 (acetyl 1.0 + butyryl 1.7) | A-19 (2.9) | 23% | UV-102 | 2.4% | 104 | 0.7 | 4 | −16 | 13 | 0.03 |

(Fabrication of Polarizing Plate)

The transparent film sample 101 was dipped in an aqueous solution of 1.5 N sodium hydroxide at 55° C. for 2 minutes. This was washed in a water bath at room temperature, and then neutralized with 0.1 N sulfuric acid at 30° C. Again this was washed in a water bath at room temperature, and dried with hot air at 100° C. In that manner, the surface of the transparent film was saponified.

Next, a rolled polyvinyl alcohol film having a thickness of 80 μm was continuously stretched by 5 times in an aqueous iodine solution, and dried to obtain a polarizing film having a thickness of 20 μm. Two saponified transparent films 101 were prepared. Using an aqueous 3% solution of polyvinyl alcohol (Kuraray's PVA-1171-1) as an adhesive, these films were stuck to both faces of the polarizing film so that the polarizing film was thus sandwiched between the two transparent films. A polarizing plate of which the two faces were protected with the transparent film 101 was fabricated. In this case, the transparent films 101 were so stuck to the polarizing film that the slow axis of the film 101 could be parallel to the transmission axis of the polarizing film. A transparent plate 101 was thus fabricated. In the same manner as herein, other transparent films 102 to 121 were used to fabricate polarizing plates. These are polarizing plates 102 to 121. These polarizing plates all had good polarizing properties.

Example 1-3

Evaluation of Transparent Film Fitted in Liquid-Crystal Display Device

Figure 7:
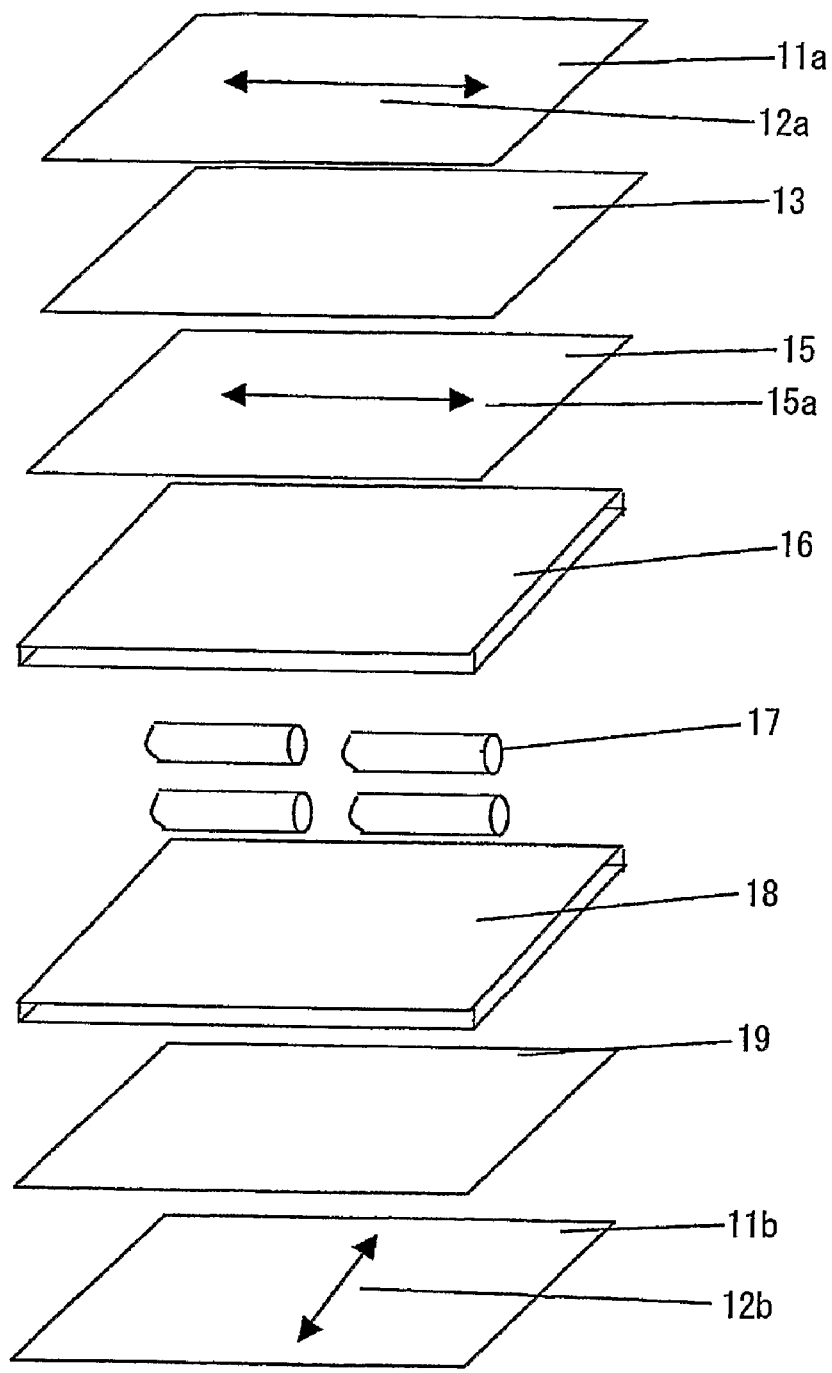
FIG. 7 is a schematic graphic view showing one example of a liquid-crystal display device of the invention.

An IPS-mode liquid-crystal display device having the constitution as in FIG. 7 was constructed. Concretely, liquid-crystal molecules 17 were put in and sealed up between a pair of substrates 16 and 18 to form a liquid crystal cell. The cell was disposed between a pair of polarizing films 11a and 11b. A transparent film 19 of the invention was disposed between the liquid-crystal cell and the lower polarizing film 11b; and a first optical compensatory film 15 and a second optical compensatory film 13 were disposed between the liquid-crystal cell and the upper polarizing film 11a. The relationship between the transmission axis 12a, 12b of the polarizing film and the slow axis 15a of the first optical compensatory film is described in each Example. In FIG. 7, the constitutive components are drawn as independent members for convenience sake. As the case may be, however, some member in this may be integrated with any other member, for example, the transparent film 19 may be integrated with the polarizing film 11b, serving as a protective film, and they may be built in the device.

Methods for fabricating the constitutive components are described in detail hereinunder.

(Construction of IPS-Mode Liquid-Crystal Cell)

Electrodes were mounted on one glass substrate in such a manner that the distance of the adjacent electrodes could be 20 μm, and a polyimide film serving as an alignment film was fitted to it. Then, this was rubbed. A polyimide film was stuck to one surface of another glass substrate prepared separately, and rubbed to be an alignment film. The two glass substrates were coupled and stuck to each other in such a manner that their alignment films could face to each other, their distance (gap: d) could be 3.9 μm and the rubbing direction of the two glass substrates could be in parallel. Then, a nematic liquid-crystal composition having a refractivity anisotropy (Δn) of 0.0769 and a dielectric anisotropy (Δ∈) of +4.5 was put into it and sealed up. The value of d·Δn of the liquid-crystal layer was 300 nm.

(Fabrication of Transparent Film 19, Lower Polarizing Plate 11b)

In this Example, the transparent film 19 is integrated with the lower polarizing plate 11b. Concretely, the polarizing plate 11b is selected from the polarizing plates 001 to 006 formed from the transparent films 001 to 006 in Example 1, and from the polarizing plates 101 to 121 formed from the transparent films 101 to 121 in Example 1-2.

(Fabrication of Second Optical Compensatory Film 13)

Fujitac TD80UF (by Fuji Photo Film) was monoaxially stretched by 15% at 150° C. in the machine direction to prepare an optical compensatory film 13. The optical characteristics of the film were as follows: Re=5 nm, Rth=70 nm.

(Fabrication of First Optical Compensatory Film 15)

The surface of the second optical compensatory film prepared as above was saponified, and a coating solution for alignment film having a composition mentioned below was applied onto it with a wire bar coater, in an amount of 20 ml/m². This was dried with hot air at 60° C. for 60 seconds and then with hot air at 100° C. for 120 seconds, and a film was formed on it. Next, this was rubbed in the direction parallel to the slow axis direction of the film formed thereon, and an alignment film was thus formed on it.

Composition of Coating Solution for Alignment Film:
Modified Polyvinyl Alcohol Mentioned Below

| Modified polyvinyl alcohol mentioned below | 10 mas. pts. |
| --- | --- |
| Water | 371 mas. pts. |
| Methanol | 119 mas. pts. |
| Glutaraldehyde | 0.5 mas. pts. |
| Tetramethylammonium fluoride | 0.3 mas. pts. |

Modified Polyvinyl Alcohol:

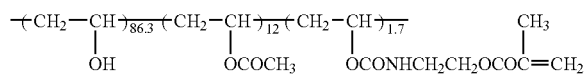

Next, 1.8 g of a discotic liquid-crystal compound mentioned below, 0.2 g of ethyleneoxide-modified trimethylolpropane triacrylate (V#360, by Osaka Yuki Kagaku), 0.06 g of a photopolymerization initiator (Irgacure 907, by Ciba-Geigy), 0.02 g of a sensitizer (Kayacure DETC, by Nippon Kayaku), and 0.01 g of a fluoropolymer (air interface-side vertical alignment agent) mentioned below were dissolved in 3.9 g of methyl ethyl ketone, and the resulting solution was applied onto the alignment film with a #5 wire bar. This was fitted to a metal frame, heated in a thermostat at 125° C. for 3 minutes, whereby the discotic liquid-crystal compound was aligned. Next, this was subjected to UV irradiation with a 120 W/cm high-pressure mercury lamp at 100° C. for 30 seconds, whereby the discotic liquid-crystal compound was crosslinked. Next, this was left cooled to room temperature. In that manner, a retardation film 2 was fabricated, comprising a first optical compensatory film formed on a second compensatory film.

Discotic Liquid-Crystal Compound:

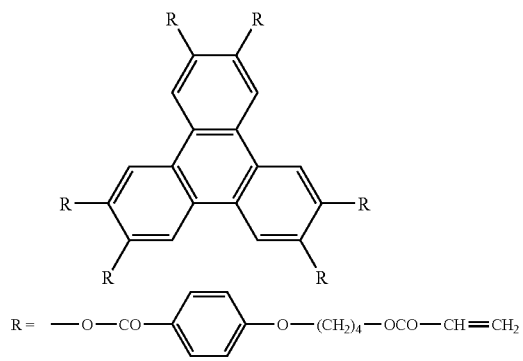

Fluoropolymer (Air Interface-Side Vertical Alignment Agent):

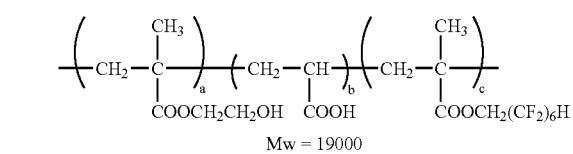

a/b/c = 15/5/80

The light incident angle dependency of Re of the thus-fabricated retardation film 2 was determined. The second optical compensatory film contribution that had been previously determined was subtracted from it, and the optical characteristic of the discotic liquid-crystal retardation layer (first optical compensatory film) alone was calculated. As a result, Re=110 nm, Rth=−55 nm, and the mean tilt angle of the liquid crystal was 89.9°. This confirms that the discotic liquid crystal was aligned vertically to the film face. The direction of the slow axis was parallel to the rubbing direction of the alignment film.

(Fabrication of Upper Polarizing Plate 11a)

Next, a stretched polyvinyl alcohol film was made to adsorb iodine thereby to prepare an upper polarizing film 11a. Using a polyvinyl alcohol adhesive, a cellulose acetate film (FujitacTD80UF, by Fuji Photo Film) was stuck to one surface of the polarizing film. Next, the retardation film 2 was stuck to the other surface of the polarizing film 11a in such a manner that the second optical compensatory film 13 could face the polarizing film 11a. In that manner, an upper polarizing plate was fabricated, as integrated with the optical compensatory layer.

(Construction of Liquid-Crystal Display Device)

Further, the IPS-mode cell was stuck to the first polarizing plate in such a manner that the first optical compensatory film could face the liquid-crystal cell. In this, the slow axis of the first optical compensatory film 15 and the liquid-crystal layer of the IPS-mode cell was parallel to the transmission axis 12a of the polarizing film 11a. Next, the second polarizing plate 11b fabricated in the above was stuck to it in such a manner that its transmission axis 12b could be perpendicular to the transmission axis 12a of the polarizing film 11a, and a liquid-crystal display device was thus constructed.

(Measurement of Light Leakage from Constructed Liquid-Crystal Display Device)

The thus-constructed liquid-crystal display device was observed in the left oblique direction at 60°, and checked for light leakage from it. The results are shown in Tables 1-1 and 1-2. The devices comprising the transparent film of the invention gave little light leakage as compared with those comprising the comparative sample, and this confirms that the transparent film of the invention is excellent in point of the image contrast in liquid-crystal display devices and the viewing angle characteristics in color display therein.

Example 1-4

Properties of Optical Compensatory Film

Using transparent film samples of the invention, optical compensatory film samples were fabricated according to the method described in Example 1 of JPA NO. 2003-315541. A polyimide produced from 2,2'-bis(3,4-dicarboxyphenyl) hexafluoropropane dianhydride (6FDA) and 2,2'-bis(trifluoromethyl)-4,4'-diaminobiphenyl (TFMB) and having a weight-average molecular weight (Mw) of 70,000 and Δn of about 0.04 was dissolved in a solvent cyclohexanone to prepare a 25 wt. % solution of the polymer. The solution was applied to the transparent film 103 (thickness, 40 μm) of the invention produced in Example 1-2. Next, this was heated at 100° C. for 10 minutes, and then monoaxially stretched by 15% at 160° C. in the machine direction to obtain an optical compensatory film having a polyimide film (thickness, 6 μm) laminated on the transparent film of the invention. The optical characteristics of the optical compensatory film were as follows: Re=72 nm; Rth=220 nm; the shifted angle of the alignment angle was within ±0.3 degrees; and the film had a birefringence layer with nx>ny>nz.

Comparative Example

In the same manner as above except that the comparative sample 101 (thickness, 40 μm) was used in place of the transparent film sample 103, herein obtained was an optical compensatory film with the transparent film of the comparative sample 101 laminated on a polyimide film having a thickness of 6 μm. The optical characteristics of the optical compensatory film were as follows: Re=75 nm; Rth=280 nm.
(Evaluation of Film Fitted in VA-Mode Liquid-Crystal Display Device)

The surface of the optical compensatory film obtained in Example 1-4 and Comparative Example, not coated with the polyimide film, was saponified with alkali, and the film was then directly stuck to a polarizer with a polyvinyl alcohol adhesive. The two were so stuck to each other that the nx direction of the optical compensatory film could be perpendicular to the absorption axis of the polarizing plate. The optical compensatory film was then stuck to a VA liquid-crystal panel with an adhesive in such a manner that it faces the liquid-crystal cell. On the opposite side of the liquid-crystal cell, a polarizing plate alone was stuck to the VA liquid-crystal panel with an adhesive in such a manner that the absorption axis of the polarizing plate could be perpendicular to each other. Thus constructed, the viewing angle characteristics of the liquid-crystal display device were determined. The optical compensatory film obtained from the transparent film sample 103 of the invention prepared in Example 3 was better than the optical compensatory film obtained from the comparative sample 101 in point of the viewing angle in both the vertical direction and the horizontal direction of the panel. Accordingly, this confirms that the transparent film of the invention is excellent when used as a retardation film for VA-mode devices.

Example 1-5

Fabrication and Evaluation of Transparent Film

In the same manner as in Example 1-2, transparent film samples 122 to 125 of the invention and a comparative sample 103 were fabricated. The formulation and the evaluation result of these samples are shown in Table 1-3 and Table 1-4. The polarizing plates formed from the transparent film samples 122 to 125 of the invention in the same manner as in Example 1-2 were also good; and when fitted to liquid-crystal display devices in the same manner as in Example 1-3, these were also good. In addition, when these were formed into optical compensatory films and evaluated in the same manner as in Example 1-4, then they were all better than the film formed of the comparative sample 103.

TABLE 1-3

| Sample Number | | Polymer Material | Acyl Substitution of Cellulose Acylate | Degree of Optical Anisotropy-Reducing Agent | | Wavelength Dispersion-Controlling Agent | | Film Thickness μm | Re 630 nm | Rth 630 nm | Rth 400 nm | Rth 700 nm |
|---|---|---|---|---|---|---|---|---|---|---|---|---|
| | | | | compound (log P) | amount added % (polymer solid content 100) | Compound | amount added | | | | | |
| Com. Ex. | 103 | cellulose acylate | 2.92 (acetyl 2.92) | no | — | No | — | 80 | 4.5 | 34 | 5 | 44 |
| In. | 122 | cellulose acylate | 2.92 (acetyl 2.92) | A-19 (2.9) | 12% | UV-102 | 2.4% | 80 | 1.9 | 9 | −16 | 18 |
| In. | 123 | cellulose acylate | 2.92 (acetyl 2.92) | A-19 (2.9) | 16% | UV-102 | 2.4% | 80 | 1.0 | 7 | −13 | 16 |
| In. | 124 | cellulose acylate | 2.92 (acetyl 2.92) | I-1 (6.2) | 16% | UV-102 | 2.4% | 80 | 1.5 | 6 | −2 | 20 |
| In. | 125 | cellulose acylate | 2.92 (acetyl 2.92) | J-1 (1-9) | 16% | UV-102 | 2.4% | 80 | 1.1 | 9 | −6 | 24 |

TABLE 1-4

| Sample Number | | Spectral Transmittance (%) 350 nm | Spectral Transmittance (%) 380 nm | Transparency of Film Solution (%) | Tg of Film (° C.) | Humidity-Dependent Rth Change Rth10%-Rth80% | Equivalent Water Content (80% RH) | Moisture Permeability (g/m²·24 hrs) | Haze (%) | Mass Change (%) 80° C., 90% RH, 48 hrs | Dimensional Change (%) 60° C., 95% RH, 24 hrs | Elastic Modulus (kgf/mm²) | Photoelasticity Coefficient × 10⁻¹³ cm²/dyne |
|---|---|---|---|---|---|---|---|---|---|---|---|---|---|
| Com. Ex. | 103 | 93.8 | 93.1 | 92.5 | 172 | 53.4 | 4.4 | 2460 | 0.23 | 5.3 | 5.40 | 188 | 24 |
| In. | 122 | 74.2 | 3.6 | 91.5 | 135 | 20.5 | 3.2 | 1070 | 0.35 | 0.1 | 0.12 | 411 | 12 |
| In. | 123 | 76.3 | 4.7 | 90.8 | 131 | 18.4 | 2.5 | 1027 | 0.37 | 0.2 | 0.11 | 406 | 13 |
| In. | 124 | 72.6 | 2.1 | 89.5 | 130 | 25.0 | 2.8 | 1256 | 0.35 | 0.2 | 0.24 | 356 | 13 |
| In. | 125 | 71.5 | 1.6 | 87.5 | 129 | 26.5 | 3.2 | 1358 | 0.32 | 0.2 | 0.16 | 385 | 12 |

Example 2-1

An IPS-mode liquid-crystal display device having the constitution as in FIG. 7 was constructed. Concretely, liquid-crystal molecules 17 were put in and sealed up between a pair of substrates 16 and 18 to form a liquid crystal cell. The cell was disposed between a pair of polarizing films 11a and 11b. A transparent film 19 of the invention was disposed between the liquid-crystal cell and the lower polarizing film lib; and a first optical compensatory film 15 and a second optical compensatory film 13 were disposed between the liquid-crystal cell and the upper polarizing film 11a. The relationship between the transmission axis 12a, 12b of the polarizing film and the slow axis 15a of the first optical compensatory film is described in each Example. In FIG. 7, the constitutive components are drawn as independent members for convenience sake. As the case may be, however, some member in this may be integrated with any other member, for example, the transparent film 19 may be integrated with the polarizing film 11b, serving as a protective film, and they may be built in the device. This is explicitly described in each Example.

Methods for fabricating the constitutive components are described in detail hereinunder.

(Construction of IPS-Mode Liquid-Crystal Cell)

Electrodes were mounted on one glass substrate in such a manner that the distance of the adjacent electrodes could be 20 and a polyimide film serving as an alignment film was fitted to it. Then, this was rubbed. A polyimide film was stuck to one surface of another glass substrate prepared separately, and rubbed to be an alignment film. The two glass substrates were coupled and stuck to each other in such a manner that their alignment films could face to each other, their distance (gap: d) could be 3.9 μm and the rubbing direction of the two glass substrates could be in parallel. Then, a nematic liquid-crystal composition having a refractivity anisotropy (Δn) of 0.0769 and a dielectric anisotropy (ΔЄ) of +4.5 was put into it and sealed up. The value of d·Δn of the liquid-crystal layer was 300 nm.

(Fabrication of Transparent Film 19)
Preparation of Cellulose Acetate Solution:
The following components were put into a mixing tank and stirred and dissolved to prepare a cellulose acetate solution D.
Composition of Cellulose Acetate Solution D:

| | |
|---|---|
| Cellulose acetate having a degree of acetylation of 2.86 | 100.0 mas. pts. |
| Methylene chloride (first solvent) | 402.0 mas. pts. |
| Methanol (second solvent) | 60.0 mas. pts. |

Preparation of Mat Agent Solution:
20 parts by mass of silica particles having a mean particle size of 16 nm (Aerosil R972 by Nippon Aerosil) and 80 parts by weight of methanol were well stirred and mixed for 30 minutes to prepare a dispersion of silica particles. The dispersion was put into a disperser along with the following composition thereinto, and further stirred therein for 30 minutes or more to dissolve the components, thereby preparing a mat agent solution.
Composition of Mat Agent Solution:

| | |
|---|---|
| Dispersion of silica particles having a mean particle size of 16 nm | 10.0 mas. pts. |
| Methylene chloride (first solvent) | 76.3 mas. pts. |
| Methanol (second solvent) | 3.4 mas. pts. |
| Cellulose acetate solution D | 10.3 mas. pts. |

Preparation of Additive Solution:
The following composition was put into a mixing tank, and heated with stirring to dissolve the components, thereby preparing a cellulose acetate solution. The optical anisotropy-reducing compound used herein is A-19; and the wavelength dispersion-controlling agent also used herein is UV-102.
Composition of Additive Solution:

| | |
|---|---|
| Optical anisotropy-reducing compound | 49.3 mas. pts. |
| Wavelength dispersion-controlling agent | 7.6 mas. pts. |
| Methylene chloride (first solvent) | 58.4 mas. pts. |
| Methanol (second solvent) | 8.7 mas. pts. |
| Cellulose acetate solution D | 12.8 mas. pts. |

Fabrication of Cellulose Acetate Film Sample 1:
94.6 parts by mass of the cellulose acetate solution D, 1.3 parts by mass of the mat agent solution, and 4.1 parts by mass of the additive solution were separately filtered, and then mixed. Using a band caster, the mixture was cast on a band. In the above-mentioned composition, the ratio by mass of the optical anisotropy-reducing compound and the wavelength dispersion-controlling agent to cellulose acetate was 12% and 1.8%, respectively. The film having a remaining solvent content of 30% was peeled away from the band, and dried at 140° C. for 40 minutes. The remaining solvent content of the cellulose acetate film thus fabricated was 0.2%, and the thickness thereof was from 40 μm.

The optical characteristics of the thus-obtained cellulose acylate film sample 1 were as follows: Rth (400)=−14 nm; Rth (550)=0 nm; Rth (700)=7 nm; Re (630)=0 nm.

Fabrication of Second Polarizing Plate:
Formation of Polarizing Film 11b:
A rolled polyvinyl alcohol film having a thickness of 80 was continuously stretched by 5 times in an aqueous iodine solution, and dried to obtain a polarizing film lib.
Lamination with Transparent Film 19:
The cellulose acetate film sample 1 prepared in the above was dipped in an aqueous solution of 1.5 N sodium hydroxide at 55° C. for 2 minutes. This was washed in a water bath at room temperature, and then neutralized with 0.1 N sulfuric acid at 30° C. Again this was washed in a water bath at room temperature, and dried with hot air at 100° C. In that manner, the surface of the cellulose acylate film was saponified. Two alkali-saponified cellulose acylate film samples were prepared. Using an aqueous 3% solution of polyvinyl alcohol (Kuraray's PVA-117H) as an adhesive, these were stuck to both faces of the polarizing film so that the polarizing film was thus sandwiched between the two films. A second polarizing plate of which the two faces were protected with the cellulose acylate film was fabricated.

(Fabrication of Second Optical Compensatory Film 13)
The following composition was put into a mixing tank and its components were dissolved with stirring under heat to prepare a cellulose acetate solution having the composition mentioned below. Composition of cellulose acetate solution:

| | |
|---|---|
| Cellulose acetate having a degree of acetylation of 60.9% | 100 mas. pts. |

| | |
|---|---|
| Triphenyl phosphate (plasticizer) | 7.8 mas. pts. |
| Biphenyldiphenyl phosphate (plasticizer) | 3.9 mas. pts. |
| Methylene chloride (first solvent) | 300 mas. pts. |
| Methanol (second solvent) | 54 mas. pts. |
| 1-Butanol (third solvent) | 11 mas. pts. |

16 parts by mass of a retardation enhancer mentioned below, 80 parts by mass of methylene chloride and 20 parts by mass of methanol were put into another mixing tank, and stirred under heat to prepare a solution of a retardation enhancer. 11 parts by mass of the retardation-increasing agent solution was mixed with 487 parts by mass of the cellulose acetate solution, and well stirred to prepare a dope.
Retardation Enhancer:

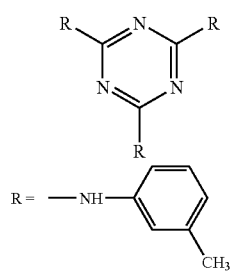

Using a band caster, the resulting dope was cast on a band. After the film temperature on the band became 40° C., this was dried with hot air at 60° C. for 1 minute, and then the film was peeled away from the band. Next, the film was dried with dry air at 140° C. for 10 minutes, and a second optical compensatory film having a thickness of 40 μm was thus fabricated.

The optical characteristics of the film were determined by measuring the light incident angle dependency of Re thereof, and were as follows: Re=5 nm, Rth=70 nm.

(Fabrication of First Optical Compensatory Film 15)

The surface of the second optical compensatory film prepared as above was saponified, and a coating solution for alignment film having a composition mentioned below was applied onto it with a wire bar coater, in an amount of 20 ml/m². This was dried with hot air at 60° C. for 60 seconds and then with hot air at 100° C. for 120 seconds, and a film was formed on it. Next, this was rubbed in the direction parallel to the slow axis direction of the film formed thereon, and an alignment film was thus formed on it. Composition of Coating Solution for Alignment Film:

| | |
|---|---|
| Modified polyvinyl alcohol mentioned below | 10 mas. pts. |
| Water | 371 mas. pts. |
| Methanol | 119 mas. pts. |
| Glutaraldehyde | 0.5 mas. pts. |
| Tetramethylammonium fluoride | 0.3 mas. pts. |

Modified Polyvinyl Alcohol:

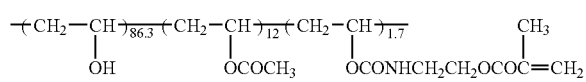

Next, 1.8 g of a discotic liquid-crystal compound mentioned below, 0.2 g of ethyleneoxide-modified trimethylolpropane triacrylate (V#360, by Osaka Yuki Kagaku), 0.06 g of a photopolymerization initiator (Irgacure 907, by Ciba-Geigy), 0.02 g of a sensitizer (Kayacure DETX, by Nippon Kayaku), and 0.01 g of a fluoropolymer (air interface-side vertical alignment agent) mentioned below were dissolved in 3.9 g of methyl ethyl ketone, and the resulting solution was applied onto the alignment film with a #5 wire bar. This was fitted to a metal frame, heated in a thermostat at 125° C. for 3 minutes, whereby the discotic liquid-crystal compound was aligned. Next, this was subjected to UV irradiation with a 120 W/cm high-pressure mercury lamp at 100° C. for 30 seconds, whereby the discotic liquid-crystal compound was crosslinked. Next, this was left cooled to room temperature. In that manner, a retardation film 2 was fabricated, comprising a first optical compensatory film formed on a second compensatory film.

Discotic Liquid-Crystal Compound:

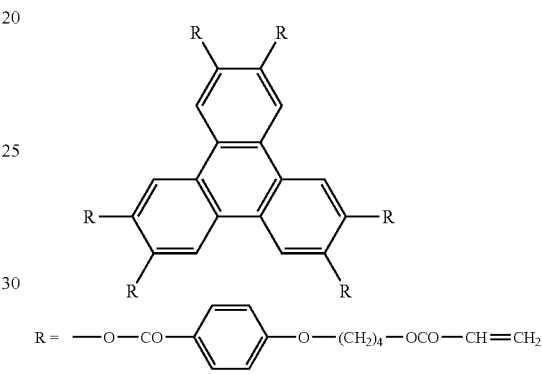

Fluoropolymer (Air Interface-Side Vertical Alignment Agent):

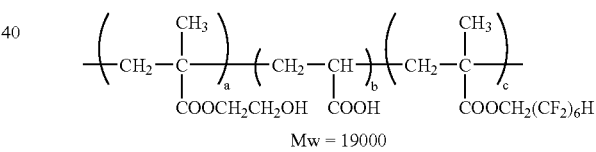

Mw = 19000 a/b/c = 15/5/80

The light incident angle dependency of Re of the thus-fabricated retardation film 2 was determined. The second optical compensatory film contribution that had been previously determined was subtracted from it, and the optical characteristic of the discotic liquid-crystal retardation layer (first optical compensatory film) alone was calculated. As a result, Re=110 nm, Rth=−55 nm, and the mean tilt angle of the liquid crystal was 89.9°. This confirms that the discotic liquid crystal was aligned vertically to the film face. The direction of the slow axis was parallel to the rubbing direction of the alignment film.

(Fabrication of First Polarizing Plate)

Fabrication of first polarizing plate 11a:

Next, a stretched polyvinyl alcohol film was made to adsorb iodine thereby to prepare a first polarizing film 11a. Using a polyvinyl alcohol adhesive, a cellulose acetate film (Fujitac TD80UF, by Fuji Photo Film) was stuck to one surface of the polarizing film. Lamination of second optical compensatory film 13 and first optical compensation film 15:

Next, the retardation film 2 was stuck to the other surface of the polarizing film 11a in such a manner that the second optical compensatory film 13 could face the polarizing film 11a. In that manner, a first polarizing plate was fabricated.
(Construction of Liquid-Crystal Display Device)

Further, the IPS-mode cell was stuck to the first polarizing plate in such a manner that the first optical compensatory film could face the liquid-crystal cell. In this, the slow axis of the first optical compensatory film 15 and that of the liquid-crystal layer of the IPS-mode cell were both parallel to the transmission axis 12a of the polarizing film 11a. Next, the second polarizing plate 11b fabricated in the above was stuck to it in such a manner that its transmission axis 12b could be perpendicular to the transmission axis 12a of the polarizing film 11a, and a liquid-crystal display device was thus constructed.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.019%.

Example 2-2

A liquid-crystal display device having the constitution as in FIG. 7 was constructed.
(Fabrication of Transparent Film 19)

In the same manner as in Example 2-1 for fabricating the cellulose acetate film sample 1, a cellulose acetate film sample 2 was fabricated, for which, however, the thickness of the cellulose acetate film employed was changed. Thus fabricated, the sample 2 was used as a transparent film 19. The thickness of the thus-obtained cellulose acetate film sample 2 was 80 μm. The optical characteristics of the cellulose acetate film sample 2 were as follows: Rth (400)=−28 nm; Rth (550)=0 nm; Rth (700)=14 nm; Re (630)=0 nm.

Also in the same manner as in Example 2-1, a liquid-crystal display device was constructed, for which, however, the cellulose acetate film sample 2 was used as a transparent film 19 in place of the cellulose acetate film sample 1 in Example 2-1.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.017%.

Example 2-3

A liquid-crystal display device having the constitution as in FIG. 7 was constructed.
(Fabrication of Transparent Film 19)

In the same manner as in Example 2-1 for fabricating the cellulose acetate film sample 1, a cellulose'acetate film sample 3 was fabricated, for which, however, the thickness of the cellulose acetate film employed was changed. Thus fabricated, the sample 3 was used as a transparent film 19. The thickness of the thus-obtained sample 3 was 120 μm. The optical characteristics of the cellulose acetate film sample 3 were as follows: Rth (400)=−42 nm; Rth (550)=0 nm; Rth (700)=21 nm; Re (630)=0 nm.

Also in the same manner as in Example 2-1, a liquid-crystal display device was constructed, for which, however, the cellulose acetate film sample 3 was used as a transparent film 19 in place of the cellulose acetate film sample 1 in Example 2-1.

(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.016%.

Example 2-4

A liquid-crystal display device having the constitution as in FIG. 7 was constructed.
(Fabrication of Transparent Film 19)

In the same manner as in Example 2-1 for fabricating the cellulose acetate film sample 1, a cellulose acetate film sample 4 was fabricated, for which, however, the thickness of the cellulose acetate film employed was changed. Thus fabricated, the sample 4 was used as a transparent film 19. The thickness of the thus-obtained sample 4 was 160 μm. The optical characteristics of the cellulose acetate film sample 4 were as follows: Rth (400)=−56 nm; Rth (550)=0 nm; Rth (700)=28 nm; Re (630)=0 nm.

Also in the same manner as in Example 2-1, a liquid-crystal display device was constructed, for which, however, the cellulose acetate film sample 4 was used as a transparent film 19 in place of the cellulose acetate film sample 1 in Example 2-1.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.016%.

Example 2-5

A liquid-crystal display device having the constitution as in FIG. 7 was constructed.
(Fabrication of Transparent Film 19)

In the same manner as in Example 2-1 for fabricating the cellulose acetate film sample 1, a cellulose acetate film sample 5 was fabricated, for which, however, the thickness of the cellulose acetate film employed was changed. Thus fabricated, the sample 5 was used as a transparent film 19. The thickness of the thus-obtained sample 5 was 200 μm. The optical characteristics of the cellulose acetate film sample 5 were as follows: Rth (400)=−70 nm; Rth (550)=0 nm; Rth (700)=35 nm; Re (630)=0 nm.

Also in the same manner as in Example 2-1, a liquid-crystal display device was constructed, for which, however, the cellulose acetate film sample 5 was used as a transparent film 19 in place of the cellulose acetate film sample 1 in Example 2-1.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.017%.

Example 2-6

A liquid-crystal display device having the constitution as in FIG. 7 was constructed.
(Fabrication of Transparent Film 19)

In the same manner as in Example 2-1 for fabricating the cellulose acetate film sample 1, a cellulose acetate film sample 6 was fabricated, for which, however, the thickness of the cellulose acetate film employed was changed. Thus fabricated, the sample 6 was used as a transparent film 19. The thickness of the thus-obtained sample 6 was 240 µm. The optical characteristics of the cellulose acetate film sample 6 were as follows: Rth (400)=−84 nm; Rth (550)=0 nm; Rth (700)=42 nm; Re (630)=0 nm.

Also in the same manner as in Example 2-1, a liquid-crystal display device was constructed, for which, however, the cellulose acetate film sample 6 was used as a transparent film 19 in place of the cellulose acetate film sample 1 in Example 2-1.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.018%.

Example 2-7

A liquid-crystal display device having the constitution as in FIG. 7 was constructed.
(Fabrication of Transparent Film 19)

In the same manner as in Example 2-1 for fabricating the cellulose acetate film sample 1, a cellulose acetate film sample 7 was fabricated, for which, however, the thickness of the cellulose acetate film employed was changed. Thus fabricated, the sample 7 was used as a transparent film 19. The thickness of the thus-obtained sample 7 was 280 µm. The optical characteristics of the cellulose acetate film sample 7 were as follows: Rth (400)=−98 nm; Rth (550)=0 nm; Rth (700)=49 nm; Re (630)=0 nm.

Also in the same manner as in Example 2-1, a liquid-crystal display device was constructed, for which, however, the cellulose acetate film sample 6 was used as a transparent film 19 in place of the cellulose acetate film sample 1 in Example 2-1.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.021%.

Comparative Example 2-1

A liquid-crystal display device was constructed in the same manner as in Example 2-1, for which, however, a Zeonoa film (by Nippon Zeon) was used as a transparent film 19 in place of the cellulose acetate film sample 1 in Example 2-1. The optical characteristics of the Zeonoa film were as follows: Rth (400), Rth (550), Rth (700) and Re (630) were all nearly 0 nm.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.022%.

Example 2-8

A liquid-crystal display device having the constitution as in FIG. 7 was constructed.

The liquid-crystal display device was constructed in the same manner as in Example 2-1, for which, however, a polymer film 1 disposed between the front side of the polarizing plate and the liquid-crystal cell in a commercially-available Hitachi's liquid-crystal television (Model, W32-L5000) was used as the first optical compensatory film in place of the first optical compensatory film used in Example 2-1. The optical characteristics of the polymer film 1 were as follows: Nz=0.28, RE=128 nm. The in-plane slow axis of the polymer film 1 was disposed in parallel to the in-plane slow axis of the liquid-crystal layer.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.025%.

Example 2-9

A liquid-crystal display device having the constitution as in FIG. 7 was constructed.

The liquid-crystal display device was constructed in the same manner as in Example 2-2, for which, however, the polymer film 1 used in Example 2-8 was used as the second optical compensatory film in place of the second optical compensatory film used in Example 2-2.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.024%.

Example 2-10

A liquid-crystal display device having the constitution as in FIG. 7 was constructed.

The liquid-crystal display device was constructed in the same manner as in Example 2-3, for which, however, the polymer film 1 used in Example 2-8 was used as the second optical compensatory film in place of the second optical compensatory film used in Example 2-3.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.022%.

Example 2-11

A liquid-crystal display device having the constitution as in FIG. 7 was constructed.

The liquid-crystal display device was constructed in the same manner as in Example 2-4, for which, however, the polymer film 1 used in Example 2-8 was used as the second optical compensatory film in place of the second optical compensatory film used in Example 2-4.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.022%.

Example 2-12

A liquid-crystal display device having the constitution as in FIG. 7 was constructed.

The liquid-crystal display device was constructed in the same manner as in Example 2-5, for which, however, the polymer film 1 used in Example 2-8 was used as the second optical compensatory film in place of the second optical compensatory film used in Example 2-5.

(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.026%

Example 2-13

A liquid-crystal display device having the constitution as in FIG. 7 was constructed.

The liquid-crystal display device was constructed in the same manner as in Example 2-6, for which, however, the polymer film 1 used in Example 2-8 was used as the second optical compensatory film in place of the second optical compensatory film used in Example 2-6.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.028%.

Example 2-14

A liquid-crystal display device having the constitution as in FIG. 7 was constructed.

The liquid-crystal display device was constructed in the same manner as in Example 2-7, for which, however, the polymer film 1 used in Example 2-8 was used as the second optical compensatory film in place of the second optical compensatory film used in Example 2-7.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.034%.

Comparative Example 2-2

A liquid-crystal display device was constructed in the same manner as in Example 2-8, for which, however, a Zeonoa film (by Nippon Zeon) was used as a transparent film 19 in place of the cellulose acetate film sample 1 in Example 2-8. The optical characteristics of the Zeonoa film were as follows: Rth (400), Rth (550), Rth (700) and Re (630) were all nearly 0 nm.
(Measurement of Light Leakage from Constructed Liquid-Crystal Display Device)

The thus-constructed liquid-crystal display device was checked for light leakage from it. Concretely, the device was observed in the left oblique direction at 60°, and the light leakage from it was 0.035%.

INDUSTRIAL APPLICABILITY

The transparent film of the invention exhibits wavelength dependency in that the positivity/negativity of its Rth is reversed within a specific wavelength range. Using the transparent film makes it possible to improve the viewing angle dependency of contrast and color shift in IPS-mode liquid-crystal display devices. To that effect, the transparent film of the invention is applicable to the field of image display devices. In addition, the transparent film of the invention may be utilized as a substrate of liquid-crystal cells in image display devices and as a constitutive component of various functional films. Further, the transparent film of the invention can be used as a support of photographic films.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A transparent film of which Re ($\lambda$) and Rth ($\lambda$) defined by following formulae (I) and (II) satisfy following formulae (III) and (IV):

$$Re(\lambda)=(nx-ny)\times d, \quad (I)$$

$$Rth(\lambda)=\{(nx+ny)/2-nz\}\times d, \quad (II)$$

$$0\leq|Re(630)|\leq 50, \quad (III)$$

$$Rth(400)\times Rth(700)<0, \text{ and } 0\leq|Rth(700)-Rth(400)|\leq 150, \quad (IV)$$

wherein Re ($\lambda$) means an in-plane retardation value at a wavelength $\lambda$ nm (unit: nm); Rth ($\lambda$) means a thickness-direction retardation value at a wavelength $\lambda$ nm (unit: nm); nx means a refractive index in the in-plane slow-axis direction; ny means a refractive index in the in-plane fast-axis direction; nz means a refractive index in the film thickness direction; and d means a thickness of the film; and wherein the transparent film comprises a compound which has an absorption in a UV region of from 200 to 400 nm and of which the wavelength dispersion of Re and Rth is larger on the shorter wavelength side.

2. The transparent film of claim 1, which comprises a thermoplastic norbornene resin.

3. The transparent film of claim 1, which comprises a cellulose acylate.

4. The transparent film of claim 3, wherein the cellulose acylate has a degree of acyl substitution of from 2.85 to 3.00.

5. The transparent film of claim 4, wherein the acyl substituent in the cellulose acylate comprises two selected from the group consisting of an acetyl group, a propionyl group and a butanoyl group; and the degree of total acyl substitution is from 2.50 to 3.00.

6. The transparent film of claim 1, which comprises at least one compound capable of reducing Re($\lambda$) and Rth($\lambda$).

7. The transparent film of claim 1, which comprises at least one compound capable of reducing Re($\lambda$) and Rth($\lambda$) of the film and having an octanol-water partition coefficient (Log p value) of from 0 to 7, in an amount of from 0.01 to 30% by weight of the solid content of the film.

8. A transparent film of which Re ($\lambda$) and Rth ($\lambda$) defined by following formulae (I) and (II) satisfy following formulae (III) and (IV):

$$Re(\lambda)=(nx-ny)\times d, \quad (I)$$

$$Rth(\lambda)=\{(nx+ny)/2-nz\}\times d, \quad (II)$$

$$0\leq|Re(630)|\leq 50, \quad (III)$$

$$Rth(400)\times Rth(700)<0, \text{ and } 0\leq|Rth(700)-Rth(400)|\leq 150, \quad (IV)$$

wherein Re ($\lambda$) means an in-plane retardation value at a wavelength $\lambda$ nm (unit: nm); Rth ($\lambda$) means a thickness-direction retardation value at a wavelength $\lambda$ nm (unit: nm); nx means a refractive index in the in-plane slow-axis direction; ny means a refractive index in the in-plane fast-axis direction; nz means a refractive index in the film thickness direction; and d means a thickness of the film;

wherein the transparent film contains at least one compound of any of the following formulae (2) to (19) capable of reducing $Re(\lambda)$ and $Rth(\lambda)$ of the film and having an octanol-water partition coefficient (Log p value) of from 0 to 7, in an amount of from 0.01 to 30%, by weight of the solid content of the film:

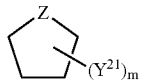

Formula (2)

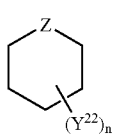

Formula (3)

wherein Z represents a carbon atom, an oxygen atom, a sulfur atom, or $-NR^{25}-$; $R^{25}$ represents a hydrogen atom or an alkyl group; the 5-membered or 6-membered ring including Z may have a substituent; $Y^{21}$ and $Y^{22}$ each independently represent an ester group, an alkoxycarbonyl group, an amido group or a carbamoyl group having from 1 to 20 carbon atoms; $Y^{21}$ and $Y^{22}$ may bond to each other to form a ring; m indicates an integer of from 1 to 5; n indicates an integer of from 1 to 6,

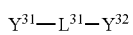

Formula (4)

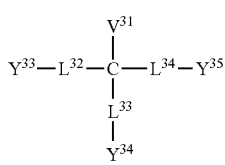

Formula (5)

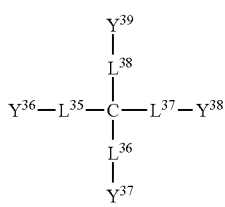

Formula (6)

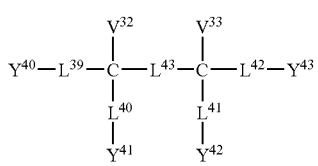

Formula (7)

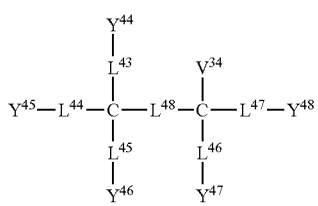

Formula (8)

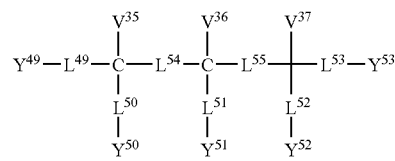

Formula (9)

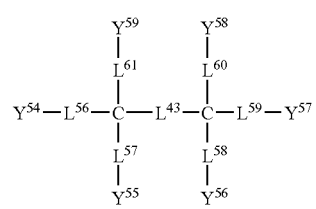

Formula (10)

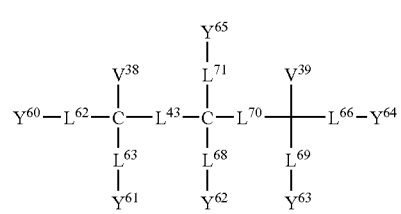

Formula (11)

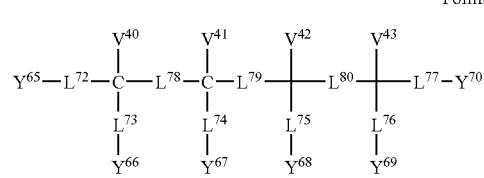

Formula (12)

wherein $Y^{31}$ to $Y^{70}$ each independently represent an ester group having from 1 to 20 carbon atoms, an alkoxycarbonyl group having from 1 to 20 carbon atoms, an amido group having from 1 to 20 carbon atoms, a carbamoyl group having from 1 to 20 carbon atoms, or a hydroxyl group; $V^{31}$ to $V^{43}$ each independently represent a hydrogen atom, or a $C_{1-20}$ aliphatic group; $L^{31}$ to $L^{80}$ each independently represent a divalent saturated linking group having from 0 to 40 atoms and having from 0 to 20 carbon atoms; when the number of the atoms to constitute $L^{31}$ to $L^{80}$ is 0 (zero), it means that the groups at both ends of the linking group directly bond to each other to form a single bond; $V^{31}$ to $V^{43}$, and $L^{31}$ to $L^{80}$ may have a substituent,

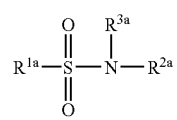

Formula (13)

wherein $R^{1a}$ represents an alkyl group or an aryl group; $R^{2a}$ and $R^{3a}$ each independently represent a hydrogen atom, an alkyl group or an aryl group; the number of all carbon atoms of $R^{1a}$, $R^{2a}$ and $R^{3a}$ is at least 10; and the alkyl group and the aryl group may have a substituent, Formula (14)

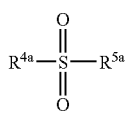

wherein $R^{4a}$ and $R^{5a}$ each independently represent an alkyl group or an aryl group; the number of all carbon atoms of $R^{4a}$ and $R^{5a}$ is at least 10; and the alkyl group and the aryl group may have a substituent, Formula (15)

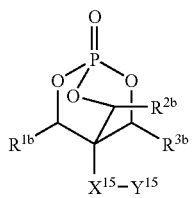

wherein $R^{1b}$, $R^{2b}$ and $R^{3b}$ each independently represent a hydrogen atom or an alkyl group; $X^{15}$ represents a divalent linking group to be formed of one or more groups selected from the group consisting of the following linking group 1; and $Y^{15}$ represents a hydrogen atom, an alkyl group, an aryl group or an aralkyl group, Linking Group 1:

a single bond, —O—, —CO—, —$NR^{4b}$—, an alkylene group and an arylene group; wherein $R^{4b}$ is a hydrogen atom, an alkyl group, an aryl group or an aralkyl group, Formula (16)

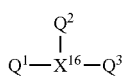

wherein $Q^1$, $Q^2$ and $Q^3$ each independently represent a 5- or 6-membered ring; and $X^{16}$ represents a boron atom (B), C—R (R is a hydrogen atom or a substituent), a nitrogen atom (N), a phosphorous atom (P) or P=O, Formula (17)

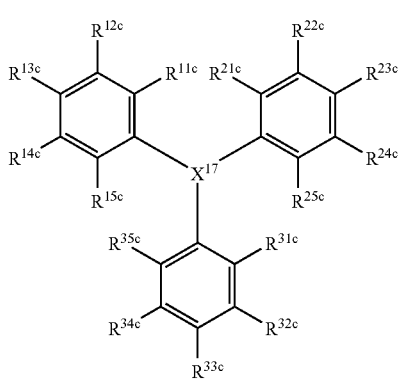

wherein $X^{17}$ represents B, C—R (R is a hydrogen atom or a substituent), or N; and $R^{11c}$, $R^{12c}$, $R^{13c}$, $R^{14c}$, $R^{15c}$, $R^{21c}$, $R^{22c}$, $R^{23c}$, $R^{24c}$, $R^{25c}$, $R^{31c}$, $R^{32c}$, $R^{33c}$, $R^{34c}$ and $R^{35c}$ each represent a hydrogen atom or a substituent, Formula (18)

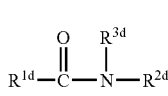

wherein $R^{1d}$ represents an alkyl group or an aryl group; $R^{2d}$ and $R^{3d}$ each independently represent a hydrogen atom, an alkyl group or an aryl group; and the alkyl group and the aryl group may have a substituent, Formula (19)

wherein $R^{4d}$, $R^{5d}$ and $R^{6d}$ each independently represent an alkyl group or an aryl group; and the alkyl group and the aryl group may have a substituent.

9. The transparent film of claim 1, having a thickness of from 10 to 120 μm.

10. An optical compensatory film comprising a transparent film of claim 1 and an optically-anisotropic layer having Re (630) of from 0 to 200 nm and |Rth (630)| of from 0 to 400 nm.

11. A polarizing plate comprising an optical compensatory film of claim 10, and a polarizer.

12. A liquid-crystal display device, which comprises a transparent film of which Re (λ) and Rth (λ) defined by the following formulae (I) and (II) satisfy the following formulae (III) and (IV):

$$Re(\lambda)=(nx-ny)\times d, \quad (I)$$

$$Rth(\lambda)=\{(nx+ny)/2-nz\}\times d, \quad (II)$$

$$0\leq|Re(630)|\leq 50, \quad (III)$$

$$Rth(400)\times Rth(700)<0, \text{ and } 0\leq|Rth(700)-Rth(400)|\leq 150, \quad (IV)$$

wherein Re (λ) means an in-plane retardation value at a wavelength λ nm (unit: nm); Rth (λ) means a thickness-direction retardation value at a wavelength λ nm (unit: nm); nx means a refractive index in the in-plane slow-axis direction; ny means a refractive index in the in-plane fast-axis direction; nz means a refractive index in the film thickness direction; and d means a thickness of the film; and wherein the liquid-crystal display device employs an IPS mode.

13. A transparent film of which Re (λ) and Rth (λ) defined by following formulae (I) and (II) satisfy following formulae (III) and (IV):

$$Re(\lambda)=(nx-ny)\times d, \quad (I)$$

$$Rth(\lambda)=\{(nx+ny)/2-nz\}\times d, \quad (II)$$

$$0\leq|Re(630)|\leq 50, \quad (III)$$

$$Rth(400)\times Rth(700)<0, \text{ and } 0\leq|Rth(700)-Rth(400)|\leq 150, \quad (IV)$$

wherein Re (λ) means an in-plane retardation value at a wavelength λ nm (unit: nm); Rth (λ) means a thickness-direction retardation value at a wavelength λ, nm (unit: nm); nx means a refractive index in the in-plane slow-axis direction; ny means a refractive index in the in-plane fast-axis direction; nz means a refractive index in the film thickness direction; and d means a thickness of the film;

wherein the transparent film comprises a compound capable of reducing optical anisotropy; and wherein the mean content of the compound in the part of 10% of the overall thickness from the surface of at least one side of the film is from 80 to 99% of the mean content of the compound in the center part of the film.

14. The liquid-crystal display device of claim 12, wherein the light leakage value in the black state of the device is at most 0.022% at an azimuth angle of 45 degrees and at a polar angle of 60 degrees.

15. The liquid-crystal display device of claim 12, wherein the transparent film is a transparent film of claim 1.

16. The liquid-crystal display device of claim 12, wherein the transparent film is a transparent film of claim 8.

17. The liquid-crystal display device of claim 12, wherein the transparent film is a transparent film of claim 13.

18. The liquid-crystal display device of claim 12, wherein the transparent film comprises a thermoplastic norbornene resin.

19. The liquid-crystal display device of claim 12, wherein the transparent film comprises a cellulose acylate.

20. The liquid-crystal display device of claim 19, wherein the cellulose acylate has a degree of acyl substitution of from 2.85 to 3.00.

21. The liquid-crystal display device of claim 20, wherein the acyl substituent in the cellulose acylate comprises two selected from the group consisting of an acetyl group, a propionyl group and a butanoyl group; and the degree of total acyl substitution is from 2.50 to 3.00.

22. The liquid-crystal display device of claim 12, wherein the transparent film comprises at least one compound capable of reducing $Re(\lambda)$ and $Rth(\lambda)$.

23. The liquid-crystal display device of claim 12, wherein the transparent film comprises at least one compound capable of reducing $Re(\lambda)$ and $Rth(\lambda)$ of the film and having an octanol-water partition coefficient (Log p value) of from 0 to 7, in an amount of from 0.01 to 30% by weight of the solid content of the film.

24. The liquid-crystal display device of claim 12, wherein the transparent film comprises at least one compound capable of lowering |Rth (700)–Rth (400)| of the film.

25. The liquid-crystal display device of claim 12, wherein the transparent film has a thickness of from 10 to 120 $\mu$m.

26. The liquid-crystal display device of claim 12, further comprising an optically-anisotropic layer having Re (630) of from 0 to 200 nm and |Rth (630)| of from 0 to 400 nm.

* * * * *